United States Patent
Grutzmacher et al.

(10) Patent No.: US 9,120,900 B2
(45) Date of Patent: Sep. 1, 2015

(54) POLYMER-BOUND BISACYLPHOSPHINE OXIDES

(71) Applicant: BASF SE, Ludwigshafen (DE)

(72) Inventors: Hansjorg Grutzmacher, Dielsdorf (CH); Timo Ott, Ludwigshafen (DE); Kurt Dietliker, Allschwil (CH)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/503,479

(22) Filed: Oct. 1, 2014

(65) Prior Publication Data

US 2015/0025169 A1 Jan. 22, 2015

Related U.S. Application Data

(62) Division of application No. 13/381,966, filed as application No. PCT/EP2010/059175 on Jun. 29, 2010, now Pat. No. 8,883,872.

(30) Foreign Application Priority Data

Jul. 6, 2009 (EP) .................................... 09164610

(51) Int. Cl.
| | |
|---|---|
| C08F 2/50 | (2006.01) |
| C08B 37/00 | (2006.01) |
| B29C 71/04 | (2006.01) |
| A61L 2/08 | (2006.01) |
| A61L 24/00 | (2006.01) |
| C08F 2/46 | (2006.01) |
| C08G 61/04 | (2006.01) |
| C08G 77/30 | (2006.01) |
| C08F 8/40 | (2006.01) |
| C08B 15/06 | (2006.01) |
| C08F 130/02 | (2006.01) |
| C09D 133/14 | (2006.01) |

(52) U.S. Cl.
CPC .............. *C08G 77/30* (2013.01); *C08B 15/06* (2013.01); *C08F 8/40* (2013.01); *C08F 130/02* (2013.01); *C09D 133/14* (2013.01)

(58) Field of Classification Search
USPC ............... 522/26, 7, 6, 71, 189, 184, 1; 520/1
See application file for complete search history.

(56) References Cited

U.S. PATENT DOCUMENTS

| | | | |
|---|---|---|---|
| 5,410,060 | A | 4/1995 | Schroeder et al. |
| 7,166,647 | B2 | 1/2007 | Herlihy et al. |
| 7,354,957 | B2 | 4/2008 | Herlihy |
| 7,396,861 | B2 | 7/2008 | Loccufier et al. |
| 2007/0027229 | A1 | 2/2007 | Moszner et al. |
| 2008/0004464 | A1* | 1/2008 | Murer et al. ................. 560/51 |
| 2009/0118388 | A1 | 5/2009 | Naruse et al. |

FOREIGN PATENT DOCUMENTS

| | | |
|---|---|---|
| CN | 101432374 | 5/2009 |
| WO | 9717378 | 5/1997 |
| WO | 0055212 | 9/2000 |
| WO | 0055214 | 9/2000 |
| WO | 03019295 | 3/2003 |
| WO | 03104245 | 12/2003 |
| WO | 2006056541 | 6/2006 |
| WO | 2009030658 | 3/2009 |
| WO | 2009068590 | 6/2009 |

OTHER PUBLICATIONS

W. Rutsch et al., Recent developments in photoinitiators, Progress in Organic Coatings 27, 227-239 (1996).
J. H. de Groot et al., Hydrophilic Polymeric Acylphosphine Oxide Photoinitiators/Crosslinkers for in Vivo Blue-Light Photopolymerization, Biomacromolecules 2, 1271-1278 (2001).
Timo Ott, "Synthesis and Application of highly functionalized acylphosphane oxides" Dissertation ETH No. 18055 (2008).
L. Angiolini et al., Journal of Applied Polymer Science, vol. 57, pp. 519-531.

* cited by examiner

*Primary Examiner* — Ling Choi
*Assistant Examiner* — Jessica E Whiteley
(74) *Attorney, Agent, or Firm* — Shruti Costales

(57) ABSTRACT

The invention pertains to an oligomer or polymer substituted by one or more bisacylphosphine oxide moieties, characterized in that said bisacylphosphine oxide moiety is linked via the phosphorous atom, optionally via a spacer group, to the oligomer or polymer backbone; as well as to specifically functionalized bisacylphosphine oxides, suitable to prepare said polymers or oligomers.

12 Claims, No Drawings

POLYMER-BOUND BISACYLPHOSPHINE OXIDES

The invention pertains to a novel high-molecular photoinitiator and a process for its preparation as well as its use in photopolymerizable compositions, in particular in printing-inks.

Bisacylphosphine oxides are well known as excellent photoinitiators and are widely used in applications such as coatings, printing inks or electronic materials (see for example W. Rutsch et al., Prog. Org. Coatings 1996, 27, 227). Bisacylphosphine oxide photoinitiators absorb light in the UV-A/vis region and undergo concomitant photo-bleaching, which provides unique curing properties not matched by other photoinitiator types. The bisacylphosphine oxides reported so far mostly are monofunctional photoinitiators, i.e. possessing one photoactive bisacylphosphine oxide structural unit per molecule. The compounds furthermore usually have a MG<1000 and do not possess functional groups which can easily undergo chemical reactions with other entities such as for example resin components, carrier materials or substrate surfaces. Photoinitiators with higher molecular weight or photoinitiators substituted by suitable functional groups are of increasing interest for many applications. For example, U.S. Pat. No. 7,166,647, U.S. Pat. No. 7,354,957 or WO97/1737 claim multifunctional photoinitiators, in which several photoactive groups are linked to multifunctional core material. The photoinitiators moieties used are of the benzophenone-, thioxanthone-, α-hydroxy ketone or α-aminoketone type. Difunctional monoacylphosphine oxide derivatives are reported in U.S. Pat. No. 5,410,060, WO03/19295 and WO09/03065. US7396861, L. Angiolini et al., J. Appl. Polym. Sci. 1994, 51, 133, ibidem 1995, 57, 519; WO00/55212, WO00/55214 as well as J. H. de Groot et al., Biomacromolecules 2001, 2(4), 1271, WO09/030,658 disclose monoacylphosphine oxides, e.g. with acrylate groups which are bound to dendrimers, homo- and copolymers. WO09/068,590 discloses a process for the preparation of acrylate-functionalized mono- and bisacylphosphine oxides.

WO03/104245 describes dimeric and multimeric mono- and bisacylphosphine oxide photoinitiators, wherein the mono- or bisacylphosphine oxide moieties are linked to a core via the benzoyl group. WO06/056541 reveals a process for preparing acylphosphanes and derivatives thereof. Using this process several bifunctional bisacylphosphine oxide derivatives are prepared in which the two photoactive moieties are linked via the substituent on phosphorous.

Known polymer-bound acylphosphine oxide photoinitiators are mostly limited to monoacylphosphine oxide structures and the link to the carrier is mostly realized via the benzoyl moiety. Therefore, there is a need for oligomer or polymer-bound bisacylphosphine oxide structures where the photoactive moiety is preferentially linked via the phosphorous atom to the polymer backbone or the carrier material. Bisacylphosphine oxide structures linked via the substituent on phosphorous, e.g. to a polymeric carrier material, provide the formation of a high radical density on the carrier material and thus result in high reacitivities.

The current invention provides such oligomer or polymer bound bisacylphosphine oxide photoinitiators linked via the phosphorous atom to the polymer or carrier material as well as corresponding functionalized bisacylphosphine oxide intermediates used as starting material for the preparation of the oligomers and polymers.

Subject of the invention therefore is an oligomer or polymer substituted by bisacylphosphine oxide moieties, characterized in that said bisacylphosphine oxide moiety is linked via the phosphorous atom, optionally via a spacer group, to the oligomer or polymer backbone.

In the above oligomer or polymer the spacer group is not one of the two benzyol groups of the bisacylphosphine oxide moiety. Accordingly, subject of the invention is an oligomer or polymer substituted by bisacylphosphine oxide moieties, characterized in that said bisacylphosphine oxide moiety is linked via the phosphorous atom, optionally via a spacer group, to the oligomer or polymer backbone, with the provisio that the spacer group is not one of the two benzyol groups of the bisacylphosphine oxide moiety.

The polymer or oligomer comprises for example 2 or more, in particular 3 or more bisacylphosphine oxide moieties.

In particular said oligomer or polymer comprises units of the formula I

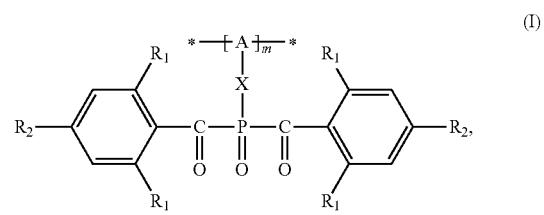

wherein m is an integer equal or greater than 2;

A is the repeating unit of an oligomer or polymer backbone or a multifunctional oligomer unit;

X is a direct bond or a spacer group;

$R_1$ is $C_1$-$C_4$-alkyl, $C_1$-$C_4$-alkoxy or Cl; and $R_2$ is hydrogen, $C_1$-$C_4$-alkyl, $C_1$-$C_4$-alkoxy or Cl.

The oligomer or polymer for example comprises units of the formula Ia

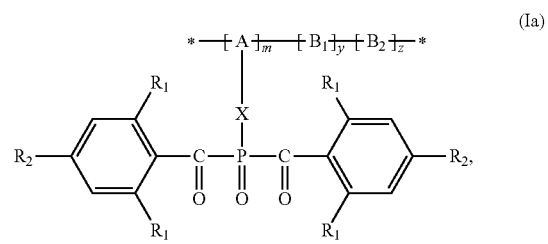

m is an integer equal or greater than 2;

y and z independently of each other are an integer 0-15000;

A is

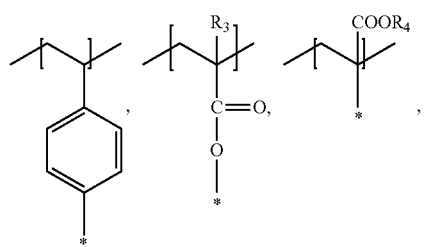

-continued

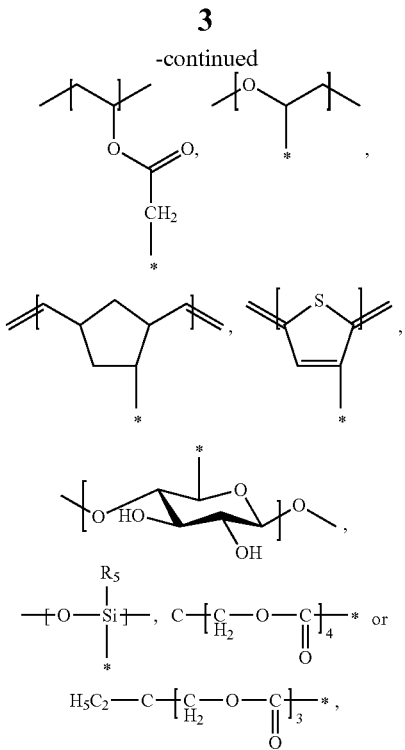

wherein the asterisk denotes the bond to X;
$B_1$ and $B_2$ independently of each other are

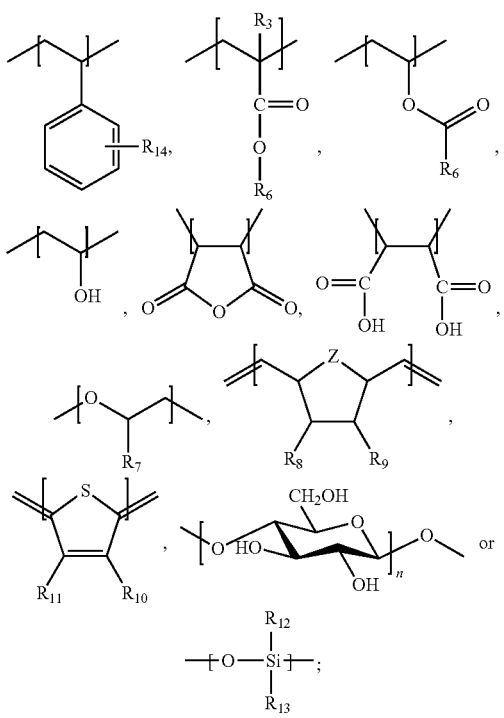

wherein A, $B_1$ and $B_2$ are incorporated into the same polymer backbone via random or block polymerization;

X is a direct bond, $C_1$-$C_{10}$-alkylene, —$(CH_2)_o$—NH—CO—O—$(CH_2)_p$—*, —$(CH_2)_o$—NH—CO—O—$CH_2$—CHOH—$CH_2$—*, —$(CH_2)_o$—NH—CO—NH—$(CH_2)_p$—*, —$(CH_2)_o$—NH—CO—S—$(CH_2)_p$—*, —$(CH_2)_o$—O—CO—$CHR_3$—$CH_2$—NH—$(CH_2)_p$—*, —$(CH_2)_o$—O—CO—$CHR_3$—$CH_2$—NH—$(CH_2)_p$—, —$(CH_2)_o$—CO—O—$(CH_2)_p$—*, —$(CH_2)_o$—O—CO—$CHR_3$—$CH_2$—S—$(CH_2)_p$—*, *—$(CH_2)_o$—O—CO—$CHR_3$—$CH_2$—S—$(CH_2)_p$— —$(CH_2)_o$—O—CO—CH$(COCH_3)$—$CH_2$—$C(COOR_3)CH_2$—*, —$(CH_2)_o$—NH—$CH_2$—$CH_2$—$C(COOR_3)CH_2$—*, —$(CH_2)_o$—S—$(CH_2)_o$—$C(COOR_3)CH_2$—*, —$(CH_2)_o$—O—CO—CH$(COCH_3)$—$CH_2$—$CHR_3$—CO—O—$(CH_2$—$CH_2$—O$)_t$$(CO)CH_2$—*, —$(CH_2)_o$—NH—$CH_2$—$CHR_3$—CO—O—$(CH_2$—$CH_2$—O$)_t$$(CO)CH_2$—*, —$(CH)_o$—S—$CH_2$—$CHR_3$—CO—O—$CH_2$—$CH_2$—*, —$(CH_2)_o$—S—$CH_2$—$CHR_3$—CO—O—$(CH_2$—$CH_2$—O$)_t$$(CO)CH_2$—*, —$(CH_2)_o$—NH—$CH_2$—$CHR_3$—CO—O—$CH_2$—$CH_2$—*, —$(CH_2)_o$—O—CO—CH$(COCH_3)$—$CH_2$—$CHR_3$—CO—O—$CH_2$—$CH_2$—*, —$(CH_2)_o$—CO—O—$CH_2$—CHOH—$CH_2$—*, —$(CH_2)_o$—O(CO)—$CH_2$—*, —$(CH_2CH_2O)_t$—(CO)—$CH_2$—*, —$(CH_2)_o$—CHOH—$CH_2$—O(CO)—$CH_2$—*, or

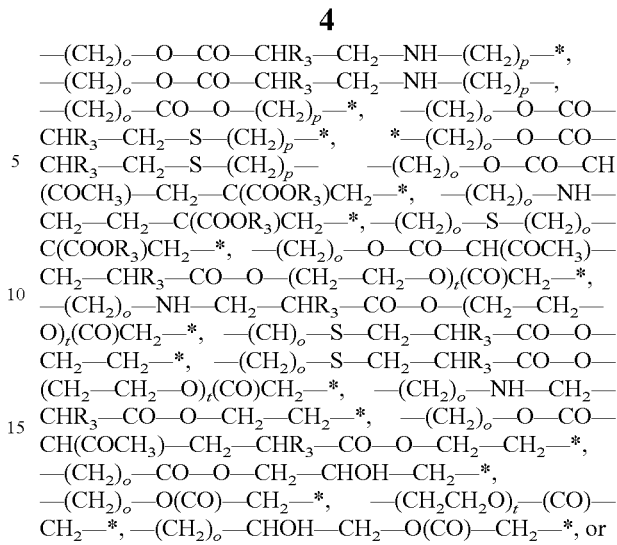

wherein the asterisk denotes the bond to the bisacylphosphine oxide moiety;

o, p and q independently of each other are an integer 1-4;
r is an integer 0-2;
s is 0 or 1;
t is an integer 1 or 2;
$R_1$ is $C_1$-$C_4$-alkyl, $C_1$-$C_4$-alkoxy or Cl; and
$R_2$ is hydrogen, $C_1$-$C_4$-alkyl, $C_1$-$C_4$-alkoxy or Cl.
$R_3$ is hydrogen or methyl;
$R_4$ is $C_1$-$C_4$alkyl;
$R_5$ is methyl, phenyl or ethoxy;
$R_6$ is $C_1$-$C_{10}$alkyl or $C_1$-$C_9$ perfluoroalkyl;
$R_7$ is $C_1$-$C_{10}$alkyl, —$CH_2$—O—$(CH_2)_o$—$C_5$-$C_8$cycloalkyl, —$CH_2$—O—$(CH_2)_o$—$C_6$-$C_{10}$aryl, $C_1$-$C_9$ perfluoroalkyl, —$CH_2$—O—$C_1$-$C_{10}$perfluoroalkyl, —$CH_2$—O—$C_6$-$C_{10}$aryl which is unsubstituted or substituted by $C_1$-$C_4$alkyl, $C_1$-$C_4$alkoxy or by Cl;
$R_8$ is hydrogen, $C_1$-$C_8$alkyl, (CO)O—$R_{15}$ or CN;
$R_9$ is hydrogen or (CO)O—$R_{15}$;
or $R_8$ and $R_9$ are together —$(CH_2)_w$—, —CH=CH—$CH_2$—, —(CO)—O—(CO)—, —(CO)—N($R_{16}$)—CO— or

$R_{10}$ is hydrogen, $C_1$-$C_8$-alkyl or —$SO_3^-E^+$;
$R_{11}$ is hydrogen;
or $R_{10}$ and $R_{11}$ together are —O—$CH_2CH_2$—O—;
$R_{12}$ and $R_{13}$ independently of each other are $C_1$-$C_4$-alkyl, vinyl, phenyl or $C_1$-$C_4$alkoxy;
$R_{14}$ is hydrogen, $CH_2Br$, $CH_2Cl$ or I;
$R_{15}$ is hydrogen $C_1$-$C_4$-alkyl or benzyl;
$R_{16}$ is $C_1$-$C_4$alkyl or phenyl;
w is an integer 3-10;
E is a cation; and
Z is $CH_2$ or O.

Further subject of the invention is an oligomer or polymer of the formula Ia as described above.

Interesting is an oligomer or polymer of the formula Ia as described above, wherein z is 0;
y is 0 or is an integer between m, as defined in claim 2, and 20 fold m;
$R_1$ is $C_1$-$C_4$-alkyl;
$R_2$ is $C_1$-$C_4$-alkyl;
X is a direct bond, $C_1$-$C_{10}$-alkylene, —(CH$_2$)$_o$—O(CO)—CH$_2$—* or

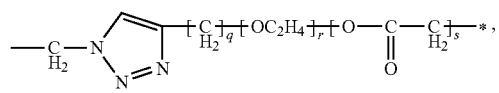

wherein the asterisk denotes the bond to the bisacylphosphine oxide moiety;
o and q are 1;
r is 0;
s is 0;
A is

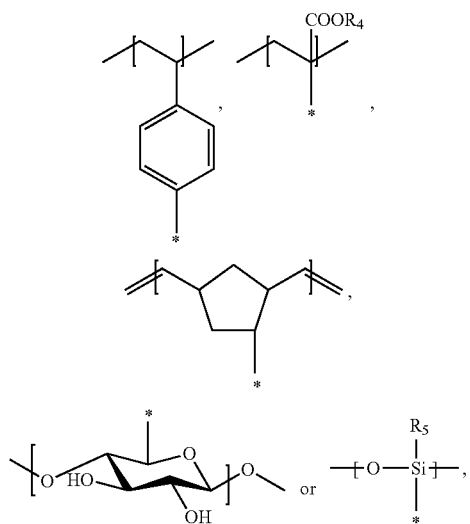

wherein the asterisk denotes the bond to X;
$B_1$ is

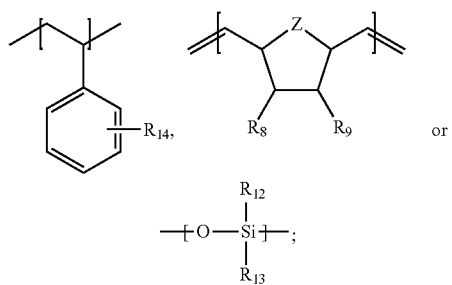

wherein A and $B_1$ are incorporated into the same polymer backbone via random or block polymerization;
$R_4$ is $C_1$-$C_4$alkyl;
$R_5$ is methyl, phenyl or ethoxy;
$R_8$ is hydrogen;
$R_9$ is hydrogen;

$R_{12}$ and $R_{13}$ independently of each other are $C_1$-$C_4$-alkyl, vinyl or $C_1$-$C_4$alkoxy;
$R_{14}$ is hydrogen, CH$_2$Br or I; and
Z is CH$_2$.

End-groups not precisely defined in the formula I and Ia, but represented by an asterix are clear to the person skilled in the art. Such groups depend on the corresponding polymer backbone A and the kind of polymerization initiator which has been used for the preparation. Examples are hydrogen, the corresponding polymerizable group, e.g. —CH=CR—COOR', —CH=CH(C$_6$H$_5$), or the corresponding intitiator radical, e.g. C$_6$H$_5$CO— (derived from the benzoylperoxide), NC—(CH$_3$)$_2$— (derived from AIBN) etc. This list is by no means exhaustive, the end groups may further vary, e.g. in defined controlled polymerization reactions, etc.

m in the compounds of formula I and Ia is an integer equal or greater than 2, for example m is an integer 2-2000, 2-1200, 3-200, 3-1200, 50-2000, 50-1200, 100-2000, 100-1200, 150-2000 or 150-1200.

y and z independently of each other are an integer 0-15000; for example 0-10000; 0 or 500-10000; 0 or 1000-10000; 0 or 2000-9500; 0 or 2500-9500.

z preferably is 0; and y in particular has one of the meanings given above.

o, p and q independently of each other are an integer 1-4, for example 1, 2 or 3, e.g. 1 or 2, preferably o, p and q are 1.

r is an integer 0-2, for example 0 or 1, especially r is 0.
s is 0 or 1, in particular s is 0.
t is an integer 1 or 2.

A is the repeating unit of an oligomer or polymer backbone, for example

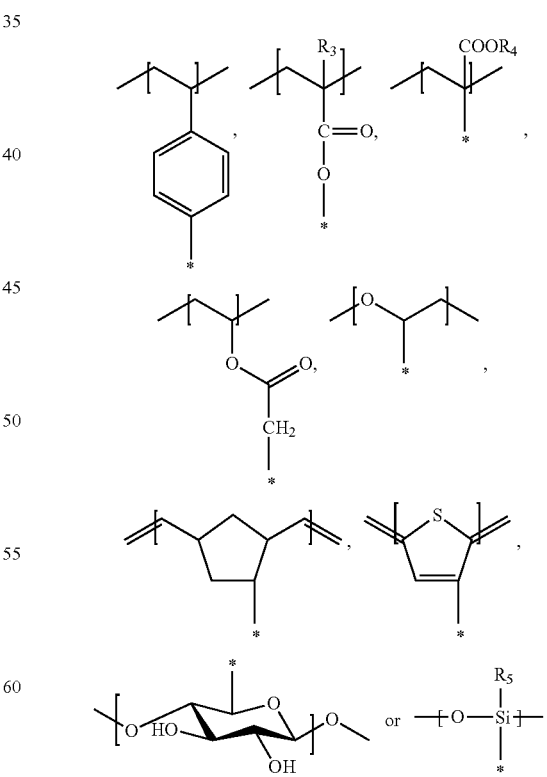

wherein the asterisk denotes the bond to X; or A is a multi-functional oligomer unit, for example

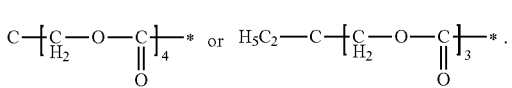

Interesting are

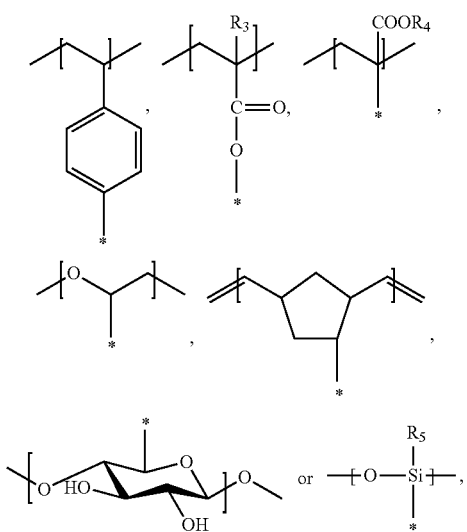

in particular

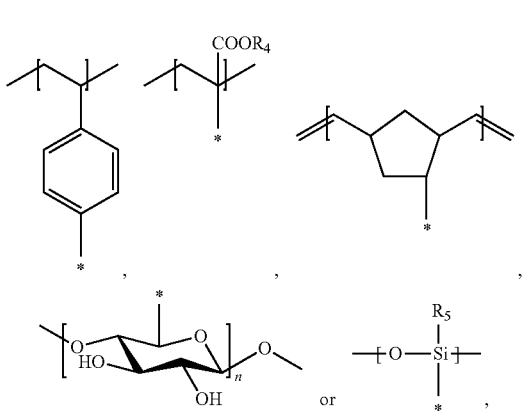

wherein the asterisk denotes the bond to X.

X is a direct bond or a spacer group. Examples of suitable spacer groups X are $C_1$-$C_{10}$-alkylene, —$(CH_2)_o$—NH—CO—O—$(CH_2)_p$—*, —$(CH_2)_o$—NH—CO—O—$CH_2$—CHOH—$CH_2$—*, —$(CH_2)_o$—NH—CO—NH—$(CH_2)_p$—*, —$(CH_2)_o$—NH—CO—S—$(CH_2)_p$—*, —$(CH_2)_o$—O—CO—$CHR_3$—$CH_2$—NH—$(CH_2)_p$—*, *—$(CH_2)_o$—O—CO—$CHR_3$—$CH_2$—NH—$(CH_2)_p$—, —$(CH_2)_o$—CO—O—$(CH_2)_p$—*, —$(CH_2)_o$—O—CO—$CHR_3$—$CH_2$—S—$(CH_2)_p$—*, *—$(CH_2)_o$—O—CO—$CHR_3$—$CH_2$—S—$(CH_2)_p$—, —$(CH_2)_o$—O—CO—CH(COCH_3)—$CH_2$—C(COOR_3)$CH_2$—*, —$(CH_2)_o$—NH—$CH_2$—$CH_2$—C(COOR_3)$CH_2$—*, —$(CH_2)_o$—S—$CH_2$—$CH_2$—C(COOR_3)$CH_2$—*, —$(CH_2)_o$—O—CO—CH(COCH_3)—$CH_2$—$CHR_3$—CO—O—$(CH_2$—$CH_2$—O)_t(CO)$CH_2$—*, —$(CH_2)_o$—NH—$CH_2$—$CHR_3$—CO—O—$(CH_2$—$CH_2$—O)_t(CO)$CH_2$—*, —(CH)_o—S—$CH_2$—$CHR_3$—CO—O—$CH_2$—$CH_2$—*, —$(CH_2)_o$—S—$CH_2$—$CHR_3$—CO—O—$(CH_2$—$CH_2$—O)_t(CO)$CH_2$—*, —$(CH_2)_o$—NH—$CH_2$—$CHR_3$—CO—O—$CH_2$—$CH_2$—*, —$(CH_2)_o$—O—CO—CH(COCH_3)—$CH_2$—$CHR_3$—CO—O—$CH_2$—$CH_2$—*, —$(CH_2)_o$—CO—O—$CH_2$—CHOH—$CH_2$—*, —$(CH_2)_o$—O(CO)—$CH_2$—*, —($CH_2CH_2O)_t$—(CO)—$CH_2$—*, —$(CH_2)_o$—CHOH—$CH_2$—O(CO)—$CH_2$—*, or

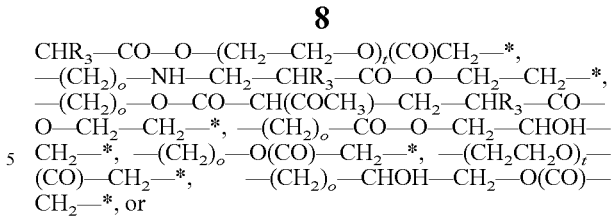

wherein the asterisk denotes the bond to the bisacylphosphine oxide moiety

Interesting spacer groups X are $C_1$-$C_{10}$-alkylene, —$(CH_2)_o$—NH—CO—O—$(CH_2)_p$—*, —$(CH_2)_o$—NH—CO—NH—$(CH_2)_p$—*, —$(CH_2)_o$—NH—CO—S—$(CH_2)_p$—*, —$(CH_2)_o$—O—CO—$CHR_3$—$CH_2$—NH—$(CH_2)_p$—*, *—$(CH_2)_o$—O—CO—$CHR_3$—$CH_2$—NH—$(CH_2)_p$—, —$(CH_2)_o$—CO—O—$(CH_2)_p$—, —$(CH_2)_o$—O—CO—$CHR_3$—$CH_2$—S—$(CH_2)_p$—*, *—$(CH_2)_o$—O—CO—$CHR_3$—$CH_2$—S—$(CH_2)_p$—, —$(CH_2)_o$—NH—$CH_2$—$CH_2$—C(COOR_3)$CH_2$—*, —$(CH_2)_o$—S—$CH_2$—$CH_2$—C(COOR_3)$CH_2$—*, —$(CH_2)_o$—NH—$CH_2$—$CHR_3$—CO—O—$(CH_2$—$CH_2$—O)_t(CO)$CH_2$—*, —$(CH_2)_o$—S—$CH_2$—$CHR_3$—CO—O—$(CH_2$—$CH_2$—O)_t(CO)$CH_2$—*, —$(CH_2)_o$—CO—O—$CH_2$—CHOH—$CH_2$—*, —$(CH_2)_o$—O(CO)—$CH_2$—*, —($CH_2CH_2O)_t$—(CO)—$CH_2$—*, or

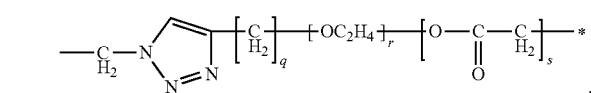

wherein the asterisk denotes the bond to the bisacylphosphine oxide moiety.

In particular X denotes a direct bond, $C_1$-$C_{10}$-alkylene, —$(CH_2)_o$—O(CO)—$CH_2$—* —$(CH_2)_o$—NH—$CH_2$—$CH_2$—C(COOR_3)$CH_2$—*, —$(CH_2)_o$—S—$CH_2$—$CH_2$—C(COOR_3)$CH_2$—* or

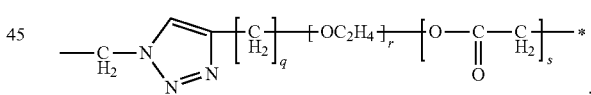

wherein the asterisk denotes the bond to the bisacylphosphine oxide moiety.

$B_1$ and $B_2$ independently of each other are

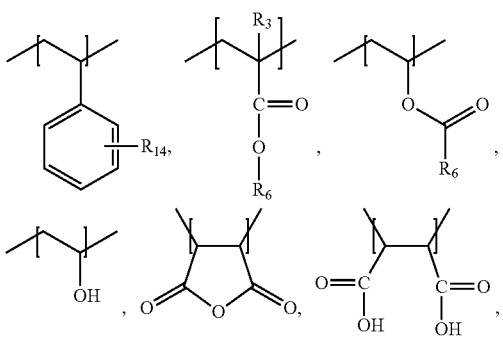

-continued

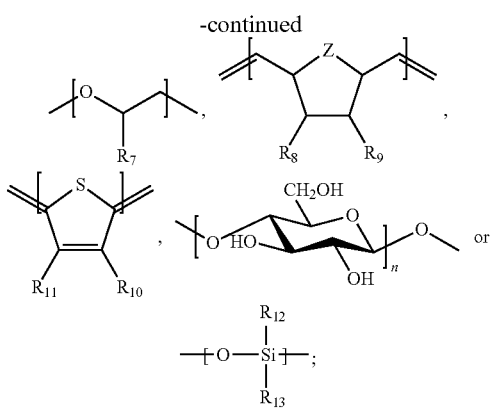

Interesting groups $B_1$ and $B_2$ are

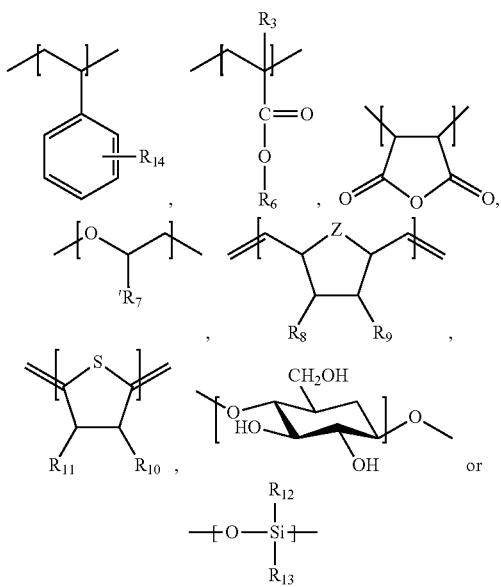

$B_1$ and $B_2$ especially are

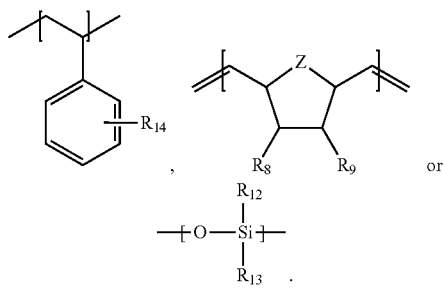

In the polymer or oligomer of the present invention the units A, $B_1$ and $B_2$ are incorporated into the same polymer backbone via random or block polymerization. The distribution of the groups in the final polymer is statistical.

Interesting are polymer or oligomers, comprising only units A, as well as such polymers or oligomers which besides the units A comprise units $B_1$ and $B_2$, e.g. polymers or oligomers besides the units A comprising units $B_1$.

$R_1$ is $C_1$-$C_4$-alkyl, $C_1$-$C_4$-alkoxy or Cl, for example $R_1$ is $C_1$-$C_4$alkyl or $C_1$-$C_4$alkoxy.

$R_2$ is hydrogen, $C_1$-$C_4$-alkyl, $C_1$-$C_4$-alkoxy or Cl, for example $R_2$ is $C_1$-$C_4$alkyl or hydrogen. In case that $R_1$ is $C_1$-$C_4$alkoxy, $R_2$ preferably is hydrogen. In particular $R_1$ and $R_2$ are $C_1$-$C_4$-alkyl.

$R_3$ is hydrogen or methyl.

$R_4$ is $C_1$-$C_4$alkyl, especially methyl or ethyl, in particular ethyl. $R_5$ is methyl, phenyl or ethoxy.

$R_6$ is $C_1$-$C_{10}$alkyl or $C_1$-$C_9$ perfluoroalkyl;

Preferred as $R_6$ is $C_1$-$C_4$-alkyl.

$R_7$ is $C_1$-$C_{10}$alkyl, —$CH_2$—O—$C_1$-$C_{10}$alkyl, —$CH_2$—O—$C_1$-$C_{10}$cycloalkyl-alkylidenyl-, $C_1$-$C_9$ perfluoroalkyl, —$CH_2$—O—$C_1$-$C_{10}$perfluoroalkyl, —$CH_2$—O—$C_6$-$C_{10}$aryl which is unsubstituted or substituted by $C_1$-$C_4$alkyl, $C_1$-$C_4$alkoxy or by Cl.

Preferred as $R_7$ is —$CH_2$—O—$C_1$-$C_{10}$alkyl, $CH_2$—O—$C_6$-$C_{10}$aryl which is unsubstituted or substituted by $C_1$-$C_4$alkyl or $C_1$-$C_4$alkoxy. $R_8$ is hydrogen, $C_1$-$C_8$alkyl, (CO)O—$R_{15}$ or CN; for example $R_8$ is hydrogen or $C_1$-$C_4$alkyl, in particular hydrogen;

$R_9$ is hydrogen or (CO)O—$R_{15}$, in particular hydrogen;

or $R_8$ and $R_9$ are together —$(CH_2)_w$—, —CH═CH—$CH_2$—, —(CO)—O—(CO)—, —(CO)—N($R_{16}$)—CO— or

for example $R_8$ and $R_9$ are together —$(CH_2)_w$— or —CH═CH—$CH_2$—, in particular —$(CH_2)_w$—.

w is an integer 3-10, for example 3-8, 3-5, in particular 3 or 4, especially 3.

$R_{10}$ is hydrogen, $C_1$-$C_8$-alkyl or —$SO_3^-E^+$, especially hydrogen or $C_1$-$C_8$-alkyl, in particular hydrogen.

E in the group —$SO_3^-E^+$ is a cation, in particular for example an alkali metal ion, e.g. Na, K or Li, or an ammonium cation, $NH_4^+$ as well as corresponding mono-, di, tri or tetraalkylalkylammonium cations, such as for example trimethylammonium, tetramethylammonium, tetrabutylammonium, tetradecylammonium, trimethyl-n-cetylammonium, trimethylhydroxymethylammonium, etc.;

$R_{11}$ is hydrogen;

or $R_{10}$ and $R_{11}$ together are —O—$CH_2CH_2$—O—;

$R_{12}$ and $R_{13}$ are for example $C_1$-$C_4$-alkyl, vinyl, phenyl or $C_1$-$C_4$alkoxy.

$R_{14}$ is hydrogen, $CH_2Br$, $CH_2Cl$ or I, in particular hydrogen, $CH_2Br$ or I.

$R_{15}$ is hydrogen, $C_1$-$C_4$-alkyl, benzyl.

$R_{16}$ is $C_1$-$C_4$alkyl or phenyl.

Z is $CH_2$ or O, in particular $CH_2$.

$C_1$-$C_{10}$alkyl is linear or branched and is, for example $C_1$-$C_9$-, $C_1$-$C_6$- or $C_1$-$C_4$alkyl. Examples are methyl, ethyl, propyl, isopropyl, n-butyl, sec-butyl, isobutyl, tertbutyl, pentyl, hexyl, heptyl, 2,4,4-trimethylpentyl, 2-ethylhexyl, octyl, Nonyl or decyl. $C_1$-$C_8$alkyl and $C_1$-$C_4$alkyl have the same meanings as given above for $C_1$-$C_{10}$alkyl up to the corresponding number of C-atoms.

In the radical —$CH_2$—O—$C_1$-$C_{10}$alkyl the $C_1$-$C_{10}$alkyl is defined as given above. $C_1$-$C_{10}$perfluoroalkyl is for example $C_1$-$C_9$-, $C_1$-$C_8$-, $C_1$-$C_6$- or $C_1$-$C_4$ perfluoroalkyl. It means $C_1$-$C_{10}$-, $C_1$-$C_9$-, $C_1$-$C_8$-, $C_1$-$C_6$- or $C_1$-$C_4$alkyl, which is linear or branched and defined as above and wherein the hydrogen atoms are replaced completely by fluor atoms. A preferred example is trifluoromethyl.

In the radical —CH$_2$—O—C$_1$-C$_{10}$perfluoroalkyl the perfluoroalkyl is defined as given above. C$_1$-C$_4$alkoxy is linear or branched and is for example methoxy, ethoxy, propoxy, iso-propoxy, n-butyloxy, sec-butyloxy, iso-butyloxy or tert-butyloxy.

C$_5$-C$_8$Cycloalkyl, e.g. in the radical —CH$_2$—O—(CH$_2$)$_o$—C$_5$-C$_8$cycloalkyl, is for example cyclopentyl, cyclohexyl or cyclooctyl.

In the radical CH$_2$—O—C$_6$-C$_{10}$aryl and —CH$_2$—O—(CH$_2$)$_o$—C$_6$-C$_{10}$aryl the C$_6$-C$_{10}$aryl is for example phenyl or naphthyl, e.g. 1-naphthyl or 2-naphthyl, preferably phenyl.

Substituted C$_6$-C$_{10}$aryl is for example substituted one to five times, e.g. once, twice or three times, in particular once or twice. Substituents at the phenyl ring are for example situated in the 2, 3 or 4 position or in the 2,4-, 2,6- or 2,4,6-position of the phenyl ring. The substituents are as defined above.

If R$_8$ and R$_9$ are together —(CH$_2$)$_w$—, —CH=CH—CH$_2$—, —(CO)—O—(CO)—, —(CO)—N(R$_{16}$)—CO— or

for example structures like the following are formed

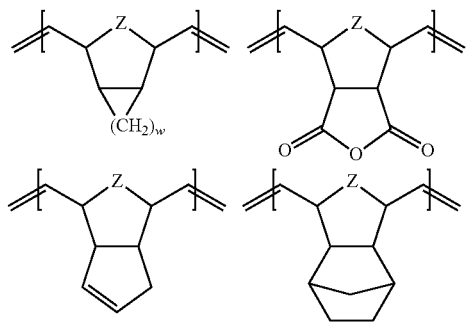

If R$_{10}$ and R$_{11}$ together are —O—CH$_2$CH$_2$—O—, the following structure is formed

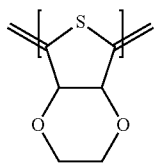

C$_1$-C$_{10}$alkylene is linear or branched alkylene, for example methylene, ethylene, propylene, 1-methylethylene 1,1-dimethylethylene, butylene, 1-methylpropylene, 2-methylpropylene, pentylene, hexylene, heptylene, octylene, nonylene or decylene. The terms "and/or" or "or/and" in the present context are meant to express that not only one of the defined alternatives (substituents) may be present, but also several of the defined alternatives (substituents) together, namely mixtures of different alternatives (substituents). The term "at least" is meant to define one or more than one, for example one or two or three, preferably one or two. The term "optionally substituted" means, that the radical to which it refers is either unsubstituted or substituted. Throughout this specification and the claims which follow, unless the context requires otherwise, the word "comprise", or variations such as "comprises" or "comprising", will be understood to imply the inclusion of a stated integer or step or group of integers or steps but not the exclusion of any other integer or step or group of integers or steps.

The term "(meth)acrylate" in the context of the present application is meant to refer to the acrylate as well as to the corresponding methacrylate.

The preferences referring to the compounds of the formula I, Ia and II as given hereinbefore and in the context of the whole text, are intended not to refer to the compounds as such only, but to all categories of the claims. That is to the compositions, comprising the compounds as well as the use or process claims in which said compounds are employed.

Bisacylphosphine oxide (BAPO) functionalized polymers can principally for example be obtained using either of two concepts.

1) Polymer synthesis concept: =synthesis via polymerization or co-polymerization of BAPO derivatives possessing a polymerizable functional group.

The BAPO-functionalized polymer is synthesized via the (co-)polymerization of a BAPO-derivative (the "BAPO-monomer") carrying a suitable functional group that can undergo a polymerisation, polyaddition or polycondensation reaction alone or with other monomers capable of reaction in the same polymerization, polyaddition or polycondensation process. As a polymerization, polyaddition or polycondensation process any such process used in polymer chemistry and known to those skilled in the art can be used, possibly using a suitable polymerization, polyaddition or polycondensation initiator or catalyst, provided that the reaction conditions are compatible with the BAPO functionality. Thus a light induced polymerization process using light in the range of 200-500 nm is excluded, since the BAPO moiety would undergo a photoreaction under these conditions. In this concept, low-molecular co-polymerizable BAPO derivatives are used as starting material.

According to this method, a BAPO compound carrying a reactive group linked via a suitable spacer to the phosphorous atom, is used as a monomer unit in a homopolymerization or a co-polymerization reaction. Typical but not limiting examples for such processes are radical polymerization, cationic polymerization, ring-opening metathesis polymerization (ROMP), polymerization of thiophene derivatives via electrochemical oxidation, Michael addition or siloxane polycondensation. Depending on the type of the functional groups used, any of the known technologies for a certain polymerization process can be used. Typical but not limiting examples for such technologies are in the case of radical co-polymerization random polymerization or controlled polymerization using any of the known technologies for controlled polymerization such as ATRP, NOR etc. Depending on the technology which is used, polymers of different characteristic can be prepared, e.g. random polymers, block polymers or brush-type polymers. If a copolymerization is performed, one or more additional polymerizable monomers not carrying a BAPO group are used in addition to the BAPO-monomer. Alternatively, one or more different BAPO monomers may be copolymerized, possibly with non-BAPO monomers. By the proper selection of the type and ratio of the additional monomer compounds, BAPO-functionalized polymers with different properties, such as linear polymers (if monofunctional monomers are used), polymer networks (if multifunctional monomers are used), polymers soluble or insoluble in defined solvents, liquid or solid polymers, as well polymers with different polarity, viscosity, compatibility with other components etc. are obtained. Such optimization of the polymer properties is well known to those skilled in the art. Moreover, using appropriate polymerization techniques, such as e.g. controlled polymerization, polymers with a narrow molecular weight distribution extending from oligomers (a few monomer units) to polymers (a large number of polymer units) can be prepared. These techniques are well known to those skilled in the art, producing polymers with different properties such as viscosity. See for example C. J. Hawker, Acc. Chem. Res. 1997, 30, 373; K. Matyjaszewski, J. Xia Chem. Rev. 2001, 101, 2921; W. A. Braunecker, K. Matyjaszewski Prog. Polym. Sci. 2007, 32, 93; G. Moad, E. Rizzardo, S. H. Tang, Acc. Chem. Res. 2008, 41, 1133. Since this concept is dealing with the synthesis of a new polymer by a polymerization process, it can be considered as a new polymer synthesis.

The above described reactions for example follow the general scheme given below:

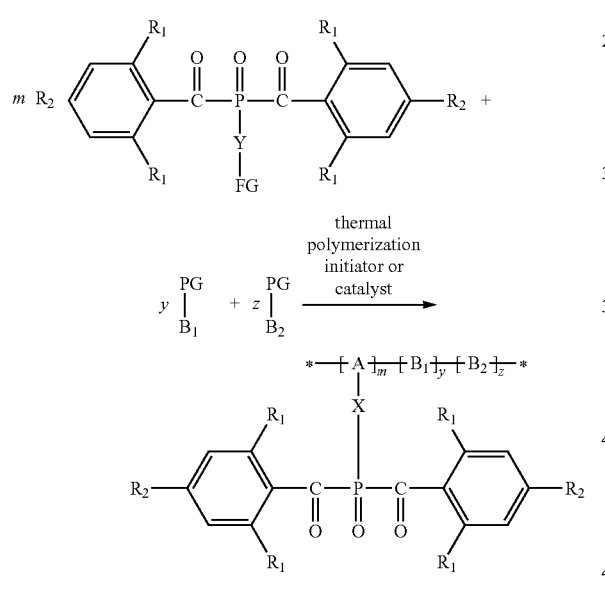

$R_1$, $R_2$, $R_3$, m, y, z, X, A, $B_1$ and $B_2$ are defined as above, while the definitions of Y and FG are given below (see formula II). PG refers to a polymerizable group, which is compatible, that is reactive, with FG.

Typical, but non-limiting, examples for BAPO compounds carrying a substituent that can undergo a polymerization or polycondensation reaction are e.g. (meth)acrylate-substituted BAPOs, vinylester-substituted BAPOs, epoxide-substituted BAPOs, norbornene-substituted BAPOs, thiophene-substituted BAPOs or siloxane-substituted BAPOs:

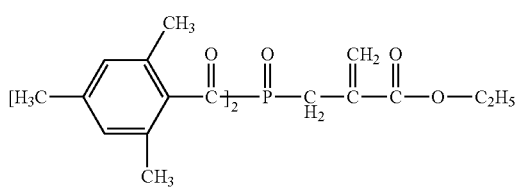

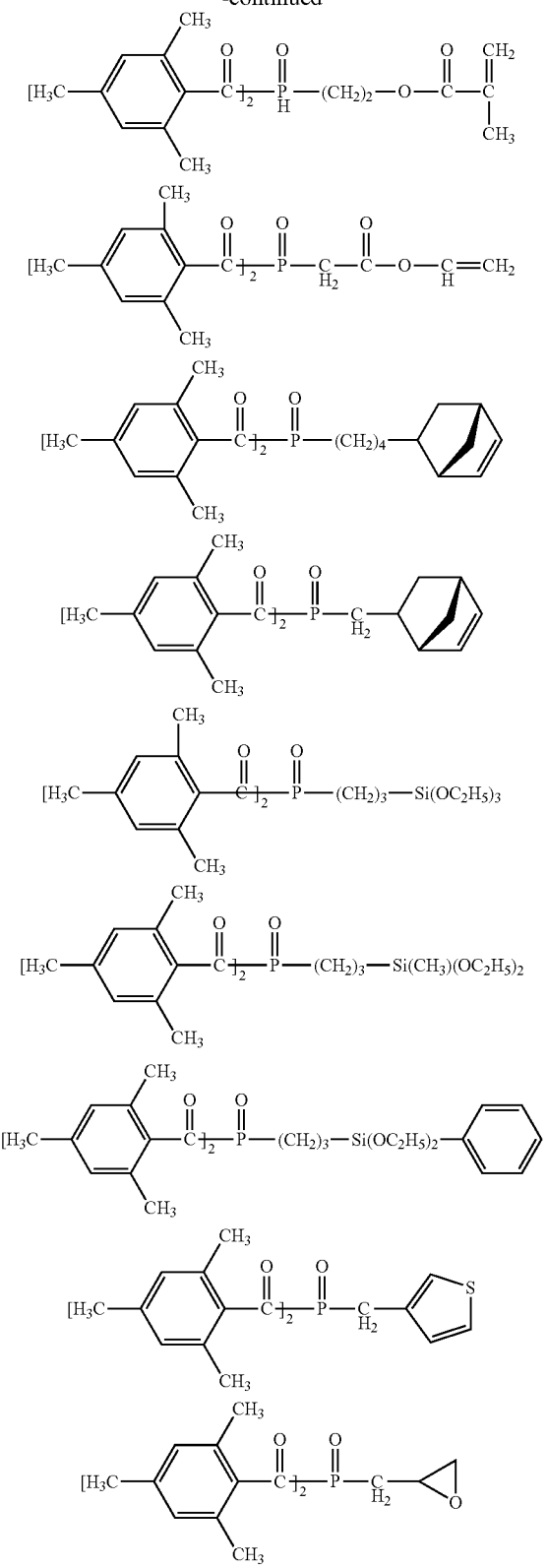

Typical examples for polymerizations and copolymerizations performed using such monomers are ROMP copolymerization of a norbornene-substituted BAPO with norbornene:

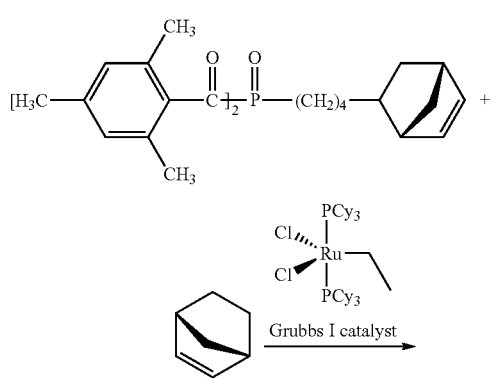

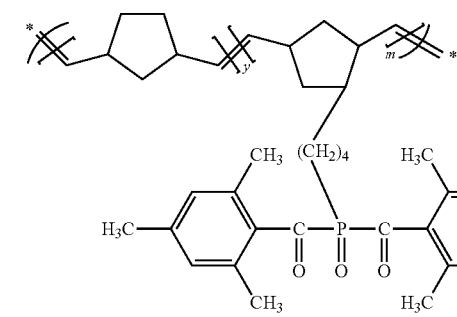

AIBN (azobis isobutyro nitrile) induced radical homopolymerization of a methacrylate-substituted BAPO

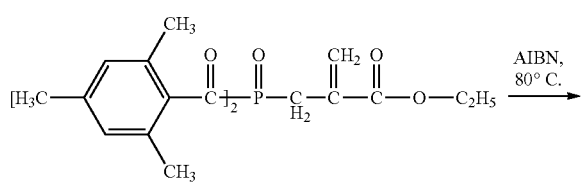

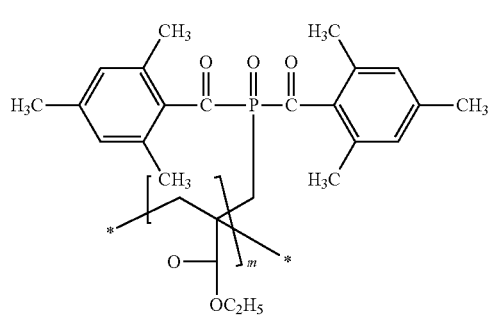

Homopolymerization of a thiophene substituted BAPO by electrochemical oxidation

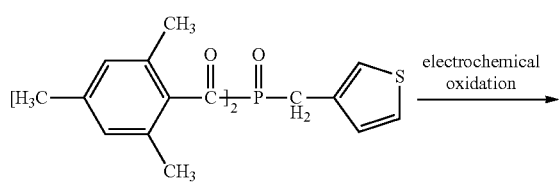

-continued

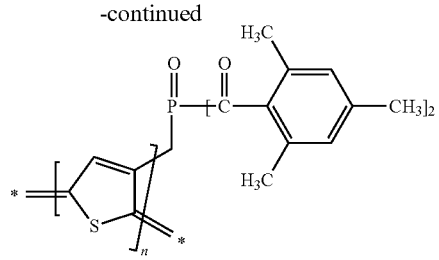

Acid-catalyzed co-condensation of siloxane substituted BAPO with siloxanes

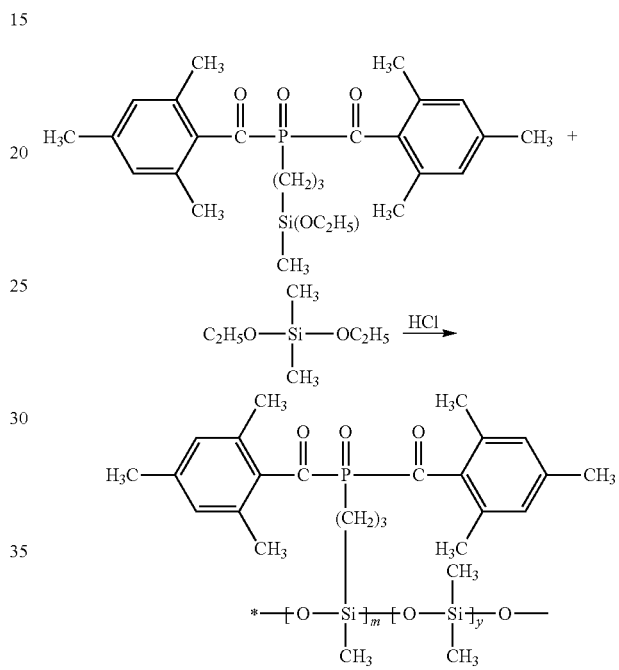

2) Surface modification concept: A BAPO-functionalized polymer is obtained when a polymer is reacted under suitable conditions in a way that BAPO groups are linked to the polymer backbone via said reaction.

There are two different methods to be used in order to produce a BAPO-functionalized polymer via surface modification of a polymer:

2a) Modification of a preformed polymer possessing reactive groups suitable to participate in the BAPO synthesis When the polymer has suitable functional groups that allow reaction in any of the known BAPO synthesis, the polymer can be used as a reagent for the BAPO synthesis, which is performed on the polymer backbone. In this concept, no low molecular BAPO compounds are used. The preformed polymer possessing functional groups (1) is used as reactant (=alkylating agent) for the reaction with a phosphoenolate ((2), synthesis of this compound as described in WO 06/056541, example 1a-1c). Thus, in this approach the functionalized polymer is a reagent in the synthesis of the BAPO structure. Depending on the functional group on the polymer, the reaction is performed with or without using a suitable catalyst.

Since this concept is dealing with a pre-formed polymer, it can be considered as a surface modification technique. The reaction follows the general scheme:

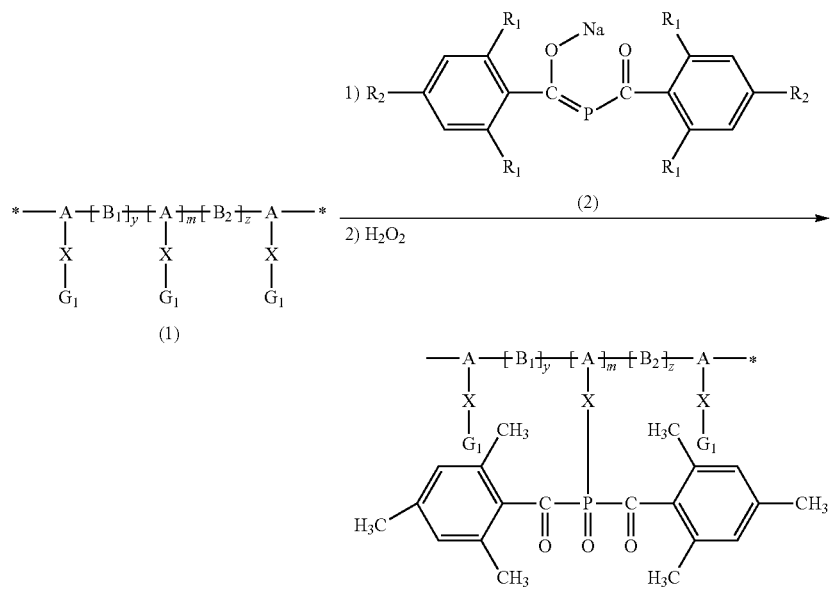

A, $B_1$, $B_2$, $R_1$, $R_2$, X, y, m, z are defined as above;

$G_1$ is halogen, $-OSO_2-C_1-C_4$alkyl, $-OSO_2$-phenyl or $-OSO_2$-naphthyl, wherein the phenyl or naphthyl optionally are substituted once or twice by $C_1-C_4$alkyl.

A in particular is $-C_6H_4-CH_2-$ or $-C_6H_4-$, while $G_1$ in particular denotes Cl, Br or I.

Typical examples are the reaction of poly(bromomethylstyrene) which is directly reacted with the phosphoenolate (2) or poly(iodostyrene) which is reacted with (2) in the presence of a suitable palladium catalyst (see specific examples 52 and 53 below.

2b) Hooking of functionalized BAPO derivatives onto a polymer carrying suitable reactive groups When a low-molecular BAPO is functionalized with suitable reactive groups that are capable to react with suitable functional groups on the polymer, the functionalized BAPO can be reacted with the polymer to give BAPO-functionalised polymers. In this concept, low-molecular functioanlized BAPO compounds are used.

This concept uses BAPO derivatives carrying a reactive functional group $E_1$ that is capable to undergo a chemical reaction with a second reactive functional group $E_2$ bound to the polymer. Any reaction between $E_1$ and $E_2$ that is capable to form a stable new bond or linking group ($E_3$) between the two reactive groups is suitable for this transformation. The polymer carrying the functional groups $E_2$ may be of any type known to those skilled in the art. It may be a linear polymer such as for example a homopolymer, a random copolymer, a block polymer, a telechelic polymer, or it may be a non-linear polymer such as a grafted polymer, a comb polymer, a dendritic polymer, a dendrimer or silsesquioxane. Depending on the number of repeating units, the moiety carrying the functional groups $E_2$ is for example a polymer, an oligomer or a multifunctional molecule.

Since also this concept is dealing with a pre-formed polymer, it is considered as a surface modification technique. The reaction follows the general scheme:

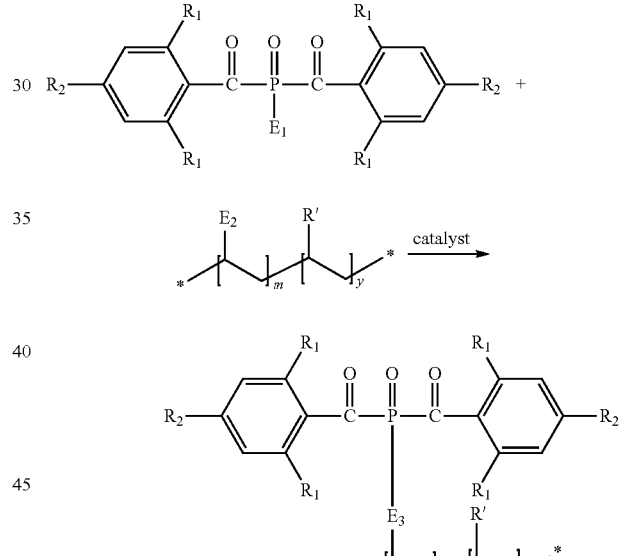

Typical but non-limiting examples are the condensation reaction of the siloxane group in a siloxane-substituted BAPO derivative with hydroxyl groups on a polymer or the copper-catalyzed cycloaddition reaction of the alkyne triple bond in an alkyne substituted BAPO with an azido group on a polymer ("click-reaction"), the Michael addition of a BAPO compound carrying amino or thiol functional groups to (meth)acrylate double bonds bound to a polymer backbone (Michael addition), or the transesterification reaction of BAPO compounds substituted by an ester group with a polymer carrying hydroxyl groups, or inversely of a BAPO compound carrying hydroxyl groups with a polymer substituted by ester groups.

Subject of the invention further are bisacylphoshphine oxide compounds, which carry suitable groups at the P-atom to undergo reactions as described above.

Preferably said compounds are of the formula (II)

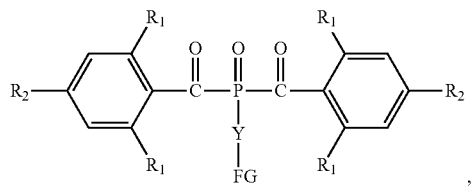
(II)

wherein $R_1$ is $C_1$-$C_4$-alkyl, $C_1$-$C_4$-alkoxy or Cl;

$R_2$ is H, $C_1$-$C_4$-alkoxy or Cl:

Y is —$(CH_2)_a$— or —$CH_2$—CHOH—$CH_2$—;

a is an integer 1-10;

FG is Cl, Br, OH, SH, $NH_2$, $N_3$, COOH, COO⁻E⁺, $COOCH_3$, $COONH_2$,

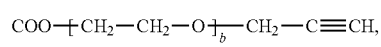

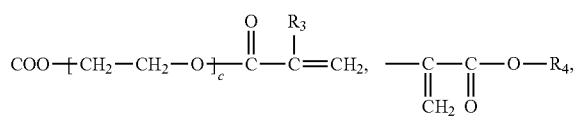

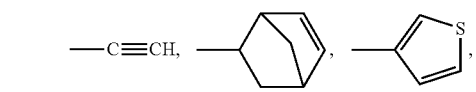

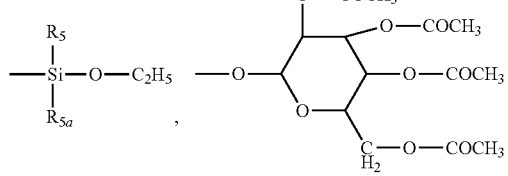

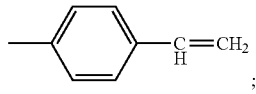

b is 0, 1 or 2;

c is 1 or 2;

$R_3$ is hydrogen or methyl;

$R_4$ is $C_1$-$C_4$alkyl, in particular ethyl;

$R_5$ and $R_{5a}$ independently of each other are methyl, phenyl or ethoxy;

E is a cation;

provided that, if n is 1, FG is not $COOCH_3$ or

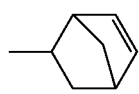

Further interesting is the use of compounds of the formula (IIa)

(IIa)

wherein $R_1$ is $C_1$-$C_4$-alkyl, $C_1$-$C_4$-alkoxy or Cl;

$R_2$ is H, $C_1$-$C_4$-alkoxy or Cl:

Y is —$(CH_2)_a$— or —$CH_2$—CHOH—$CH_2$—;

a is an integer 1-10;

FG is Cl, Br, OH, SH, $NH_2$, $N_3$, COOH, COO⁻E⁺, $COOR_{17}$, CH=$CH_2$,

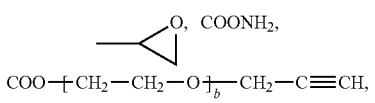

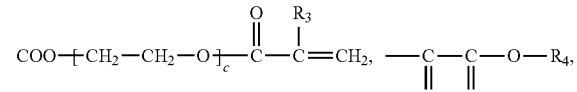

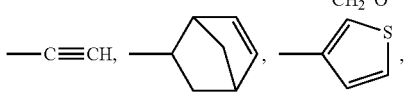

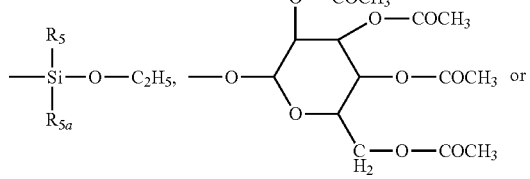

b is 0, 1 or 2;

c is 1 or 2;

$R_3$ is hydrogen or methyl;

$R_4$ is $C_1$-$C_4$alkyl, in particular ethyl;

$R_5$ and $R_{5a}$ independently of each other are methyl, phenyl or ethoxy;

E is a cation, in particular Na, K or Li;

$R_{17}$ is $C_1$-$C_4$alkyl or CH=$CH_2$;

for the preparation of polymers or oligomers of the formula I as defined above; as well as the use of compounds of the formula II as defined above for the preparation of polymers or oligomers of the formula I as defined above.

The compounds of the formula II and IIa are for example prepared according to the process as described in WO 06/056541.

The process comprises the steps a) contacting elemental phosphorous [P]∞, P(Hal)₃ or other phosphorous compounds in which the formal oxidation state of the phosphorous atom is higher than (−3) with a reducing metal optionally in the presence of a catalyst or an activator in a solvent to obtain metal phosphides $Me_3P$ or $Me'_3P_2$, wherein Me is an alkali metal and Me' is an earth alkali metal to obtain metal polyphosphides, b) optionally adding a proton source, optionally in the presence of a catalyst or an activator to obtain metal dihydrogen phosphides MePH$_2$;

c) subsequent acylation reaction with m acid halides of formula III or m carboxylic acid esters of formula IV

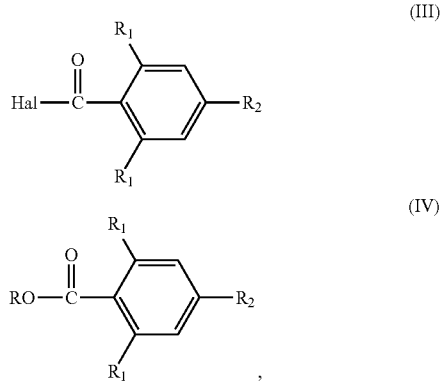

wherein R is the residue of an alcohol and R$_1$ and R$_2$ are as defined above;

d) as alkylation reaction subsequent reaction with an electrophilic agent FG-Y-Hal, FG-Y—OSO$_2$—Y-FG, FG-Y—OSO$_2$alkyl and the like, wherein FG and Y are as defined above and Hal denotes a halogen, e.g. Cl;

to obtain the compounds of formula II, or IIa respectively, as defined above.

Examples of explicit preparation reactions for compounds of the formula II and IIa are given below.

In accordance with the invention, the "Polymer synthesis concept" as described above also is a process for the synthesis of an oligomer or polymer substituted by one or more bisacylphosphine oxide moieties as defined above, characterized in that the product is obtained by homopolymerization or copolymerization of a functionalized bisacylphosphine oxide compound of the formula II as defined above, or by homopolymerization or copolymerization of a functionalized bisacylphosphine oxide compound of the formula IIa as defined above optionally with one or more monomers containing no bisacylphosphine oxide moiety, and optionally using a suitable catalyst.

The term "polymerization" encompasses "polyaddition" and "polycondensation" reactions, as is clear to the person skilled in the art. These persons also are familiar with the choice of compounds having the suitable functional groups for the corresponding intended reaction.

Interesting also is a Process for the preparation of compounds of the formula I, by either a) a polymerization or co-polymerization reaction of compounds of the formula II or IIa as defined above, using a suitable catalyst—"polymer synthesis concept"; or b) by the reaction of the functional group "FG" of compounds of the formula II or IIa as defined above, with a second functional group of an oligomer or polymer backbone, which is capable to react with the functional group on the bisacylphosphine oxide moiety of formula II or formula IIa—"hooking process".

Subject of the invention further is a process for the synthesis of an oligomer or polymer substituted by one or more bisacylphosphine oxide moieties as defined above in accordance with the concept 2b) "Hooking of functionalized BAPO derivatives onto a polymer" carrying suitable reactive groups as disclosed above, characterized in that the product is obtained by the reaction of a functional group "FG" in a bisacylphosphine oxide compound of formula II or IIa as defined above, with a second functional group on a polymer or copolymer backbone capable of reacting with the functional group on the bisacylphosphine oxide compound, optionally using a suitable catalyst.

Further subject of the invention in accordance with the concept 2a) "Modification of a preformed polymer" as described above is a process for the synthesis of an oligomer or polymer substituted by one or more bisacylphosphine oxide moieties as above, characterized in that the product is obtained by the reaction of a symmetric or unsymmetric metal bisacylphosphide oxide with a functional group on a polymer or copolymer backbone capable of reacting with the metal bisacylphosphide, followed by oxidation with a suitable oxidation agent.

Suitable corresponding symmetric or unsymmetric metal bisacylphosphide oxides are for example described in WO 06/056541 (see in particular the compounds of claims 5 and 6 of WO 06/056541).

The invention encompasses BAPO-functionalized polymers with both organic (e.g. polystyrene, polynorbornene, poly acrylates, polythiophenes) and inorganic polymeric backbones (e.g. polysiloxanes). Besides synthetic polymers also bio-polymers (e.g. cellulose) can be used as polymer backbone which is functionalized with BAPO groups.

Polymers in the sense of this patent application are meant to encompass oligomers (possessing a small number, at least two, of repeating units) as well as polymers (possessing a large number of repeating units).

Interesting are polymers or oligomers which have a high compatibility with the constituents or radically polymerizing formulations, such as binders, reactive diluents and crosslinkers. Preferred are also polymers or oligomers with a viscosity that allows for convenient handling of the material (for example smaller or equal than 5000 mPas). Further interesting are for example compounds with a number of repeating units not exceeding 100, especially not exceeding 50.

The term polymer as used here also encompasses homopolymers (only one type of repeating units) or copolymers (with different types of repeating units). If the polymer is a copolymer, this is for example a random copolymer or a block copolymer. A block copolymer comprises the different blocks in the polymer backbone, or some of the blocks form side chains of the polymer backbone (so called brush polymers). This general description of polymers suitable in the context of the present invention is not meant to be limiting, any kind of polymer bearing the corresponding functional groups for the reactions described above is suitable.

It characterises the present invention that the BAPO structure is linked via the phosphorous atom and a suitable spacer (which is not one of the two benzoyl groups!) to the polymer backbone. This characteristic is due to the synthesis of the compound based on the alkylation of phosphoenolates as described above.

The invention in particular encompasses the following classes of bisacylphosphine oxide-functionalized (BAPO-functionalized) polymers: BAPO-functionalized polystyrenes; BAPO-functionalized polynorbornes; BAPO-functionalized polyacrylates; BAPO-functionalized polythiophenes; BAPO-functionalized polysiloxanes; BAPO-functionalized biopolymers; BAPO-functionalized polyepoxides, BAPO-functionalized polyvinylesters and BAPO-functionalized dendritic polymers; in particular BAPO-functionalized polystyrenes; BAPO-functionalized polynorbornes; BAPO-functionalized polyacrylates; BAPO-functionalized polythiophenes; BAPO-functionalized polysiloxanes; BAPO-functionalized biopolymers; BAPO-functionalized polyepoxides and BAPO-functionalized polyvinylesters The BAPO functionalized oligomers and polymers can for example be used for the modification of surface coatings. Surface coatings having photoactive BAPO moieties in the polymer can be modified and/or structured by full exposure or imagewise exposure to light of suitable wavelengths in the presence of polymerizable materials or compounds possessing a functional group that reacts with radicals, resulting in the grafting of molecules or polymer chain onto the irradiated part of the surface. This process for example allows the use of photolithographic technologies for the production of structured surfaces possessing a wide variety of different properties in irradiated/non-irradiated regions.

The BAPO functionalized oligomers and polymers can for example be used for the formation of gels. Said oligomers are capable of gelating non-polar solvents. The physical gelation of polar solvents by suitable solid materials such as amylum is well known and broadly used for the absorption of a large amount of a liquid (e.g. water) by a small amount of a solid (L. A. Estroff et al, Chem. Rev. 2003, 104, 1201). The formation of three-dimensional networks capable to encapsulate a large amount of solvent molecules is based on the strong dipolar interactions between the network structure and the solvent, such as e.g. hydrogen bonds. Since only weak van der Waals bonds occur with non-polar liquids, structures that can efficiently undergo gel formation with non-polar liquids are rare. Use of BAPO functionalized, vinyl substituted polysilanes for example is an approach that allows gelation of non-polar liquids under light irradiation. Acid-catalyzed polycondensation of a siloxane-substituted BAPO derivative with commercially available alkoxyvinyl silanes provides a silicone polymer substituted by both BAPO and vinyl groups, which is easily soluble in non-polar solvents such as benzene or toluene. Irradiation of the solution results in a radical crosslinking of the vinyl groups, resulting in the fast build-up of a three-dimensional polysiloxane network. During this network formation, the non-polar solvent is to a large extent encapsulated in the polysiloxane network structure. The capacity of solvent that can be encapsulated depends on the structure of the network formed, which can be controlled via the ratio of siloxanefunctionalized BAPO/vinyl siloxane and the structure of the corresponding siloxanes. Siloxane structures that give a certain degree of a three-dimensional network formation during the polysiloxane condensation step usually provide a higher capacity than structures that result in linear siloxane polymers. Evaporation of the incorporated solvent under vacuum gives the polyisiloxane network as a solid white powder. This powder is capable to swell again in non-polar solvents, such as chloroform, benzene, toluene, ethyl acetate) while it is unaffected by polar solvents (e.g. water, ethanol, dimethylformamide, dimethylsulfoxide). The capacity for solvent up-take is several time its own weight.

Polythiophenes are well-known for its use as conducting polymers in the fabrication of electronic devices (J. Roncali, Chem. Rev. 1997, 97, 173; H. Sirringhaus et al. Nature 1999, 401, 685) as well as for optical properties responding to environmental stimuli (D. T. McQuade et al. Chem. Rev. 2000, 100, 2537). Functionalization of polythiophenes with BAPO groups for example allows the fixing of the polythiophene polymer onto a carrier material possessing functional groups that can easily react with the photochemically produced phosphinoyl radicals. Further, phosphoranyl radicals can react with the sulfur atoms of the thiophene rings resulting in the interruption of the itconjugated system which is responsible for the conductivity. Thus, polythiophenes possessing a high degree of BAPO functional groups can be patterned by photolithographic processes creating isolating regions in the irradiated areas while leaving conductive structures in the non-irradiated areas.

It is well-known that hydroxyl groups in biopolymers such as cellulose can undergo a condensation reaction with alkoxysilanes to give cellulose-O—$SiR_3$ linkages (M. Castellano et al., J. Coll. Interf. Sci. 2004, 273, 505). If the alkoxysilane is for example substituted by a bisacylphosphine oxide group according to the present invention, this is a simple process that can be used to chemically bond BAPO groups to the biopolymer. Biopolymers which are substituted with BAPO groups can be further functionalized by irradiation in the presence of materials that undergo a reaction with the photochemically produced radicals. Permanent and durable modifications of the biopolymer surface are obtained by the chemical grafting achieved by this process. Of particular interest as biopolymer are cellulose-containing materials such as for example wood, cotton or starch. Materials that are suitable for reaction with the photochemically produced radicals are e.g. (per)fluorinated acryates or (poly)silane containing acrylates. Hydrophilic biopolymer materials such as cotton for example are thus transformed into water-repellent materials as they are for example used for the fabrication of textiles used for outdoor wear and the like.

BAPO-functionalized biopolymers such as cellulose can also be used to achieve covalent bonding of functional moieties, such as dyes, that do not react via a polymerization reaction. Phosphoranyl radicals, produced upon irradiation of a BAPO-modified biopolymer, efficiently add to hydroxyl groups to give phosphonic esters. Alcohols or phenols for example can thus be covalently grafted to the biopolymer via this ester formation, providing chemically stable, covalently grafted molecules. An example is dystuffs possessing a phenolic hydroxyl group such as e.g. phenophthaleine. After the photoinduced grafting process a stable and persistent coloration of the biopolymer is achieved. Since light is used to trigger the grafting process, structured modification can for example easily be obtained via photolithographic processes. Other functional groups suitable to undergo this grafting reaction are disulfides or amines.

Subject of the invention therefore also is the Use of an oligomer or polymer substituted by one or more bisacylphosphine oxide moieties as defined above as photoinitiators, for the functionalization of surfaces and particles either by flood or image-wise irradiation, for the ennoblement of textiles by irradiation in the presence of a suitable monomer or for the photoinduced formation of a gel in an apolar environment.

The BAPO-functionalized oligomers and polymers, in particular the oligomers, of the present invention are for example also employed as photoinitiators in customary photocurable (photopolymerizable) compositions, such as coatings, varnishes, printing inks, adhesives.

Said photocurable compositions usually comprise (A) at least one ethylenically unsaturated photopolymerisable compound and (B) at least oligomer or polymer substituted by one or more bisacylphosphine oxide moieties, in particular a compound of formula I as defined above, as photoinitiator. The composition may comprise additionally to the component (B) at least one further photoinitiator (C) and/or other additives (D).

The person skilled in the art is familiar with suitable materials (A). The unsaturated compounds (A) for example include one or more olefinic double bonds. They are of low (monomeric) or high (oligomeric) molecular mass. Examples of monomers containing a double bond are alkyl or hydroxyalkyl acrylates or methacrylates, for example methyl, ethyl, butyl, 2-ethylhexyl or 2-hydroxyethyl acrylate, isobornyl acrylate, methyl methacrylate or ethyl methacrylate. Interesting also are resins which are modified with silicon or fluor, e.g. silicon acrylates. Other examples are acrylonitrile, acrylamide, methacrylamide, N-substituted (meth)acrylamides, vinyl esters such as vinyl acetate, vinyl ethers such as isobutyl vinyl ether, styrene, alkyl- and halostyrenes, N-vinylpyrrolidone, vinyl chloride or vinylidene chloride.

Examples of monomers containing two or more double bonds are the diacrylates of ethylene glycol, propylene glycol, neopentyl glycol, hexamethylene glycol or of bisphenol A, and 4,4'-bis(2-acryl-oyloxyethoxy)diphenylpropane, trimethylolpropane triacrylate, pentaerythritol triacrylate or tetraacrylate, vinyl acrylate, divinylbenzene, divinyl succinate, diallyl phthalate, triallyl phosphate, triallyl isocyanurate or tris(2-acryloylethyl) isocyanurate.

Examples of polyunsaturated compounds of relatively high molecular mass (oligomers) are acrylisized epoxy resins, acrylisized polyesters, polyesters containing vinyl ether or epoxy groups, and also polyurethanes and polyethers. Further examples of unsaturated oligomers are unsaturated polyester resins, which are usually prepared from maleic acid, phthalic acid and one or more diols and have molecular weights of from about 500 to 3000. In addition it is also possible to employ vinyl ether monomers and oligomers, and also maleate-terminated oligomers with polyester, polyurethane, polyether, polyvinyl ether and epoxy main chains. Of particular suitability are combinations of oligomers which carry vinyl ether groups and of polymers as described in WO 90/01512. However, copolymers of vinyl ether and maleic acid-functionalized monomers are also suitable. Unsaturated oligomers of this kind can also be referred to as prepolymers.

Particularly suitable examples are esters of ethylenically unsaturated carboxylic acids and polyols or polyepoxides, and polymers having ethylenically unsaturated groups in the chain or in side groups, for example unsaturated polyesters, polyamides and polyurethanes and copolymers thereof, alkyd resins, polybutadiene and butadiene copolymers, polyisoprene and isoprene copolymers, polymers and copolymers containing (meth)acrylic groups in side chains, and also mixtures of one or more such polymers. Examples of unsaturated carboxylic acids are acrylic acid, methacrylic acid, crotonic acid, itaconic acid, cinnamic acid, and unsaturated fatty acids such as linolenic acid or oleic acid. Acrylic and methacrylic acid are preferred.

Suitable polyols are aromatic and, in particular, aliphatic and cycloaliphatic polyols. Examples of aromatic polyols are hydroquinone, 4,4'-dihydroxydiphenyl, 2,2-di(4-hydroxyphenyl)propane, and also novolaks and resols. Examples of polyepoxides are those based on the abovementioned polyols, especially the aromatic polyols, and epichlorohydrin. Other suitable polyols are polymers and copolymers containing hydroxyl groups in the polymer chain or in side groups, examples being polyvinyl alcohol and copolymers thereof or polyhydroxyalkyl methacrylates or copolymers thereof. Further polyols which are suitable are oligesters having hydroxyl end groups.

Examples of aliphatic and cycloaliphatic polyols are alkylenediols having preferably 2 to 12 C atoms, such as ethylene glycol, 1,2- or 1,3-propanediol, 1,2-, 1,3- or 1,4-butanediol, pentanediol, hexanediol, octanediol, dodecanediol, diethylene glycol, triethylene glcyol, polyethylene glycols having molecular weights of preferably from 200 to 1500, 1,3-cyclopentanediol, 1,2-, 1,3- or 1,4-cyclohexanediol, 1,4-dihydroxymethylcyclohexane, glycerol, tris(β-hydroxyethyl) amine, trimethylolethane, trimethylolpropane, pentaerythritol, dipentaerythritol and sorbitol.

The polyols may be partially or completely esterified with one carboxylic acid or with different unsaturated carboxylic acids, and in partial esters the free hydroxyl groups may be modified, for example etherified or esterified with other carboxylic acids. Examples of esters are trimethylolpropane triacrylate, trimethylolethane triacrylate, trimethylolpropane trimeth-acrylate, trimethylolethane trimethacrylate, tetramethylene glycol dimethacrylate, triethylene glycol dimethacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol tris-itaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetra methacrylate, sorbitol pentaacrylate, sorbitol hexaacrylate, oligoester acrylates and methacrylates, glycerol diacrylate and triacrylate, 1,4-cyclohexane diacrylate, bisacrylates and bismethacrylates of polyethylene glycol with a molecular weight of from 200 to 1500, or mixtures thereof.

Also suitable as components (A) are the amides of identical or different, unsaturated carboxylic acids with aromatic, cycloaliphatic and aliphatic polyamines having preferably 2 to 6, especially 2 to 4, amino groups. Examples of such polyamines are ethylenediamine, 1,2- or 1,3-propylenediamine, 1,2-, 1,3- or 1,4-butylenediamine, 1,5-pentylenediamine, 1,6-hexylenediamine, octylenediamine, dodecylenediamine, 1,4-diaminocyclohexane, isophoronediamine, phenylenediamine, bisphenylenediamine, di-β-aminoethyl ether, diethylenetriamine, triethylenetetramine, di(β-aminoethoxy)- or di(β-aminopropoxy)ethane. Other suitable polyamines are polymers and copolymers, preferably with additional amino groups in the side chain, and oligoamides having amino end groups. Examples of such unsaturated amides are methylenebisacrylamide, 1,6-hexamethylenebisacrylamide, diethylenetriaminetrismethacrylamide, bis(methacrylamidopropoxy)ethane, β-methacrylamidoethyl methacrylate and N[(β-hydroxyethoxy)ethyl]acrylamide.

Suitable unsaturated polyesters and polyamides are derived, for example, from maleic acid and from diols or diamines. Some of the maleic acid can be replaced by other dicarboxylic acids. They can be used together with ethylenically unsaturated comonomers, for example styrene. The polyesters and polyamides may also be derived from dicarboxylic acids and from ethylenically unsaturated diols or diamines, especially from those with relatively long chains of, for example 6 to 20 C atoms. Examples of polyurethanes are those composed of saturated or unsaturated diisocyanates and of unsaturated or, respectively, saturated diols.

Polybutadiene and polyisoprene and copolymers thereof are known. Examples of suitable comonomers are olefins, such as ethylene, propene, butene and hexene, (meth)acrylates, acrylonitrile, styrene or vinyl chloride. Polymers with (meth)acrylate groups in the side chain are likewise known. They may, for example, be reaction products of epoxy resins based on novolaks with (meth)acrylic acid, or may be homo- or copolymers of vinyl alcohol or hydroxyalkyl derivatives thereof which are esterified with (meth)acrylic acid, or may be homo- and copolymers of (meth)acrylates which are esterified with hydroxyalkyl(meth)acrylates.

The photopolymerizable compounds can be used alone or in any desired mixtures. It is preferred to use mixtures of polyol(meth)acrylates.

Binders as well can be added to these novel compositions, and this is particularly expedient when the photopolymerizable compounds are liquid or viscous substances. The quantity of binder may, for example, be 5-95%, preferably 10-90% and especially 40-90%, by weight relative to the overall solids content. The choice of binder is made depending on the field of application and on properties required for this field, such as the capacity for development in aqueous and organic solvent systems, adhesion to substrates and sensitivity to oxygen.

Examples of suitable binders are polymers having a molecular weight of about 5000 to 2000000, preferably 10000 to 1000000.

The unsaturated compounds can also be used as a mixture with nonphotopolymerizable, film-forming components. These may, for example, be physically drying polymers or solutions thereof in organic solvents, for instance nitrocellulose or cellulose acetobutyrate. They may also, however, be chemically and/or thermally curable (heat-curable) resins, examples being polyisocyanates, polyepoxides and melamine resins, as well as polyimide precursors. The use of heat-curable resins at the same time is important for use in systems known as hybrid systems, which in a first stage are photopolymerized and in a second stage are crosslinked by means of thermal aftertreatment.

The photoinitiators according to the invention are further suitable as initiators for curing of oxidative drying systems, such as are for example described in "Lehrbuch der Lacke and Beschichtungen", Vol. III, 296-328, Verlag W. A. Colomb in Heenemann GmbH, Berlin-Oberschwandorf (1976).

In addition to the photoinitiator the photopolymerizable mixtures may include various additives (D) customary in the photocuring technology.

Examples of these are thermal inhibitors, stabilizers, antistatics, flow improvers and adhesion promoters, accelerators such as e.g. amines, chain transfer agents, photosensitizers, coinitiators, components which under thermal conditions forms free radicals (e.g. azo or peroxy compounds), organic or inorganic pigments, dyes, optical brighteners, fillers, pigments, dyes, wetting agents or levelling assistants.

Light stabilizers which can be added in a small quantity are UV absorbers, for example those of the hydroxyphenylbenzotriazole, hydroxyphenyl-benzophenone, oxalamide or hydroxyphenyl-s-triazine type. These compounds can be used individually or in mixtures, with or without sterically hindered amines (HALS). Examples of such UV absorbers and light stabilizers are disclosed in WO 04/074328, page 12, line 9 to page 14, line 23, said disclosure hereby is incorporated by reference.

Photopolymerization can also be accelerated by adding further photosentisizers which shift or broaden the spectral sensitivity. These are, in particular, aromatic carbonyl compounds, for example benzophenone, thioxanthone, anthraquinone and 3-acylcoumarin derivatives, and also 3-(aroylmethylene)thiazolines, camphor quinone, but also eosine, rhodamine and erythrosine dyes, as well as all compounds which can be used as coinitiators as described above. Examples of suitable sensitizer compounds (d) are disclosed in WO 06/008251, page 36, line 30 to page 38, line 8, the disclosure of which is hereby incorporated by reference.

Examples of dyes are xanthene-, benzoxanthene-, benzothioxanthene, thiazine-, pyronine-, porphyrine- or acridine dyes, and/or trihalogenmethyl compounds which can be cleaved by irradiation. Similar compositions are for example described in EP 445624. Examples of pigments are titan dioxide pigments, carbon black Russ, zinc oxide, iron oxide, chromium-, nickel- other titanium compounds etc. azo pigments, phthalocyanine pigments, perylene-, anthraquinone-, thioindigo-, chinacridone- or triphenylmethane pigments, as well as diketo-pyrrolo-pyrole-, isoindolinone-, e.g. tetrachlorisoindolinone-, isoindoline-, dioxazin-, benzimidazolone- and chinophthalone pigments.

The nature and amount of such additional additives is governed by the intended use of the coating in question and will be familiar to the person skilled in the art.

In certain cases it may be of advantage to use mixtures of two or more of the novel oligomeric or polymeric photoinitiators. It is of course also possible to use mixtures with known photoinitiators (C). The person skilled in the art is well familiar with the host of, in many cases commercially (e.g. under the trademarks IRGACURE®, and DAROCUR®, provided by BASF SE), available photoinitiator compounds as well as their specific properties in divergent applications.

Examples are compounds of the class of benzophenones, ketal compounds, acetophenone derivatives, dialkoxyacetophenones, α-hydroxy- or α-aminoacetophenones, 4-aroyl-1,3-dioxolanes, benzoin alkyl ethers and benzil ketals, phenylglyoxalic esters, oximeesters, peresters, monoacyl phosphine oxides, bisacylphosphine oxides, trisacylphosphine oxides, halomethyltriazines, hexaarylbisimidazole/coinitiators systems, ferrocenium compounds, or titanocenes. Further, borate compounds can be used as coinitiators.

Specific examples of suitable further photoinitiators are disclosed in WO 09/019,173, page 19, line 19 to page 20, line 33. Said disclosure hereby is incorporated by reference.

Additionally suitable are for example 1-[4-(benzoyl-phenyl-thia)phenyl]-2-methyl-2-(ptolylsulfonyl)-propane-1-one (ESACURE 1001M); oligomeric α-hydroxyalkyl phenyl ketones e.g. ESACURE ONE, ESACURE KIP 100, ESACURE KIP 150.

Especially suitable for use in combination with the novel oligomeric or polymeric photoinitiators are photoinitiators of the α-hydroxyketone type, such as DAROCUR® 1173, IRGACURE® 184, ESACURE® ONE, ESACURE® KIP 100 or ESACURE® KIP 150. Preferred out of these compounds are those which have a higher molecular weight and a low migration aptitude such as ESACURE® ONE, ESACURE® KIP 100 or ESACURE® KIP 150, expecially ESACURE® ONE. (ESACURE® is provided by Lamberti SPA)

The photopolymerizable compositions generally comprise 0.05% to 15% by weight, preferably 0.1% to 5% by weight, of the photoinitiator, based on the composition. The amount refers to the sum of all photoinitiators added, if mixtures of initiators are employed. Accordingly, the amount either refers to the photoinitiator (B) or the photoinitiators (B)+(C).

The photopolymerizable compositions can be used for various purposes, for example as printing ink, e.g. as screen printing ink, ink for flexoprinting or offsetprinting, as a clear, white or colored finish, for example for wood or metal, as powder coating, as a coating material, inter alia for paper, wood, metal or plastic, as a daylight-curable coating for the marking of buildings and roadmarking, for photographic reproduction techniques, for holographic recording materials, for image recording techniques or to produce printing plates, for producing masks for screen printing, as dental filling compositions, as adhesives, as laminating resins, as photoresits, as photostructurable dielectricum and as solder masks for electronic circuits, as resists to manufacture color filters for any type of display applications or to generate structures in the manufacturing process of plasma-display panels and electroluminescence displays, for the production of optical switches, optical lattices (interference lattice), light circuits, for producing three-dimensional articles by mass curing (UV curing in transparent moulds) or by the stereolithography technique, as is described, for example, in U.S. Pat. No. 4,575,330, to produce composite materials (for example styrenic polyesters, which may, if desired, contain glass fibres and/or other fibres and other auxiliaries) and other thick-layered compositions, for coating or sealing electronic components and chips, or as coatings for optical fibres, or for producing optical lenses, e.g. Fresnel lenses, or ophthalmic devices such as soft contact lenses, intraocular lenses or in the production of medical equipment, auxiliaries or implants, artificial cornea, exe bandages, renal dialysis membrande, blood storage bags, pacemaker leads, vascular grafts, drug delivery patches, moldings that can be used in surgery such as heart valves, catheters, artificial organs, encapsulated biologic implants, e.g. pancreatic islents, materials for prothesis, such as bone substitutes or dental, moldings for diagnostics or membranes, etc.

The novel photoinitiator systems may additionally be employed as initiators for emulsion polymerizations, pearl polymerizations or suspension polymerizations, as polymerization initiators for fixing ordered states of liquid-crystalline monomers and oligomers, or as initiators for fixing dyes on organic materials.

The compositions according to the invention are also suitable for use in uv-curing adhesives, e.g. in the preparation of pressure-sensitive adhesives, laminating adhesives, hot-melt adhesives, moisture-cure adhesives, silane reactive adhesives or silane reactive sealants and the like, and related applications. Said adhesives can be hot melt adhesives as well waterborne or solvent borne adhesives, liquid solventless adhesives or 2-part reactive adhesives. In particular suitable are pressure-sensitive adhesives (PSA), for example uv-curable hot melt pressure sensitive adhesives. Said adhesives for example comprise at least one rubber component, at least one resin component as tackyfier and at least one oil component, for example in the weight ratio 30:50:20. Suitable tackyfiers are natural or synthetic resins. The person skilled in the art is aware of suitable corresponding compounds as well as of suitable oil components or rubbers. The pre-polymerized adhesives containing the isocyanates, for example in blocked form, can for example be processed at high temperature and coated onto the substrate following the hotmelt process, afterwards full cure is achieved by an additional curing step involving the blocked isocyanates, which is realized by photoactivation of the photolatent catalyst. Hotmelt adhesives are interesting as pressure sensitive adhesives and suitable to replace the use of solvent base compositions, which from an environmental point of view are unwanted. The hotmelt extrusion process in order to achieve the high flow viscosity necessitates high application temperatures. The compositions of the present invention comprising isocyanates are suitable as crosslinkers in the preparation of a hotmelt coating, where the crosslinkers enter into a chemical reaction with the functional comonomers of the (meth)acrylate PSA. After the coating operation, the PSAs are first crosslinked thermally, or implementing the dual crosslinking mechanism, the PSA is subsequently crosslinked with UV light. UV crosslinking irradiation takes place by means of shortwave ultraviolet radiation in a wavelength range from 200 to 400 nm, even expanding in the visible range, e.g. up to 650 nm, depending on the source of the UV radiation equipment, as well as on the photolatent metal catalyst. Such systems and processes are for example described in US 2006/0052472, the disclosure of which hereby is incorporated by reference.

The photocurable compositions of the present invention, as mentioned above are also suitable for printing inks. Such printing inks are known to the person skilled in the art, are used widely in the art and are described in the literature. They are, for example, pigmented printing inks and printing inks coloured with dyes. A printing ink is, for example, a liquid or paste-form dispersion that comprises colorants (pigments or dyes), binders and also optionally solvents and/or optionally water and additives. In a liquid printing ink, the binder and, if applicable, the additives are generally dissolved in a solvent. Customary viscosities in the Brookfield viscometer are, for example, from 20 to 5000 mPa·s, for example from 20 to 1000 mPa·s, for liquid printing inks. For paste-form printing inks, the values range, for example, from 1 to 100 Pa·s, preferably from 5 to 50 Pa·s. The person skilled in the art will be familiar with the ingredients and compositions of printing inks.

The photocurable compositions are suitable, for example, as coating materials for substrates of all kinds, for example wood, textiles, paper, ceramics, glass, plastics such as polyesters, polyethylene terephthalate, polyolefins or cellulose acetate, especially in the form of films, and also metals such as Al, Cu, Ni, Fe, Zn, Mg or Co and GaAs, Si or $SiO_2$ to which it is intended to apply a protective layer or, by means of imagewise exposure, to generate an image.

Coating of the substrates can be carried out by applying to the substrate a liquid composition, a solution or a suspension. The choice of solvents and the concentration depend principally on the type of composition and on the coating technique. The solvent should be inert, i.e. it should not undergo a chemical reaction with the components and should be able to be removed again, after coating, in the course of drying. Examples of suitable solvents are ketones, ethers and esters, such as methyl ethyl ketone, isobutyl methyl ketone, cyclopentanone, cyclohexanone, N-methylpyrrolidone, dioxane, tetrahydrofuran, 2-methoxyethanol, 2-ethoxyethanol, 1-methoxy-2-propanol, 1,2-dimethoxyethane, ethyl acetate, n-butyl acetate and ethyl 3-ethoxypropionate.

The solution is applied uniformly to a substrate by means of known coating techniques, for example by spin coating, dip coating, knife coating, curtain coating, brushing, spraying, especially by electrostatic spraying, and reverse-roll coating, and also by means of electrophoretic deposition. It is also possible to apply the photosensitive layer to a temporary, flexible support and then to coat the final substrate, for example a copper-clad circuit board, by transferring the layer via lamination.

The quantity applied (coat thickness) and the nature of the substrate (layer support) are dependent on the desired field of application.

The person skilled in the art is familiar with the diverse applications of photocurable compositions and the various applications in different fields are described in a host of publications.

In accordance with the invention further is a coated substrate coated on at least one surface with a composition as is described above, comprising a polymeric or oligomeric photoinitiator of the invention; as well as a coated substrate coated on at least one surface with a composition as is described below, comprising a specifically functionalized bisacylphosphine oxide. Said coated substrate is to be understood as the substrate being coated with the cured formulation. In other words, a composition as described above (or below respectively) is applied to at least one surface of the substrate and is cured by exposure to radiation.

The functionalized bisacylphosphine oxide photoinitiators, e.g. of the formula II and IIa, used for the synthesis of polymer-bound bisacylphosphine oxides also are of use as photoinitiators possessing outstanding new properties. As an example, carboxylate-substituted derivatives, or even more pronounced the carboxylate salts of the latter, provide a good solubility in polar media such as water. Such compounds can thus be used as radical photoinitiators in an aqueous environment, allowing new applications such as light induced emulsion polymerization.

The invention therefore also provides compositions comprising (A*) at least one ethylenically unsaturated photopolymerizable compound which is emulsified, dispersed or dissolved in water and (B*) as photoinitiator a compound of the formula IIb

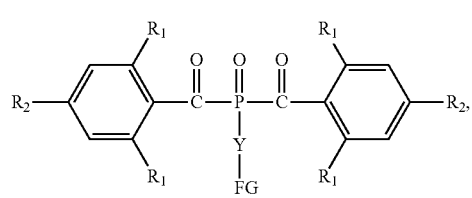

wherein
$R_1$ is $C_1$-$C_4$-alkyl, $C_1$-$C_4$-alkoxy or Cl;
$R_2$ is H, $C_1$-$C_4$-alkoxy or Cl;
Y is —$(CH_2)_n$— or —$CH_2$—CHOH—$CH_2$—;
a is an integer 1-10;
FG is COOH or COO⁻E

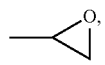

preferably COOH or COO⁻E⁺;

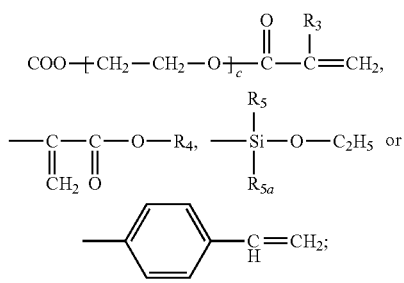

E is a cation, in particular Na.

Many variants of such radiation-curable aqueous prepolymer dispersions (A*) are commercially available.

A prepolymer dispersion is understood as being a dispersion of water and at least one prepolymer dispersed therein. The amount of radiation curable prepolymer or prepolymer mixture, dispersed in the water for example ranges from 20 to 95% by weight, in particular from 30 to 70% by weight. In these compositions the sum of the percentages given for water and prepolymer is in each case 100, with auxiliaries and additives (e.g. emulsifiers) being added in varying quantities depending on the intended use. The radiation-curable aqueous prepolymer dispersions are known polymeric systems, comprising mono- or polyfunctional ethylenically unsaturated prepolymers, that have an average molecular weight $M_n$ (in g/mol) of at least 400, in particular from 500 to 100'000. Prepolymers with higher molecular weights, however, may also be considered depending on the intended application. Use is made, for example, of polyesters having an acid number of not more than 10, of polyethers containing polymerizable C—C double bonds, of hydroxyl-containing reaction products of a polyepoxide, containing at least two epoxide groups per molecule, with at least one α,β-ethylenically unsaturated carboxylic acid, of polyurethane(meth)acrylates and of acrylic copolymers which contain α,β-ethylenically unsaturated acrylic radicals, as are described in EP 12339. Mixtures of these prepolymers can likewise be used. Also suitable are the polymerizable prepolymers described in EP 33896, which are thioether adducts of polymerizable prepolymers having an average molecular weight $M_n$ (in g/mol) of at least 600, additionally comprising polymerizable C—C double bonds. Other suitable aqueous dispersions, based on specific alkyl(meth)acrylate polymers, are described in EP 41125. Further additives which may be included in these radiation-curable aqueous prepolymer dispersions are dispersion auxiliaries and emulsifiers and the additives as described above. Suitable dispersion auxiliaries are for example water-soluble organic compounds which are of high molecular mass and contain polar groups, examples being polyvinyl alcohols, polyvinylpyrrolidone or cellulose ethers. Emulsifiers which can be used are nonionic emulsifiers and, if desired, ionic emulsifiers as well.

The photosensitivity of the novel compositions can extend in general from about 150 nm to 600 nm, for example 190-600 nm, (UV-vis region). Suitable radiation is present, for example, in sunlight or light from artificial light sources. Consequently, a large number of very different types of light sources are employed. Both point sources and arrays ("lamp carpets") are suitable. Examples are carbon arc lamps, xenon arc lamps, low-, medium-, high- and super high-pressure mercury lamps, possibly with metal halide dopes (metal-halogen lamps), microwave-stimulated metal vapour lamps, excimer lamps, superactinic fluorescent tubes, fluorescent lamps, argon incandescent lamps, electronic flashlights, photographic flood lamps, electron beams and X-rays. The distance between the lamp and the substrate to be exposed in accordance with the invention may vary depending on the intended application and the type and output of lamp, and may be, for example, from 2 cm to 150 cm. Laser light sources, for example excimer lasers, such as $F_2$ excimer lasers at 157 nm exposure, KrF excimer lasers for exposure at 248 nm and ArF excimer lasers for exposure at 193 nm are also suitable. Lasers in the visible region can also be employed.

Alternatively, the actinic radiation is provided by light emitting diodes (LED), for example organic light-emitting diodes (OLED), e.g. UV light emitting diodes (UV-LED). Said LEDs allow instant on and off switching of the radiation source. Further, UV-LEDs generally have a narrow wavelength distribution and offer the possibility to customize the peak wavelength and also provide an efficient conversion of electric energy to UV radiation.

The examples which follow illustrate the invention in more detail, without limiting the scope to said examples only. Parts and percentages are, as in the remainder of the description and in the claims, by weight, unless stated otherwise. Where alkyl radicals having more than three carbon atoms are referred to in the examples without any mention of specific isomers, the n-isomers are meant in each case.

Functionalized bisacylphosphine oxides (intermediates for the synthesis of polymer-bound BAPOs)

EXAMPLE 1

Preparation of (4-vinylbenzyl)-bis(2,4,6-trimethyl-benzoyl)-phosphine oxide

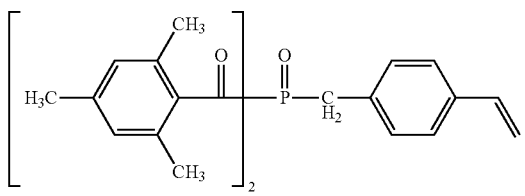

1a): Preparation of Na$_3$P 3.45 g of sodium sand (150 mmol, 3 eq., M=22.99 g/mol), 1.55 g of purified red phosphorus (50.0 mmol, 1 eq., M=30.97 g/mol) and 125 mg of naphthalene (1.0 mmol, M=128.17 g/mol) are suspended in 120 ml of dimethoxyethane (DME). The suspension is heated up to 75° C. and kept at this temperature for 20 h under stirring. A color change from green over red-brown into black takes place.

1b): Preparation of NaPH$_2$

The reaction mixture of step a) is cooled down to −10 to −15° C. 10 ml of tert-butanol (0.1 mol, 2 eq., M=74.12 g/mol) in 10 ml DME is added within 20 min under stirring. A nearly clear brown solution is obtained, containing a small amount of unreacted sodium. Stirring is continued for another 20 min.

1c): Preparation of sodium bis(2,4,6-trimethylbenzoyl)phosphide 16.8 ml of 2,4,6-trimethylbenzoyl chloride (TMBCl) (0.1 mol, 2 eq., M=182.65 g/mol) are quickly added to the reaction mixture of step b), resulting in a color change to yellow. The reaction mixture is left stirring for another 20 min under ice cooling, followed by stirring for one hour at room temperature. The $^{31}$P NMR spectra shows a signal for sodium bis(2,4,6-trimethylbenzoyl)phosphide×DME {Na[P(COMes)$_2$]×DME} at 82 ppm (>95%).

The reaction mixture is concentrated under high vacuum. The resulting orange-yellow foam is taken up in 100 ml of toluene and then filtered through G4/Celite. The filter cake is twice washed with toluene providing a clear orange-yellow filtrate solution. The filtrate solution is concentrated under vacuum to a volume of about 70 ml, and then carefully overlayed with hexane (30 ml). Yellow cubic crystals separate from the solution and are identified as sodium bis(2,4,6-trimethylbenzoyl)phosphide×DME {Na[P(COMes)$_2$]×DME} (C$_{24}$H$_{32}$NaO$_4$P, M=438.47 g/mol) by $^{31}$P-, $^1$H- and $^{13}$C-NMR spectroscopy. Furthermore, single-crystal X-ray structural analysis shows that the crystals are composed of an ion pair complex of the formula [Na$_3$[P(COMes)$_2$]$_4$][Na(DME)$_3$]. The yellow crystals are soluble in toluene, THF and DME, however little soluble in hexane. M.p.=208° C.

$^1$H-NMR (250.13 MHz, C$_6$D$_6$, 25° C.): δ=6.60 (s, 4H, Mes CH), 2.94 (s, 4H, DME CH$_2$), 2.87 (s, 6H, DME CH$_3$), 2.61 (s, 12H, Mes o-CH$_3$), 2.08 (s, 6H, Mes p-CH$_3$). $^{31}$P{H}-NMR (101.25 MHz, C$_6$D$_6$, 25° C.): δ=84.1 (br.).

1d): Preparation of (4-vinylbenzyl)-bis(2,4,6-trimethylbenzoyl)-phosphine oxide 3.04 g (8.72 mmol, 1 eq.) sodium bis(2,4,6-trimethylbenzoyl)phosphide are dissolved in 20 ml DME. To this solution 1.37 ml (8.72 mmol, 1 eq.) p-chloromethyl styrene are added drop wise at room temperature. After 115 hours of stirring at 40° C. the solvent is removed by vacuum. The compound is dissolved in toluene and filtrated in order to get rid of the sodium chloride. 3.47 g (7.85 mmol, 1 eq.) (4-vinylbenzyl)-bis(2,4,6-trimethylbenzoyl)-phosphine thus obtained are dissolved in 15 ml toluene. To this solution 0.8 ml (7.85 mmol, 1 eq.) hydrogen peroxide (30%) are added drop wise at room temperature. After 27 hours of stirring at RT (=room temperature) the solvent is removed under vacuum. The compound is dissolved again in toluene and filtrated in order to get rid of the already polymerized side product. The solvent is removed and the product is dried under vacuum to give 831.0 mg of ((4-vinylbenzyl)-bis(2,4,6-trimethylbenzoyl)-phosphine oxide. Yield: 23.25%. M.p.=208° C. This compound polymerizes upon prolonged storing.

$^1$H-NMR (300 MHz, C$_6$D$_6$, 25° C.): δ=7.30-7.04, (2 d, 4H, CH styrene), 6.73-6.56 (m. 1H, —CH=CH$_2$), 6.60 (s, 4H, Mes CH), 5.66 (d, 1H, —CH=CHtransH), 5.16 (dxd, 1H, —CH=CHH$_{cis}$), 3.77 (d, 2H, —CH$_2$—), 2.37 (s, 12H, Mes o-CH$_3$), 2.05 (s, 6H, Mes p-CH$_3$). $^{31}$P{H}-NMR (101.25 MHz, C$_6$D$_6$, 25° C.): δ=23.0.

EXAMPLE 2

Preparation of ethyl 2-([bis{2,4,6-trimethylbenzoyl}-phosphoryl]-methyl)acrylate

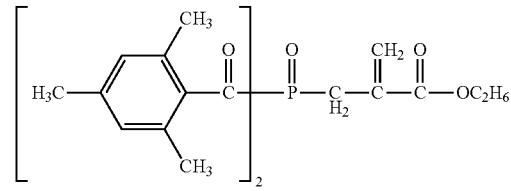

The compound is prepared by employing the method as described in example 1d) by reacting sodium bis(2,4,6-trimethylbenzoyl)phosphide (example 1c) (250 mg, 0.72 mmol, 1 eq.), dissolved in tetrahydrofurane (THF) (5 ml) with ethyl-2-(bromomethyl)acrylate (138.9 mg, 0.72 mmol, 1 eq.), followed by oxidation with hydrogen peroxide. The product is obtained as a pale yellow product (Yield: 61%, 0.43 mmol, 195.4 mg).

$^1$H-NMR (250 MHz, C$_6$D$_6$): δ=6.71 (s, 4H, Mes), 6.34 (s, 1H, C(CH$_2$)(COOEt)), 5.82 (s, 1H, C(CH$_2$)(COOEt)), 4.03 (q, J=8.2 Hz, 2H, OCH$_2$CH$_3$), 3.39 (m, J=12.0 Hz, 2H, PCH$_2$), 2.41 (s, 12H, Mes-o-CH$_3$), 2.10 (s, 6H, Mes-p-CH$_3$), 1.12 (t, J=8.0 Hz, 3H, OCH$_2$CH$_3$).

$^{31}$P-NMR (101.3 MHz, C$_6$D$_6$): δ=21.7 (t, J=15.2 Hz).

EXAMPLE 3

Preparation of [4-(bicyclo[2.2.1]hept-2-ene-5-yl)-butyl]-4-bis(2,4,6-trimethyl-benzoyl)phosphine oxide

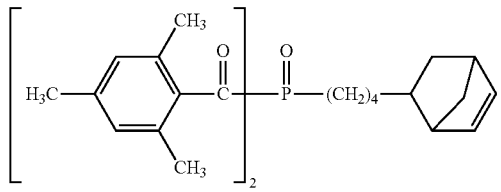

3a): Preparation of 5-(4-bromobutyl)-bicyclo[2.2.1]hept-2-ene

In a 250 mL three neck bottle magnesium turnings (5.2 g, 214 mmol, 2.35 eq.) are mixed with tetrahydrofuran (10 ml). Whilst stirring 5-(brommethyl)-bicyclo[2.2.1]hept-2-ene (17 g, 90.8 mmol, 1.03 eq.) that is dissolved in tetrahydrofuran (25 ml) is added dropwise. After stirring for one hour the excess of magnesium turnings is filtered off. The solution is added dropwise to a mixture of 1,3-dibromopropan (17.9 g, 88 mmol, 1 eq.), $Li_2CuCl_4$ (0.1 M in THF) (9 ml, 0.9 mmol, 0.01 eq.) and tetrahydrofuran (35 ml). After complete addition of the Grignard reagent, the black solution is stirred for one hour more. The reaction mixture is hydrolyzed with acetic acid (20%). Diethylether (40 ml) is added and the organic phase is washed with saturated sodium hydrogencarbonate solution (30 ml) and distilled water (30 ml). The organic layer is dried over magnesium sulfate and the solvent evaporated in vacuo at room temperature. The product is distilled at 20 mbar and 140° C. A colourless oil is obtained (Yield: 10.31 g, 45 mmol, 51%).

$^1$H-NMR (300 MHz, $CDCl_3$): δ=6.10 (dd, 1H, $^3J_{HH}$=3.1 Hz, 5.7 Hz, $CH^4$), 5.91 (dd, 1H, $^3J_{HH}$=2.8 Hz, 5.7 Hz, $CH^5$), 3.39 (t, 2H, $^3J_{HH}$=6.8 Hz, $CH_2^{11}$), 2.75 (m, 1H, $CH^3$), 2.75 (m, 1H, $CH^6$), 1.98 (m, 1H, $CH^1$), 1.83 (m, 1H, $CH^2_{exo}$), 1.83 (m, 2H, $CH_2^{10}$), 1.39 (m, 2H, $CH_2^7$), 1.39 (m, 2H, $CH_2^9$), 1.09 (m, 2H, $CH_2^8$), 0.49 ppm (ddd, 1H, $^2J_{HH}$=2.6 Hz, $^3J_{HH}$=4.1 Hz, 11.2 Hz, $CH^2_{endo}$).

3b): Preparation of [4-(bicyclo[2.2.1]hept-2-ene-5-yl)-butyl]-4-bis(2,4,6-trimethylbenzoyl)phosphine oxide)

Sodium bis(2,4,6-trimethylbenzoyl)phosphide (example 1c) (1.12 g, 3.21 mmol, 1 eq.) and 5-(4-bromobutyl)-bicyclo[2.2.1]hept-2-ene (0.79 g, 3.45 mmol, 1.07 eq.) are dissolved in dimethoxyethane (20 ml) and stirred for two days. Subsequently, the solvent is evaporated and the yellow residue dissolved in toluene (20 ml). Hydrogen peroxide solution (10%) (3 ml) is added and the mixture stirred for 24 hours at 40° C. After adding diethylether, the solution is washed both with sodium hydrogencarbonate solution (2%) and brine. The organic layer is dried with sodium sulfate and after evaporating the solvent the pure product is obtained as yellow oil (Yield: 1.142 g, 2.33 mmol, 75%).

$^1$H-NMR (300 MHz, $CDCl_3$): δ=6.86 (s, 4H, Mes-CH), 6.10 (m, 1H, $CH^4$), 5.91 (m, 1H, $CH^6$), 2.73 (m, 1H, $CH^3$), 2.73 (m, 1H, $CH^6$), 1.98 (m, 1H, $CH^1$), 2.27 (s, 18H, Mes-$CH_3$), 2.16 (m, 2H, $CH_2^{11}$), 1.91 (m, 1H, $CH^1$), 1.81 (m, 1H, $CH^2$exo), 1.58 (m, 2H, $CH_2^{10}$), 1.36 (m, 1H, $CH^{7'}$), 1.36 (m, 2H, $CH_2^9$), 1.04 (m, 1H, $CH^{7''}$), 1.04 (m, 2H, $CH_2^8$), 0.46 ppm (m, 1H, $CH^2_{endo}$).

$^{31}$P{$^1$H}-NMR (101 MHz, $CDCl_3$): δ=28.1 ppm.

EXAMPLE 4

Preparation of (prop-2-yn-1-yl)-bis(2,4,6-trimethyl-benzoyl)-phosphine oxide

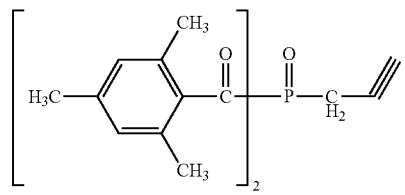

The compound is prepared from sodium bis(2,4,6-trimethylbenzoyl)phosphide and 3-bromopropyne by employing the method as described in example 1d). Pale yellow powder (Yield: 2.04 g, 5.36 mmol, 86%).

$^1$H-NMR (250.13 MHz, $C_6D_6$): δ=6.63 (s, 4H, MesCH), 2.63 (s, 2H, CCH), 2.42 (s, 12H, o-MesCH$_3$), 2.06 (s, 6H, p-MesCH$_3$), 1.57 (s, 2H, PCH2). $^{31}$P-NMR (101.25 MHz, 0606): δ=18.9 (m).

EXAMPLE 5

Preparation of (3-bromopropyl)-bis(2,4,6-trimethyl-benzoyl)-phosphine oxide

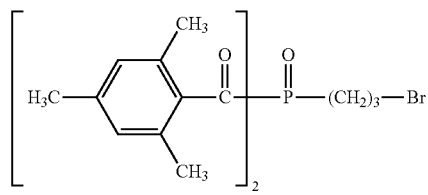

The compound is prepared by employing the method as described in example 1d) from sodium bis(2,4,6-trimethyl-benzoyl)phosphide and 1,3-dibromopropane in toluene/tetrahydrofuran as solvents and the product is obtained as yellow oil (Yield: 0.97 g, 2.10 mmol).

$^1$H-NMR (250.1 MHz, $C_6D_6$): δ=1.73 (quint., J=6.32 Hz, $CH_2$), 2.12 (s, 6H, MesCH$_3$), 2.30 (s, 12H, o-MesCH$_3$), 2.88 (t, J=6.32, 2H, $CH_2$), 3.41 (t, J=, 2H, $CH_2$Br), 6.69 (s, 2H, MesCH).

$^{31}$P-NMR (121.5 MHz, $C_6D_6$): δ=25.83 (t, J=9.7 Hz).

EXAMPLE 6

Preparation of (3-chloropropyl)-bis(2,4,6-trimethyl-benzoyl)-phosphine oxide

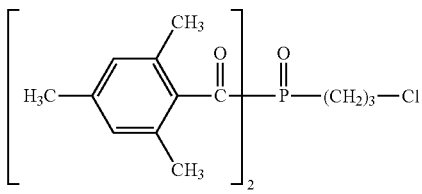

The compound is prepared according to the method as described in example 5, by exchanging 1,3-dibromopropane with 1-bromo-3-chloropropane. The product is obtained as a yellow oil (Yield: 0.749 g, 1.79 mmol, 62%).

$^1$H-NMR (250.1 MHz, C$_6$D$_6$): δ=1.76 (quint., J=6.42 Hz, CH$_2$), 2.16 (s, 6H, pMesCH$_3$), 2.34 (s, 12H, o-MesCH$_3$), 2.98 (t, J=6.42 Hz, 2H, CH$_2$), 3.49 (t, J=6.42 Hz, 2H, CH$_2$Cl), 6.69 (s, 2H, MesCH).

$^{31}$P-NMR (121.5 MHz, C$_6$D$_6$): δ=24.6 (t, J=9.3 Hz).

EXAMPLE 7

Preparation of (3-aminopropyl)-bis(2,4,6-trimethyl-benzoyl)-phosphine oxide

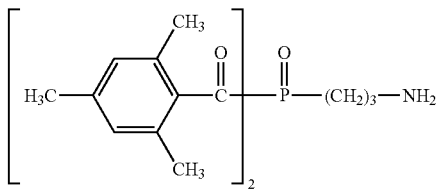

The compound is prepared by employing the method as described in example 1d) from sodium bis(2,4,6-trimethyl-benzoyl)phosphide and 3-bromopropylammonium bromide.

$^1$H-NMR (300.1 MHz, C$_6$D$_6$): δ=2.46 (quint., 2H, P—CH$_2$—CH$_2$, $^3$J=6.9 Hz), 3.22 (t, 2H, N—CH$_2$, J=7.4 Hz), 3.68 (t, 2H, P—CH$_2$, J=7.4 Hz), 2.18 (s, 6H, p-MesCH$_3$), 2.42 (s, 12H, o-MesCH$_3$), 6.69 (s, 2H, MesCH).

$^{31}$P{$^1$H}-NMR (121.5 MHz, C$_6$D$_6$): δ=23.1 (s).

EXAMPLE 8

Preparation of (3-aminopropyl)-bis(2,6-dimethoxy-benzoyl)-phosphine oxide

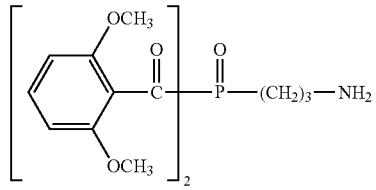

8a): Preparation of sodium bis(2,6-dimethoxybenzoyl)phosphide

NaPH$_2$×2NaOtBu (example 1b) (0.846 g, 3.41 mmol, 1 eq.) is dissolved in DME (6 ml) and cooled in an ice water bath to 0° C. 2,6-dimethoxybenzoyl chloride (1.37 g, 6.82 mmol, 2 eq.) dissolved in DME (8 ml) are dropwise added to the solution. After 1 hour of stirring at room temperature the solvent is removed in vacuo to yield a yellow powder of sodium bis(2,6-dimethoxy-benzoyl)phosphide (Yield: 87%, 1.14 g, 2.97 mmol).

$^1$H-NMR (300.1 MHz, d$^8$-thf): δ=3.38 (s, 12H, O—CH$_3$), 6.29 (d, 4H, Ar—H, $^3$J=8.4 Hz), 7.06 (t, 2H, Ar—H, $^3$J=8.4 Hz).

$^{31}$P{$^1$H}-NMR (121.5 MHz, d$^8$-thf): δ=91.0 (s).

8b): Preparation of (3-aminopropyl)-bis(2,6-dimethoxy-benzoyl)-phosphine oxide Sodium bis(2,6-dimethoxybenzoyl)phosphide (25 mg (0.065 mmol, 1 eq.) is dissolved in dimethoxyethane (2 ml). 3-Bromopropylamine hydrobromide (14 mg, 0.065 mmol, 1 eq.) is added at room temperature. After stirring the reaction mixture for 15 minutes, the solvent is removed in vacuo at room temperature and replaced by ethanol (2 ml). With a microliter syringe hydrogen peroxide (30%) (0.008 ml, 0.065 mmol, 1 eq.) is added slowly and the solution stirred for 30 minutes. Subsequently, the solvent is removed in vacuo. The residue is dissolved in diethylether (2 ml) and washed with brine and dried with sodium sulfate. After filtration and evaporation of the diethylether the pure product is obtained.

$^1$H-NMR (300.1 MHz, d$^8$-thf): δ=2.43 (quint., 2H, P—CH$_2$—CH$_2$, $^3$J=6.9 Hz), 3.20 (t, 2H, N—CH$_2$, $^3$J=7.2 Hz), 3.68 (t, 2H, P—CH$_2$, $^3$J=6.6 Hz), 3.79 (s, 12H, O—CH$_3$), 6.60 (d, 4H, Ar—H, $^3$J=8.4 Hz), 7.25 (t, 2H, Ar—H, $^3$J=8.4 Hz). $^{31}$P{$^1$H}-NMR (121.5 MHz, d$^8$-thf): δ=24.1 (s).

EXAMPLE 9

Preparation of (3-azidopropyl)-bis(2,4,6-trimethyl-benzoyl)-phosphine oxide

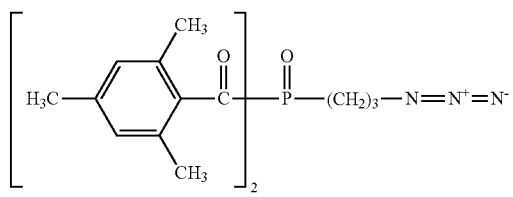

(3-bromopropyl)-bis(2,4,6-trimethyl-benzoyl)-phosphine oxide (example 5) (100 mg, 0.22 mmol, 1 eq.) is dissolved in dimethylsulfoxide (DMSO, 5.0 ml). Sodium azide (14.3 mg, 0.22 mmol, 1 eq.) is added and the solution stirred for 12 h at 70° C. A white precipitate of sodium bromide is formed, which is filtered off and the DMSO is removed in vacuo at 50° C. 5 ml of diethylether is added to the residue and the solution is washed twice with brine and dried with magnesium sulfate. After evaporation of the solvent a yellow product is obtained (Yield: 35%, 0.08 mmol, 32.7 mg).

$^1$H-NMR (250.1 MHz, C$_6$D$_6$): δ=1.60 (br., CH$_2$), 1.68 (br., 2H, CH$_2$N$_3$), 2.10 (s, 6H, pMesCH$_3$), 2.11 (s, 12H, o-MesCH$_3$), 2.64 (br., 2H, P(=O)CH$_2$), 6.64 (s, 2H, MesCH).
$^{31}$P{$^1$H}-NMR (101.3 MHz, C$_6$D$_6$): δ=24.6.

EXAMPLE 10

Preparation of (2-hydroxyethyl)-bis(2,4,6-trimethyl-benzoyl)-phosphine oxide

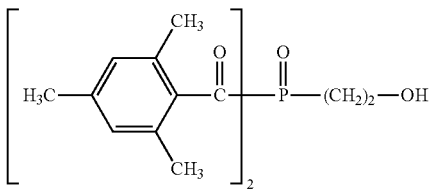

Sodium bis(2,4,6-trimethylbenzoyl)phosphide (example 1c) (2.08 g, 5.89 mmol, 1 eq.) is dissolved in dimethoxyethane (5.00 ml). 2-Bromethanol (0.41 ml, 0.78 g, 5.78 mmol, 1 eq.) is added and the solution stirred for 24 hours at room temperature. The colorless bisacylphosphine is formed and white sodium bromide precipitates. After removing the sodium bromide by filtration, the solution is evaporated in vacuo. The remaining yellow oil is dissolved in 10 ml ethanol and 0.65 ml (6.36 mmol, 1.08 eq.) hydrogen peroxide (10%) are added. The solution is stirred for 3 hours at 40° C. After the reaction is completed, the ethanol is removed in vacuo. The product is obtained as a pale yellow crystalline powder (Yield: 1.76 g, 4.55 mmol, 76%).

Instead of 2-bromoethanol as alkylating agent one equivalent of oxirane can be used as electrophile as well.

$^1$H-NMR (250.13 MHz, C$_6$D$_6$): δ=6.65 (s, 4H, MesC$^4$), 3.73 (dt, J$^1$=6.00 Hz, J$^2$=18.51 Hz, 2H, CH$_2$OH), 2.48 (s, 12H, o-MesCH$_3$), 2.07 (s, 6H, p-MesCH$_3$), 1.59 (s, 2H, PCH$_2$).
$^{31}$P-NMR (121.49 MHz, C$_6$D$_6$): δ=27.2 (t, J=9.11 Hz)

EXAMPLE 11

Preparation of (2-hydroxyethyl)-bis(2,6-dimethoxy-benzoyl)-phosphine oxide

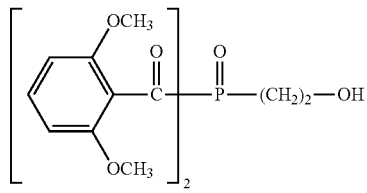

This compound is prepared employing the method as described in example 10, except that sodium bis(2,6-dimethoxybenzoyl)phosphide (example 8a) is used in stead of sodium bis(2,4,6-trimethylbenzoyl)phosphide. Yield: 76%, 0.05 mmol, 20.85 mg.

$^1$H-NMR (300.1 MHz, d$^8$-thf): δ=3.39 (br., 2H, P—CH$_2$), 3.42 (s, 12H, O—CH$_3$), 6.30 (d, 4H, Ar—H, $^3$J=8.4 Hz), 7.07 (t, 2H, Ar—H, $^3$J=8.4 Hz). $^{31}$P-NMR (101.3 MHz, d$^8$-thf): δ=26.47 (br.).

EXAMPLE 12

Preparation of (oxiran-2-yl-methyl)-bis(2,4,6-trimethyl-benzoyl)phosphine oxide

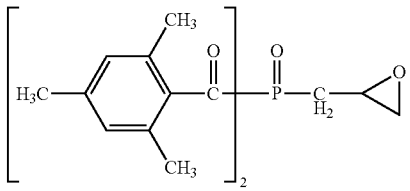

Sodium bis(2,4,6-trimethylbenzoyl)phosphide (example 1c) (2.05 g, 5.89 mmol, 1 eq.) is dissolved in DME (5.00 ml). Epibromohydrine (1.23 ml, 1.82 g, 13.3 mmol, 1 eq.) is added and the solution stirred for 24 hours at room temperature. A white precipitate of sodium bromide is formed. After removing the sodium bromide by filtration, the solution is evaporated in vacuo. The remaining yellow oil is dissolved in ethanol (10 ml) and hydrogen peroxide (10%) (0.65 ml, 6.36 mmol, 1.08 eq.) is added. The solution is stirred for 3 hours at 40° C. After the reaction is finished, the ethanol is removed in vacuo. The product is obtained as yellow oil (Yield: 2.58 g, 6.48 mmol, 49%).

$^1$H-NMR (250.13 MHz, C$_6$D$_6$): δ=6.50 (s, 4H, MesC$^4$), 3.07 (d, J=1.75 Hz, 1H, CHCH$_2$O), 3.05 (d, J=2.00 Hz, 1H, CHCH$_2$O), 2.80-2.70 (m, 1H, CHCH$_2$O), 2.47 (s, 12H, o-MesCH$_3$), 2.12 (s, 6H, p-MesCH$_3$), 1.58 (s, 2H, PCH$_2$).
$^{31}$P-NMR (121.49 MHz, C$_6$D$_6$): δ=23.0 (t, J=12.6 Hz).

EXAMPLE 13

Preparation of (2,3-dihydroxypropyl)-bis(2,4,6-trimethyl-benzoyl)phosphine oxide

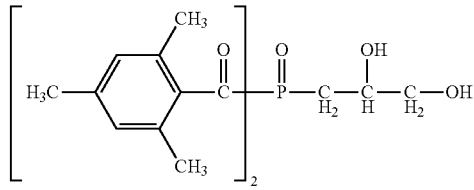

The compound is obtained according to the method of example 1d) from sodium bis(2,4,6-trimethylbenzoyl)phosphide in THF and 1-bromo-2,3-propanediol. A pale yellow product is obtained (Yield: 64%, 0.46 mmol, 191.5 mg).

$^1$H-NMR (300.1 MHz, C$_6$D$_6$): δ=1.67 (d, J=7.6 Hz, 2H, PCH$_2$), 2.11 (s, 6H, pMesCH$_3$), 2.51 (s, 12H, o-MesCH$_3$), 3.43 (quint., J=7.4 Hz, 1H CHOH), 3.82 (d, J=7.4 Hz, 1H CH$_2$OH), 6.41 (s, MesCH).

$^{31}$P-NMR (121.5 MHz, C$_6$D$_6$): δ=26.4 (t, J=16.8 Hz).

EXAMPLE 14

Preparation of 2-(Tetra-O-acetyl-α-D-glucopyranosyloxy)-ethyl-bis(2,4,6-trimethyl-benzoyl)-phosphine oxide

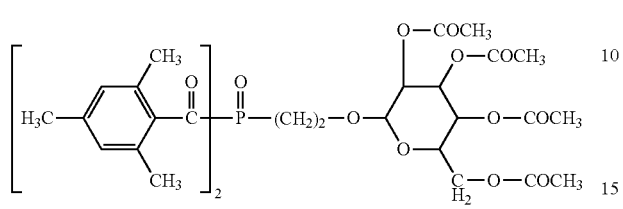

Tetra-O-acetyl-α-D-glucopyranosyl bromide (0.26 g, 0.65 mmol, 1 eq.) is dissolved in acetonitrile (40 ml). (2-Hydroxyethyl)-bis(2,4,6-trimethyl-benzoyl)-phosphine oxide (example 10) (0.5 g, 1.2 mmol, 2 eq.), calcium sulfate (100 mg) and silver carbonate (0.27 g, 0.97 mmol, 1.5 eq.) are added. The reaction mixture is refluxed for 6 hours. After cooling down the calcium sulfate and the silver salts are filtered over celite. The solvent is evaporated in vacuo at room temperature. After purification of the product by column chromatography (ethyl acetate/hexane (90:10), the solvent is evaporated and a yellow oil is obtained.

$^1$H-NMR (300.1 MHz, $C_6D_6$): δ=2.04 (s, 3H), 2.06 (s, 3H), 2.09 (s, 3H), 2.19 (s, 6H, p-MesCH$_3$), 2.22 (s, 12H, o-MesCH$_3$), 3.19 (t, 2H, P—CH$_2$, J=7.5 Hz), 4.10 (t, 2H, P—CH$_2$, J=7.5 Hz), 4.09 (m, 1H), 4.29 (m, 2H), 4.78 (br.), 5.02 (t, 1H, J=10.3 Hz), 5.45 (t, 1H, J=10.3 Hz), 6.46 (s, 2H, MesCH). $^{31}$P{$^1$H}-NMR (121.5 MHz, $C_6D_6$): δ=19.73 (br.).

EXAMPLE 15

Preparation of (2-mercaptoethyl)-bis(2,4,6-trimethyl-benzoyl)-phosphine oxide

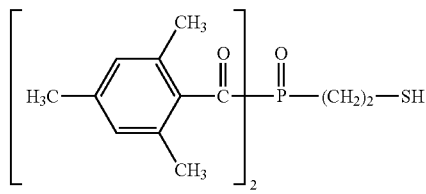

Sodium bis(2,4,6-trimethylbenzoyl)phosphide (example 1c) (250 mg, 0.72 mmol, 1 eq.) is dissolved in a mixture of dimethoxyethane (5 ml) and toluene (5 ml). Thiirane (43.2 mg, 0.72 mmol, 1 eq.) is added and the solution stirred for two days. The solution thus obtained contains the colorless bisacylphosphine ($^{31}$P NMR ($C_6D_6$, 121 MHz): δ=41.5 ppm). The solution is cooled down to 0° C. in an ice bath and hydrogen peroxide (10%) (0.244 ml, 0.72 mmol, 1 eq.) is added dropwise. Subsequently, the solution is stirred over night at room temperature. 5 ml Diethyl ether are added and the solution washed with sodium hydrogencarbonate solution (2%) and brine. After drying with sodium sulfate, the solvent is evaporated and the product recrystallized from toluene/n-hexane (5:95). A pale yellow product is obtained (Yield: 29%, 0.22 mmol, 83.6 mg). $^{31}$P-NMR: (121.5 MHz, $C_6D_6$): δ=24.3 (t, J=10.8 Hz).

EXAMPLE 16

Preparation of diethyl 2-(bis(2,6-dimethoxybenzoyl)-phosphoryl)ethylphosphonate

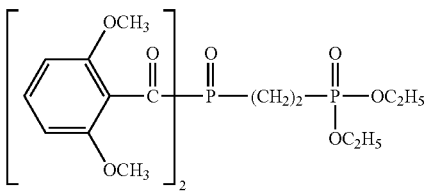

The compound is prepared from sodium bis(2,6-dimethoxybenzoyl)phosphide (example 8a) and bromoethylphosphonic diethylester by employing the method as described in example 1d). The product is obtained as yellow oil (Yield: 97.35 mg, 0.19 mmol, 74%).

$^1$H-NMR (250.13 MHz, CDCl$_3$): δ=1.19 ppm (m, 6H, OCH$_2$CH$_3$), 1.83 (m, 2H, PCH$_2$), 2.24 (m, 2H, PCH$_2$), 3.40 (s, 12H, O—CH$_3$), 3.95 (m, 4H, OCH$_2$CH$_3$), 6.31 (d, 4H, ArH, $^3$J=7.9 Hz), 7.07 (t, 2H, Ar—H, $^3$J=7.9 Hz). $^{31}$P-NMR (101.3 MHz, CDCl$_3$): δ=29.3 (P(OEt)$_3$), 21.3 ppm ((ArCO)$_2$P).

EXAMPLE 17

Preparation of (thiophene-3-yl-methyl)-(2,4,6-trimethyl-benzoyl)phosphine oxide

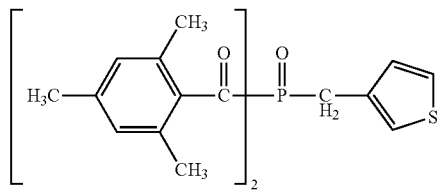

17a): Preparation of 3-(chloromethyl)thiophene

3-Hydroxythiophene (1.00 g, 0.90 ml, 8.77 mmol) is dissolved in CH$_2$Cl$_2$ (10 ml). The solution was cooled down to 0° C. and stirred vigorously. SOCl$_2$ (1.9 ml, 83.1 g, 26 mmol) is added dropwise. The ice bath is removed and the reaction mixture stirred at room temperature for one hour. Subsequently, the solvent is removed under vacuum. The remaining oil is dissolved in diethyl ether. Afterwards the solution is washed with aqueous sodium hydrogencarbonate (2%) solution, brine and dried over sodium sulfate. After evaporating the diethyl ether, the pure product is obtained (Yield: 0.88 g, 67%, 5.88 mmol).

$^1$H-NMR: (300.1 MHz, $C_6D_6$): δ=4.16 (s, 2H, ClCH$_2$), 6.73 (s, 1H, S—CH), 6.82 (br., 1H, CH$^4$), 7.2 (br., 1H, CH$^5$).

17b): Preparation of (thiophene-3-yl-methyl)-(2,4,6-trimethyl-benzoyl)-phosphine oxide Sodium bis(2,4,6-trimethylbenzoyl)phosphide (example 1c) (250 mg, 0.72 mmol, 1 eq.) and 3-chloromethylthiophene (95.4 mg, 0.72 mmol, 1 eq.) is dissolved in toluene (5 ml) and stirred for 12 hours at 50° C. The white precipitate of sodium chloride is removed by filtration and the solvent evaporated under reduced pressure at room temperature. The compound thus obtained is dissolved in toluene (10 ml) and hydrogen peroxide (10%) (0.19 ml, 0.72 mmol, 1 eq.). After stirring for 12 hours at 40° C., the oxidation is finished. Diethyl ether (25 ml) is added and the solution washed twice with an aqueous sodium hydrogen carbonate solution (2%), once with brine and finally with distilled water. After drying the diethyl ether solution with sodium sulfate and filtration, the solution is concentrated in vacuo. A yellow oil is obtained (Yield: 247 mg, 0.56 mmol, 83%).

$^1$H-NMR (300.1 MHz, $C_6D_6$): δ=1.95 (s, 6H, p-MesCH$_3$), 2.28 (s, 12H, p-MesCH$_3$), 2.45 (s, 2H, CH$_2$), 6.61 (MesCH), 6.85 (br., 1H, C$^2$H), 6.88 (m, 1H, C$^4$H), 7.06 (m, 1H, C$^3$H).

$^{31}$P-NMR (121.5 MHz, $C_6D_6$): δ=22.8 (t, J=11.3 Hz).

EXAMPLE 18

Preparation of 2-[bis(2,4,6-trimethylbenzoyl)phosphinyl]-acetic acid

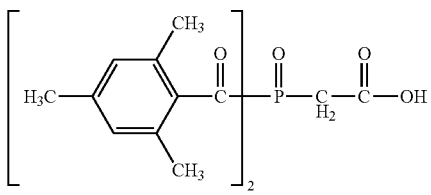

Sodium bis(2,4,6-trimethylbenzoyl)phosphide (example 1c) (1.00 g, 2.88 mmol, 1 eq.) is dissolved in tetrahydrofuran (5.00 ml). Bromoacetic acid (0.40 g, 2.88 mmol, 1 eq.) is dissolved in tetrahydrofuran (5.00 ml). The solutions are put together and stirred for 24 hours at room temperature. A white precipitate of sodium bromide forms. After removing the sodium bromide by filtration, the solution is evaporated in vacuo. The remaining yellow oil is dissolved in diethyl ether and washed with an aqueous and degassed ammonium chloride solution (5%). After the ether solution has been dried with sodium sulfate, the solvent is evaporated in vacuum at room temperature and dried in high vacuum for 4 hours. The compound is dissolved in degassed ethanol (5.00 ml), and hydrogen peroxide (30%) (0.29 ml, 2.60 mmol, 1 eq.) is added. The solution is stirred at 40° C. for one hour. The ethanol is removed in vacuo at room temperature. A white crystalline powder is obtained, which can be easily recrystallized from 40° C. warm water (Yield: Quantitative). M.P. 118.9° C. (decomposition).

$^1$H-NMR (300.1 MHz, $C_6D_6$): δ=1.66 (s, 1H, PCH$_2$), 2.40 (s, 6H, p-CH$_3$), 2.47 (s, 12H, o-CH$_3$), 6.63 (s, 4H, Mes-C$_3$).

$^{31}$P-NMR (121.5 MHz, $C_6D_6$): δ=19.6 (t, J=10.9 Hz).

EXAMPLE 19

Preparation of sodium 2-[bis(2,4,6-trimethylbenzoyl)-phosphinyl]-acetate

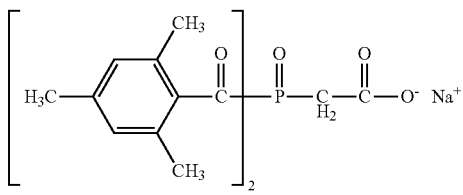

2-(bis(2,4,6-trimethylbenzoyl)phosphoryl)acetic acid (example 18b) (0.1 g, 0.25 mmol, 1 eq.) is suspended in distilled water (2 ml) and sodium hydrogencarbonate (21.0 mg, 0.25 mmol, 1 eq.) is added. A clear pale yellow solution is obtained. After removing the water in vacuo at room temperature, a pale yellow crystalline powder is isolated (Yield: quantitative). It is evident that the same procedure can be performed to synthesise other alkali salts of 2-(bis(2,4,6-trimethylbenzoyl)phosphoryl)acetic acid from carbonates or hydrogen-carbonates (e.g. with potassium hydrogen carbonate, or lithium carbonate).

$^1$H-NMR (300.1 MHz, D$_2$O): δ=1.66 (s, 1H, PCH$_2$), 2.43 (s, 6H, p-MesCH$_3$), 2.47 (s, 12H, o-MesCH$_3$), 6.64 (s, 4H, Mes-C$^3$). $^{31}$P-NMR (121.5 MHz, D$_2$O): δ=23.6 (t, J=10.8 Hz).

EXAMPLE 20

Preparation of 2-(bis(2,6-dimethoxybenzoyl)phosphinyl)-acetic acid

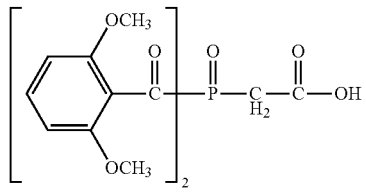

Sodium bis(2,6-dimethoxybenzoyl)phosphide (example 8a) (100 mg, 0.26 mmol, 1 eq.) is dissolved in dimethoxyethane (5 ml). Bromoacetic acid (36 mg, 0.26 mmol, 1 eq.) is dissolved in dimethoxyethane (2 ml) and added to this solution at room temperature. After stirring the reaction mixture for 2 hours, the solvent is removed in vacuo at room temperature. To a solution of 2-(bis(2,6-dimethoxybenzoyl)phosphino)acetic acid thus obtained (109 mg, 0.26 mmol, 1 eq.) in ethanol (4 ml), hydrogen peroxide (30%) (0.03 ml, 0.26 mmol, 1 eq.) are added slowly. The reaction mixture is stirred for 30 minutes. Subsequently, the solvent is removed in vacuo and the 2-(bis(2,6-dimethoxybenzoyl)phosphoryl)acetic acid is once again dissolved in ethanol. After filtration of the sodium bromide the solvent is evaporated in vacuo to yield crystalline 2-(bis(2,6-dimethoxybenzoyl)phosphinyl)acetic acid (Yield: 78%, 88 mg, 0.20 mmol).

$^1$H-NMR (300.1 MHz, d$^8$-thf): δ=3.34 (d, 2H, P—CH$_2$, $^2$J=3.9 Hz), 3.37 (s, 12H, O—CH$_3$), 6.29 (d, 4H, Ar—H, $^3$J=8.4 Hz), 7.06 (t, 2H, Ar—H, $^3$J=8.4 Hz). $^{31}$P{$^1$H}-NMR (121.5 MHz, d$^8$-thf): δ=22.2 (s).

EXAMPLE 21

Preparation of 11-[bis(2,4,6-trimethylbenzoyl)-phosphinyl]-undecanoic acid

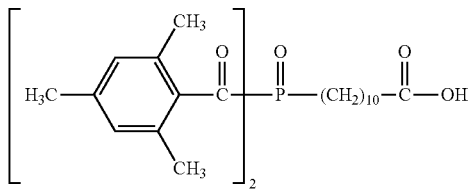

The compound is prepared by employing the method as described in example 1d) from sodium bis(2,4,6-trimethylbenzoyl)phosphide (example 1c) in THF and 11-bromoundecanoic acid. Obtained is a solid pale yellow product (Yield: 312.3 mg, 0.594 mmol, 82%).

$^1$H-NMR (300.1 MHz, $C_6D_6$): δ=(300.1 MHz, $C_6D_6$): δ=1.26-1.31 (m, 12H, —$CH_2$—), 1.48-1.50 (m, 4H, —$CH_2$—), 2.38 (t, 2H, J=5.7 Hz, —$CH_2$—COOH), 2.42 (s, 6H, p-$CH_3$), 2.53 (s, 12H, o-$CH_3$), 6.74 (s, 4H, Mes-$C^3$).
$^{31}$P-NMR (121.5 MHz, $C_6D_6$): δ=18.12 (t, $J_{CP}$=9.8 Hz).

EXAMPLE 22

Preparation of methyl 2-[bis(2,4,6-trimethylbenzoyl)-phosphinyl]-acetate

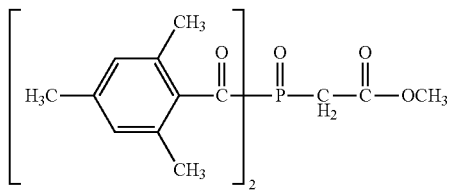

The compound is prepared by employing the method as described in example 1d) from sodium bis(2,4,6-trimethylbenzoyl)phosphide (example 1c) in toluene and bromoacetic acid methylester. Obtained is a yellow oil (Yield: 227 mg, 0.55 mmol, 77%).

$^1$H-NMR (250 MHz, $C_6D_6$, 25° C.): δ=6.43 (s, 4H, MesCH), 3.88 (t, 3H, J=7.2 Hz, $OCH_3$), 3.23 (s, 2H, $PCH_2$), 2.23 (s, 12H, o-$MesCH_3$), 1.97 (s, 6H, p-$MesCH_3$). $^{31}P\{^1H\}$-NMR (101.3 MHz, $C_6D_6$): δ=26.2 (t, J=9.8 Hz).

EXAMPLE 23

Preparation of 2-(bis(2,4,6-trimethylbenzoyl)-phosphoryl)acetamide

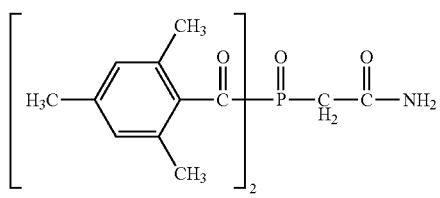

The compound is prepared by employing the method as described in example 1d) from sodium bis(2,4,6-trimethylbenzoyl)phosphide (example 1c) in toluene and bromoacetamide. Obtained is a pale yellow product (Yield: 87%, 0.63 mmol, 251.4 mg).

$^1$H-NMR (300.1 MHz, $C_6D_6$): δ=1.64 (s, 6H, p-$MesCH_3$), 2.34 (s, 12H, o-$MesCH_3$), 2.43 (s, 2H, $CH_2$), 5.21 (br., 2H, $NH_2$), 6.83 (MesCH). $^{31}$P-NMR (121.5 MHz, $C_6D_6$): δ=20.6 (t, J=4.7 Hz).

EXAMPLE 24

Preparation of (3-(triethoxysilyl)propyl)-(2,4,6-trimethyl-benzoyl)phosphine oxide

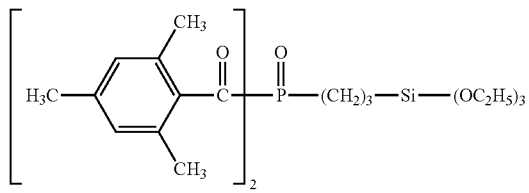

Sodium bis(2,4,6-trimethylbenzoyl)phosphide (example 1c (4.28 g, 12.3 mmol, 1 eq.) is dissolved in tetrahydrofuran (10 ml). 3-Iodopropyl-triethoxysilane (1.85 g, 8.78 mmol, 1 eq.), which is prepared according to G. Dubois et al., J. Mat. Chem. 2002, 12, 2255, is added and the solution stirred for 3 hours at 50° C. The tetrahydrofuran is evaporated in vacuo and the remaining oil dissolved in toluene. A white precipitate of sodium iodide forms. After removing the sodium iodide by filtration over celite, the solution is evaporated in vacuo. The phosphane thus obtained ($^{31}$P NMR ($C_6D_6$, 80.0 MHz): δ=51.39) is a pale yellow oil. It is dissolved in 10 ml toluene. 50 mg potassium hydrogen carbonate are dissolved in 3.80 ml (12.3 mmol, 1 eq.) hydrogen peroxide (10%). This solution is added to the toluene solution of the phosphane. The oxidation is complete after stirring for 4 hours at 40° C. Diethyl ether (50 ml) is added and the solution washed twice with a sodium hydrogen carbonate solution (2%), once with brine and finally with distilled water. After drying with magnesium sulfate and filtration, the solution is concentrated in vacuo. A yellow oil is obtained (Yield: 6.19 g, 11.3 mmol, 92%).

$^1$H-NMR (300.13 MHz, $C_6D_6$): δ=6.66 (s, 4H, $MesC^4$), 3.83 (q, J=7.00, 6H, $OCH_2CH_3$), 2.49 (s, 12H, o-$MesCH_3$), 2.07 (s, 6H, p-$MesCH_3$), 1.45-1.37 (br., 2H, $PCH_2CH_2$), 1.24 (t, J=7.00 Hz, 9H, $OCH_2CH_3$), 1.15-0.93 (br., 2H, $PCH_2$), 0.81 (t, J=7.80 Hz, 2H, $SiCH_2$).
$^{31}$P-NMR (121.49 MHz, $C_6D_6$): δ=27.7 (t, J=9.60 Hz).

EXAMPLE 25

Preparation of (3-[diethoxy(methyl)silyl]propyl)-(2,4,6-trimethyl-benzoyl)phosphine oxide

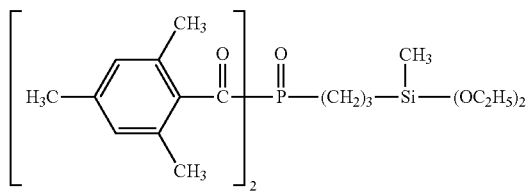

Sodium bis(2,4,6-trimethylbenzoyl)phosphide (example 1c) (3.05 g, 8.76 mmol, 1 eq.) is dissolved in tetrahydrofuran (10 mL). 3-Chloropropyl-diethoxymethylsilane (1.85 g, 8.78 mmol, 1 eq.) and sodium iodide (0.48 g, 3.20 mmol, 0.37 eq.) are added and the solution stirred for 18 hours at 50° C. Tetrahydrofuran is evaporated in vacuo and the remaining oil dissolved in toluene. A white precipitate of sodium iodide forms. After removing the sodium iodide by filtration over celite, the solution is evaporated in vacuo. The phosphane thus obtained ($^{31}$P NMR (121.49 MHz, C$_6$D$_6$): δ=44.3) is a pale yellow oil, which is dissolved in toluene (10 ml). Potassium hydrogen carbonate (50 mg) is dissolved in hydrogen peroxide (10%) (1.08 ml, 3.53 mmol, 1 eq.). and this solution added to the toluene solution of the phosphane. After stirring for 4 hours at 40° C., the oxidation is complete. 50 mL diethyl ether are added and the solution washed twice with a sodium hydrogen carbonate solution (2%), and once each with brine and distilled water. After drying with magnesium sulfate and filtration the solution is concentrated in vacuo. (Yield: 3.98 g, 7.71 mmol, 88%).

$^1$H-NMR (300.13 MHz, C$_6$D$_6$): δ=6.69 (s, 4H, MesCH), 3.75 (q, J=6.93, 4H, OCH$_2$), 2.44 (s, 12H, o-MesCH$_3$), 2.10 (s, 6H, p-MesCH$_3$), 1.24 (t, J=6.93, 6H, OCH$_2$CH$_3$), 1.08-0.96 (m, 4H, PCH$_2$+PCH$_2$CH$_2$), 0.76-0.72 (br., 2H, SiCH$_2$), 0.39 (s, 3H, SiCH$_3$). $^{31}$P-NMR (121.49 MHz, C$_6$D$_6$): δ=27.7 (br.)

EXAMPLE 26

Preparation of (3-[diethoxy(phenyl)silyl]propyl)-(2,4,6-trimethyl-benzoyl)phosphine oxide

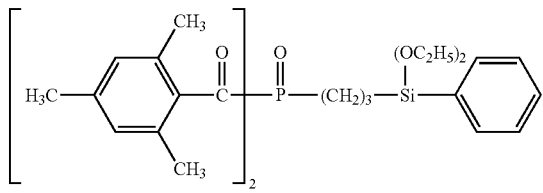

Sodium bis(2,4,6-trimethylbenzoyl)phosphide (example 1c) (250 mg, 0.72 mmol, 1 eq.) is dissolved in a mixture of tetrahydrofuran (5 ml) and dimethoxyethane (3 ml). 3-Chloropropyldiethoxyphenylsilane (200 mg, 0.72 mmol, 1 eq.) is added and the solution stirred for 20 days at 50° C. The white precipitate of sodium chloride is removed by filtration and the solvent evaporated under reduced pressure at room temperature. The phosphane thus obtained ($^{31}$P NMR (121.49 MHz, C$_6$D$_6$): δ=45.2) is a pale yellow oil. It is dissolved in toluene (10 ml). Potassium hydrogen carbonate (50 mg) is dissolved in hydrogen peroxide (10%) (0.20 ml, 0.72 mmol, 1 eq.). This solution is added to the toluene solution of the phosphane. After stirring for 17 hours at 40° C. the oxidation is complete. Diethyl ether (50 ml) is added and the solution washed twice with a sodium hydrogen carbonate solution (2%), once with brine and finally with distilled water. After drying the diethyl ether solution with sodium sulfate and filtration, the solution is concentrated in vacuo. A yellow oil is obtained (Yield: 369 mg, 0.64 mmol, 89%).

$^1$H-NMR (300.13 MHz, C$_6$D$_6$): δ=7.82-7.81 (m, 2H, o-PhCH), 7.33-7.27 (m, 2H, pPhCH), 6.65 (s, 4H, MesCH), 3.82-3.75 (br., 4H, OCH$_2$CH$_3$), 2.45 (s, 12H, o-MesCH$_3$), 2.07 (s, 6H, p-MesCH$_3$), 1.91-1.83 (m, 2H, PCH$_2$CH$_2$), 1.25-1.20 (m, 6H, OCH$_2$CH$_3$), 1.00-0.88 (m, 2H, SiCH$_2$), 0.59-0.50 (m, 2H, PCH$_2$).

$^{31}$P-NMR (121.49 MHz, C$_6$D$_6$): δ=27.8 (t, J=9.48 Hz).

EXAMPLE 27

Preparation of propyn-3-yl 2-[bis(2,4,6-trimethylbenzoyl)phosphinyl]acetat

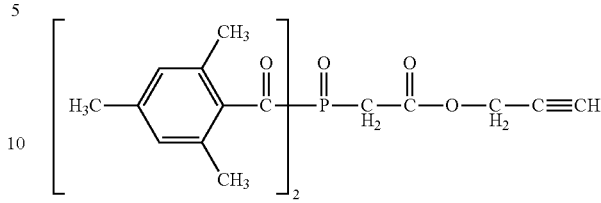

2.9 g (7 mmol) methyl 2-(bis(2,4,6-trimethylbenzoyl)-phosphinyl)acetate (example 22) is dissolved in a tenfold excess of 2-propyn-1-ol and heated to 90° C. during 12 hours in the presence of 10 mol % dibutyltin dilaurate. Excess 2-propyn-1-ol is distilled off under vacuum and the residual oil purified by preparative column chromatography (silica gel, eluent toluene/ethyl acetate 9:1). 1.7 g (55%) propyn-3-yl 2-[bis(2,4,6-trimethylbenzoyl)-phosphoryl]acetate are obtained as yellowish oil.

$^1$H-NMR (400 MHz, CDCl$_3$): δ=6.86 (s, 4H, MesCH), 4.67 (d, 2H, OCH$_2$CCH), 3.48 (d, 2H, PCH$_2$), 2.45 (s, 1H, OCH$_2$CCH), 2.28 (s, 6H, p-MesCH$_3$), 2.27 (s, 12H, oMesCH$_3$).

$^{31}$P-NMR (121.49 MHz, CDCl$_3$): δ=17.6.

EXAMPLE 28

Preparation of 2-(propyn-3-oxy)ethyl 2-[bis(2,4,6-trimethylbenzoyl)phosphinyl]acetat

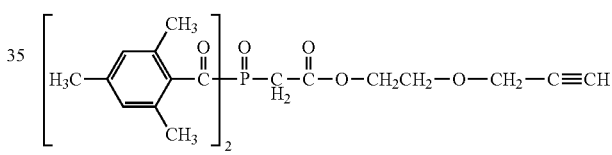

The compound of example 28 is prepared as the one of example 27 except that 2-(2-propyn-1-yloxy)-ethanol is used instead of 2-propyn-1-ol.

$^1$H-NMR (400 MHz, CDCl$_3$): δ=6.84 (s, 4H, MesCH), 4.48 (d, 2H, COOCH$_2$CH$_2$O—), 4.26 (t, 2H, —CH$_2$OCH$_2$—), 4.18 (t, 2H, —CH$_2$OCH$_2$—), 3.45 (d, 2H, PCH$_2$), 2.43 (s, 1H, OCH$_2$CCH), 2.27 (s, 6H, p-MesCH$_3$), 2.25 (s, 12H, o-MesCH$_3$).

EXAMPLE 29

Preparation of 2-[2-(propyn-3-oxy)-2-ethyoxy]ethyl 2-(bis(2,4,6-trimethylbenzoyl)-phosphinyl)acetat

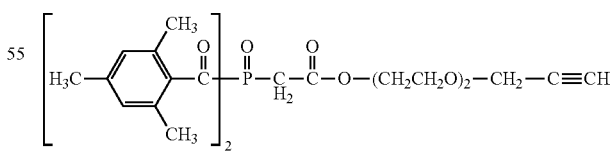

The compound of example 29 is prepared as the one of example 27 except that 2-[2-(propyn-1-yloxy)ethoxy]ethanol is used instead of 2-propyn-1-ol.

$^1$H-NMR (400 MHz, CDCl$_3$): δ=6.84 (s, 4H, MesCH), 4.48 (d, 2H, COOCH$_2$CH$_2$O—), 4.25-4.10 (m, 8H, —CH$_2$OCH$_2$CH$_2$OCH$_2$—), 3.46 (d, 2H, PCH$_2$), 2.44 (s, 1H, OCH$_2$CCH), 2.28 (s, 6H, p-MesCH$_3$), 2.26 (s, 12H, o-MesCH$_3$).

EXAMPLE 30

Preparation of 2-(methacryloyloxy)-ethyl 2-(bis(2,4,6-trimethylbenzoyl)phosphinyl)acetat

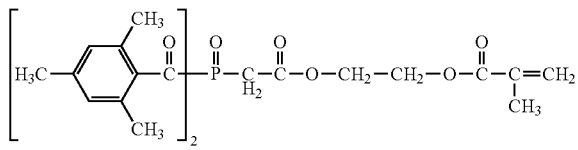

The compound of example 30 is prepared as the one of example 27 except that 2-hydroxyethyl methacrylate is used instead of 2-propyn-1-ol.

$^1$H-NMR (400 MHz, CDCl$_3$): δ=6.85 (s, 4H, MesCH), 6.10 (d, 1H, O(C=O)—C(CH$_3$)=CHH$_{cis}$), 5.55 (d, 1H, O(C=O)—C(CH$_3$)=CH$_{trans}$H), 4.50-4.35 (m, 4H, COOCH$_2$CH$_2$O—), 3.48 (d, 2H, PCH$_2$), 2.30 (s, 6H, p-MesCH$_3$), 2.28 (s, 12H, oMesCH$_3$), 1.95 (dxd, 3H, O(C=O)—C(CH$_3$)=CH$_2$).

$^{31}$P{$^1$H}-NMR (101.3 MHz, C$_6$D$_6$): δ=24.2.

EXAMPLE 31

Preparation of 2-(acryloyloxy)-ethyl 2-(bis(2,4,6-trimethylbenzoyl)phosphinyl)acetat

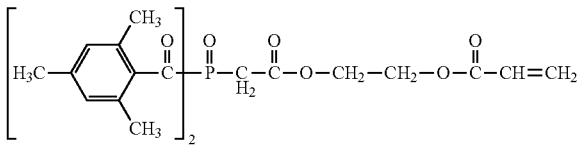

The compound of example 31 is prepared as the one of example 27 except that 2-hydroxyethyl acrylate is used instead of 2-propyn-1-ol.

$^1$H-NMR (400 MHz, CDCl$_3$): δ=6.85 (s, 4H, MesCH), 6.45 (dxd, 1H, O(C=O)—CH=CHH$_{cis}$), 6.35 (dxd, 1H, O(C=O)—CH=CH$_2$), 6.05 (dxd, 1H, O(C=O)—CH=CH$_{trans}$H), 4.45-4.30 (m, 4H, COOCH$_2$CH$_2$O—), 3.47 (d, 2H, PCH$_2$), 2.28 (s, 6H, p-MesCH$_3$), 2.26 (s, 12H, o-MesCH$_3$), $^{31}$P{$^1$H}-NMR (101.3 MHz, C$_6$D$_6$): δ=23.2.

Synthesis of Polymer-Bound Bisacylphosphine Oxides

EXAMPLE 32

Preparation of poly(ethyl 2-((bis(2,4,6-trimethylbenzoyl)phosphoryl)methyl)acrylate

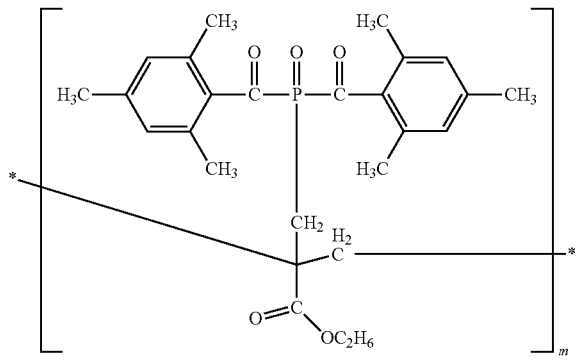

Ethyl 2-([bis{2,4,6-trimethylbenzoyl}phosphinyl]methyl) acrylate (example 2) (250 mg) is dissolved in toluene (5 ml). AIBN (3 mol %) is added and the solution is stirred for two days at 60° C. After removing the solvent, a pale yellow solid is obtained (Yield: quantitative).

$^1$H-NMR (250 MHz, C$_6$D$_6$): δ=6.69 (s, 4H, Mes), 4.08 (m, 2H, OCH$_2$CH$_3$), 3.64 (m, 2H, PCH$_2$), 2.41 (m, 12H, Mes-o-CH$_3$), 2.15 (m, 6H, Mes-p-CH$_3$), 1.15 (m, 3H, OCH$_2$CH$_3$).

$^{31}$P-NMR (101.3 MHz, C$_6$D$_6$): δ=26.9 (br.).

EXAMPLE 33

Preparation of a Cellulose Polymer Comprising bis(2,4,6-trimethylbenzoyl)phosphine Oxide Moities

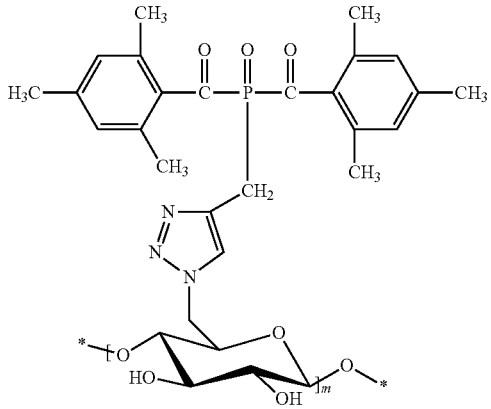

33a): Preparation of Cellulose Tosylate

Following the synthesis described by T. Heinze et al., J. Appl. Polym. Sci. 1996, 60, 1891, a mixture of triethylamine (59.4 ml, 427.2 mmol) and dimethylacetamide (DMA) (40.6 mL) is added to a solution of 20.2 g of air-dry cellulose in DMA/LiCl (4.3% w/w) while stirring. After cooling to about 8° C., a solution of p-toluenesulfonyl chloride (40.7 g, 213.6 mmol) in DMA (60 mL) is added dropwise within 30 min. The homogeneous reaction mixture is stirred for 24 h at 8° C., and then slowly poured into ice water (5 l). The precipitate is filtered off, carefully washed with a mixture of distilled water (15 l) and ethanol (2 l) and finally suspended in acetone (1 l) in order to dissolve impurities. Subsequently, water (3 l) is added to separate the cellulose from the acetone by filtration. After filtration and washing with ethanol, the sample is dried at 50° C. under vacuum (Yield: 75%), degree of substitution (DS)=1.36 (based on sulphur analysis).

33b): Preparation of 6-azido-6-deoxy cellulose

Sodium azide (7.49 g, 0.115 mol) is added to a solution of tosyl cellulose (prepared as described in example 33a) (7.0 g, 0.023 mol; DS (degree of substitution)=0.92) in dimethyl formamide (120 ml) and the reaction mixture stirred at 100° C. for 24 h. Isolation is carried out by precipitation of the mixture in water (600 ml) and filtration of the polymer. After washing five times with water (250 ml), five times with of ethanol (250 ml), and drying at 60° C. under vacuum the product, 6-azido-cellulose is obtained. Degree of substitution (DS): 0.88 (calculated from N-content determined by elemental analysis). IEA: Calc.: C, 38.92; H, 4.90; N, 20.88%. Found C, 37.94; H, 5.10; N, 19.41%.

$^1$H-NMR (dmso-d6): δ=5.54-4.39 (AGU).

33c): Preparation of Cellulose Polymer Comprising bis(2,4,6-trimethylbenzoyl)phosphine Oxide Moities 6-Azido-6-deoxy cellulose (DS 0.60) (0.3 g, 1.64 mmol, 1 eq.) and (prop-2-yn-yl)bis(2,4,6-trimethylbenzoyl)-phosphine (example 4) (0.62 g, 1.64 mmol, 1 eq.) are dissolved in dimethsulfoxide (30 ml). A solution of copper(II) sulfate pentahydrate (0.012 g, 0.049 mmol, 3 mol %) in water (5 ml) and a solution of sodium ascorbate (0.019 g, 0.098 mmol) dissolved in water (5 ml) are added. After stirring the mixture at 70° C. for 24 h, the product is precipitated by adding methanol (75 ml). The polymer is collected by filtration. The product is washed three times with methanol (200 ml) and dried in vacuo to yield BAPO-cellulose. Degree of substitution (DS): 0.52 (calculated from N, C and H content, determined by elemental analysis). $^{31}$P-NMR (DMSO-d$^6$): 21.9 (br.).

$^1$H-NMR (DMSO-d$^6$): 7.25 (s, =CH—N, triazole) 6.87 (br., MesCH), 3.3-4.5 (br., ROH), 2.44 (br., o-MesCH$_3$), 2.21 (br., p-MesCH$_3$), 2.07 (P—CH$_2$).

EA: Determined: [C]: 48.27%, [H]: 5.87%, [N]: 9.98%.

EXAMPLES 34-50

Silicones Functionalized with Bisacylphosphine Oxide (BAPO) Moieties

The compounds of the examples 34-50 are prepared according to the following general procedure, using the siloxane modified BAPO and possibly alkoxysilane comonomers as indicated in the examples:

A diluted solution of the corresponding BAPO-functionalised di- or tri-alkoxysilane and the comonomers in toluene are stirred together with an excess of hydrochloric acid (1%) for two hours at 40° C. The organic layer is separated and washed once with sodium hydrogencarbonate solution (2%) and twice with brine. After drying with sodium sulfate, toluene is removed at room temperature in vacuo. The pale yellow product is obtained in almost quantitative yields.

EXAMPLE 34

Poly(3-(triethoxysilyl)propyl)bis(2,4,6-trimethylbenzoyl)phosphine oxide

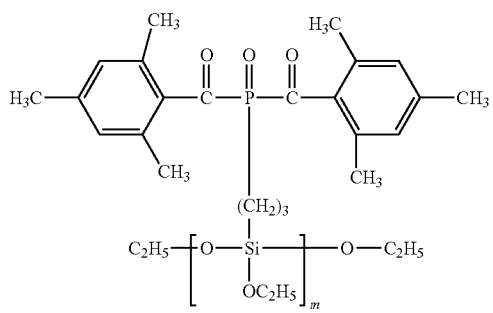

Starting material: 3-(Triethoxysilyl)propyl)-(2,4,6-trimethyl-benzoyl)-phosphine oxide of example 24.

$^1$H-NMR (300.13 MHz, C$_6$D$_6$): δ=6.74 (s, 4H, MesCH), 3.80 (q, J=7.05 Hz, 4H, OCH$_2$CH$_3$), 2.43 (s, 12H, o-MesCH$_3$), 2.16 (s, 6H, p-MesCH$_3$), 1.52-1.37 (br., 2H, PCH$_2$CH$_2$), 1.15 (t, J=7.05, 6H, OCH$_2$CH$_3$), 1.11-1.00 (br., 4H, PCH$_2$+SiCH$_2$). $^{31}$P-NMR (121.49 MHz, C$_6$D$_6$): δ=27.7 (br.). GPC: M$_n$=256'278 g/mol, M$_w$=468'595 g/mol, Q=1.828.

EXAMPLE 35

Poly(3-(diethoxymethylsilyl)propyl)bis(2,4,6-trimethylbenzoyl)phosphine oxide

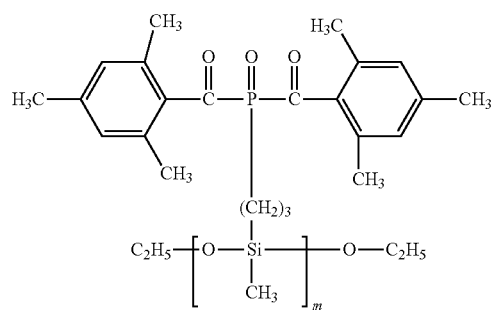

Starting material: 3-(Diethoxymethyl)silylpropyl)(2,4,6-trimethyl-benzoyl)-phosphine oxide of Example 25

$^1$H-NMR (300.13 MHz, C$_6$D$_6$): δ=6.70 (s, 4H, Mes), 2.43 (s, 12H, Mes-o-CH$_3$), 2.22 (s, 6H, Mes-pCH$_3$), 1.90-1.78 (m, 2H, SiCH$_2$CH$_2$CH$_2$P), 0.40 (s, 3H, SiCH$_3$), not visible in the spectrum: OCH$_2$CH$_3$, SiCH$_2$, PCH$_2$.

$^{31}$P{1H} NMR (121.49 MHz, C$_6$D$_6$): δ=27.7 (m). GPC: M$_n$=245'079 g/mol, M$_w$=407'489 g/mol, Q=1.663.

EXAMPLE 36

Poly(3-(diethoxyphenylsilyl)propyl)bis(2,4,6-trimethylbenzoyl)phosphine oxide

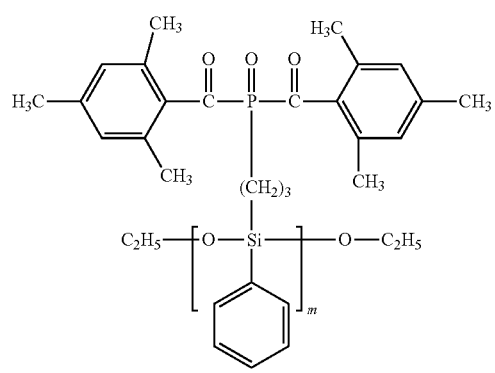

Starting material: 3-(Diethoxyphenyl)silylpropyl)(2,4,6-trimethyl-benzoyl)-phosphine oxide of example 26.

$^1$H-NMR (300.13 MHz, C$_6$D$_6$): δ=7.82-7.80 (m, 2H, Ph-o-H), 7.33-7.27 (m, 3H, Ph-m-H, Ph-p-H), 6.65 (s, 4H, Mes), 3.82-3.63 (m, 4H, OCH$_2$CH$_3$), 2.45 (s, 12H, Mes-o-CH$_3$), 2.07 (s, 6H, Mes-p-CH$_3$), 1.95-1.83 (m, 2H, SiCH$_2$CH$_2$CH$_2$P), 1.25-1.21 (m, 6H, OCH$_2$CH$_3$), 1.09-0.92 (m, 4H, PCH$_2$, SiCH$_2$).

$^{31}$P-NMR (121.49 MHz, C$_6$D$_6$): δ=27.8 (t, J=8.08 Hz).

GPC: M$_n$=155'675 g/mol, M$_w$=294'401 g/mol, Q=1.891

EXAMPLE 37

Preparation of (3-(diethoxymethylsilyl)propyl)bis-(2,4,6-trimethylbenzoyl)phosphine oxide/dimethoxydimethylsilane copolymer

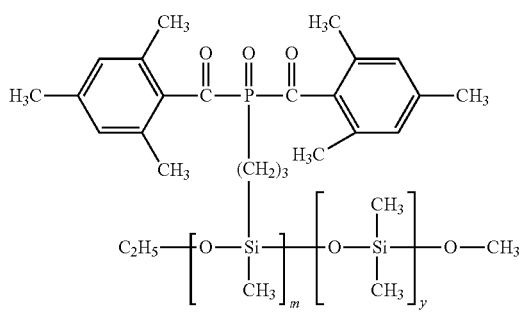

ratio m:y = 1:20
the distribution of the n-groups and m-groups in the copolymer is statistical, thus representing a "random copolymer"

Starting materials: 3-(diethoxymethyl)silylpropyl)(2,4,6-trimethyl-benzoyl)-phosphine oxide of example 25/dimethoxydimethylsilane, ratio 1:20.

$^1$H-NMR (250 MHz, $C_6D_6$): δ=7.95-7.88 (m, 2H, o-PhCH), 7.32-7.28 (m, 4H, m-PhCH+pPhCH), 6.68 (s, 4H, MesCH), 4.05-3.96 (br., 4H, $OCH_2CH_3$), 3.57 (s, 6H, 2×$SiOCH_3$), 2.44 (s, 12H, o-$MesCH_3$), 2.09 (s, 6H, p-$MesCH_3$), 1.29-1.23 (br., 6H, $OCH_2CH_3$), 1.06-0.90 (br., 2H, $SiCH_2$), 0.87-0.66 (br., 2H, $PCH_2$), 0.41 (s, 6H, 2×$SiCH_3$).

$^{31}$P-NMR (101.25 MHz, $C_6D_6$): δ=28.3-27.6 (br.).

EXAMPLE 38

Preparation of (3-(diethoxymethylsilyl)propyl)-bis(2,4,6-trimethylbenzoyl)phosphine oxide/diethoxydimethylsilan copolymer

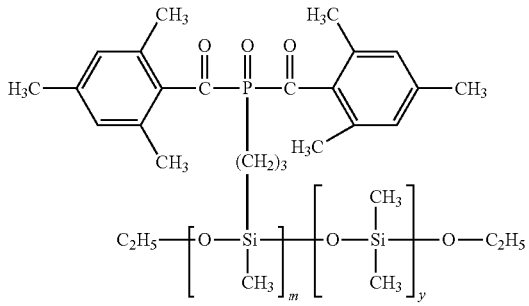

ratio m:y = 5:95
the distribution of the n-groups and m-groups in the copolymer is statistical, thus representing a "random copolymer"

Starting materials: 3-(diethoxymethyl)silylpropyl)-(2,4,6-trimethyl-benzoyl)oxydimethylsilane, ratio 5:95.

$^1$H-NMR (400.13 MHz, $C_6D_6$): δ=6.68 (s, 4H, MesCH), 3.83 (q, J=7.00 Hz, 4H, $OCH_2CH_3$), 2.45 (s, 12H, o-Mes $CH_3$), 2.09 (s, 6H, p-$MesCH_3$), 1.91-1.73 (m, 2H, $PCH_2CH_2$), 1.29 (t, J=7.00, 6H, $OCH_2CH_3$), 1.18-1.12 (br., 4H, $SiCH_2+PCH_2$), 0.30 (s, 6H, $SiCH_3$).

$^{31}$P-NMR (101.25 MHz, $C_6D_6$): δ=28.6-27.2 (br.).
GPC: $M_n$=1544 g/mol, $M_w$=2139 g/mol, Q=1.38.

EXAMPLE 39

Preparation of (3-(diethoxymethylsilyl)propyl)bis-(2,4,6-trimethylbenzoyl)phosphine oxide/diethoxydimethylsilane copolymer

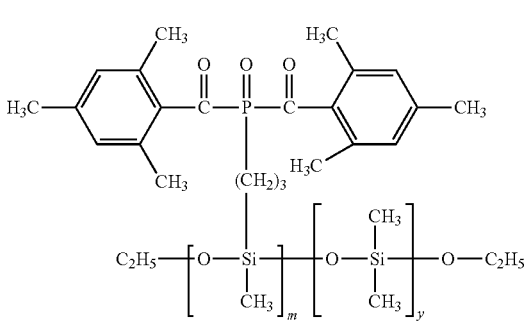

ration m:y = 1:20
the distribution of the n-groups and m-groups in the copolymer is statistical, thus representing a "random copolymer"

Starting materials: 3-(diethoxymethyl)silylpropyl)-(2,4,6-trimethylbenzoyl)-phosphine oxide of example 25/diethoxydimethylsilane, ratio 1:20.

$^1$H-NMR (250.13 MHz, $C_6D_6$): δ=6.69 (s, 4H, MesCH), 3.05 (br., 9H, $OCH_2CH_3$), 2.43 (s, 12H, o-$MesCH_3$), 2.09 (s, 6H, p-$MesCH_3$), 1.95-1.83 (m, 2H, $PCH_2CH_2$), 1.47-1.33 (br., 6H, $OCH_2CH_3$), 1.07-0.93 (br., 2H, $SiCH_2$), 0.40 (s, 6H, $SiCH_3$) (not visible in the spectrum: $PCH_2$).

$^{31}$P-NMR (101.25 MHz, $C_6D_6$): δ=27.8 (br.).

GPC: Mn=298'369 g/mol, Mw=886'298 g/mol, Q=2.970.

EXAMPLE 40

Preparation of (3-(diethoxymethylsilyl)propyl)bis-(2,4,6-trimethylbenzoyl)phosphine oxide/diethoxydimethylsilane copolymer

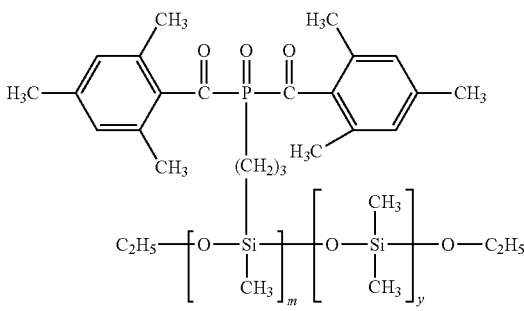

ratio m:y = 1:9
the distribution of the n-groups and m-groups in the copolymer is statistical, thus representing a "random copolymer"

Starting materials: 3-(diethoxymethyl)silylpropyl)-(2,4,6-trimethylbenzoyl)-phosphine oxide of example 25/diethoxydimethylsilane, ratio 1:9.

GPC: Mn=1544 g/mol, Mw=2139 g/mol, $M_w/M_n$=1.38.

EXAMPLE 41

Preparation of (3-(diethoxyphenylsilyl)propyl)bis-(2, 4,6-trimethylbenzoyl)phosphine oxide/dimethoxydimethylsilane copolymer

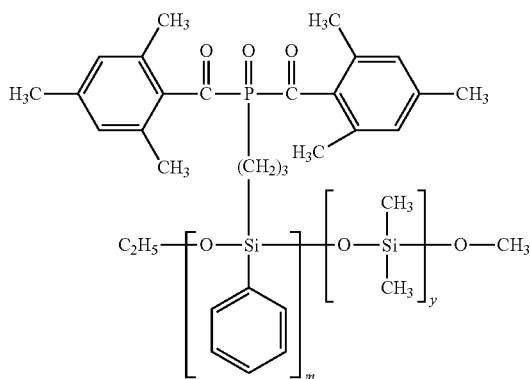

ratio m:y = 1:20
the distribution of the n-groups and m-groups
in the copolymer is statistical, thus representing
a "random copolymer"

Starting materials: 3-(diethoxyphenyl)silylpropyl)-(2,4,6-trimethylbenzoyl)-phosphine oxide of example 26/dimethoxydimethylsilane, ratio 1:20.

$^1$H-NMR (250.13 MHz, $C_6D_6$): δ=7.93-7.81 (m, 6H, o-PhCH), 7.32-7.28 (br., 4H, m-PhCH+p-PhCH), 6.65 (s, 4H, MesCH), 3.83-3.75 (br., 4H, $OCH_2CH_3$), 3.57 (s, 6H, $OCH_3$), 2.44 (s, 12H, oMesCH$_3$), 2.08 (s, 6H, p-MesCH$_3$), 1.95-1.84 (br., 2H, $PCH_2CH_2$), 1.27-1.21 (br., 6H, $OCH_2CH_3$), 1.12-0.89 (br., 4H, $SiCH_2$+$PCH_2$), 0.41 (s, 6H, $SiCH_3$).

$^{31}$P-NMR (101.25 MHz, $C_6D_6$): δ=27.8 (t, J=9.06 Hz).

EXAMPLE 42

Preparation of (3-(diethoxyphenylsilyl)propyl)bis-(2, 4,6-trimethylbenzoyl)phosphine oxide/diethoxydimethylsilane copolymer

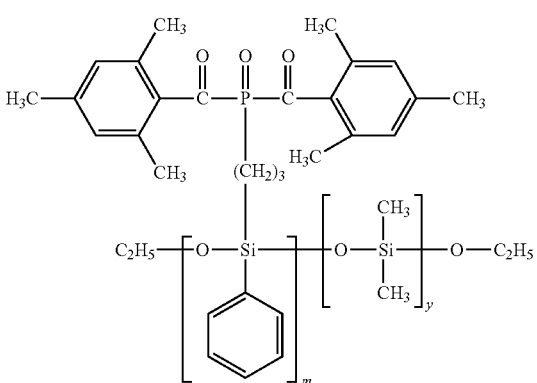

ratio m:y = 1:20
the distribution of the n-groups and m-groups
in the copolymer is statistical, thus representing
a "random copolymer"

Starting materials: 3-(diethoxyphenyl)silylpropyl)-(2,4,6-trimethyl-benzoyl)phosphine oxide of example 26/diethoxydimethylsilane, ratio 1:20

$^1$H-NMR (250.13 MHz, $C_6D_6$): δ=7.83-7.81 (m, 2H, o-PhCH), 7.34-7.27 (m, 3H, m-PhCH+p-PhCH), 6.65 (s, 4H, MesCH), 3.86-3.75 (br., 4H, $OCH_2CH_3$), 2.41 (s, 12H, o-MesCH$_3$), 2.08 (s, 6H, p-MesCH$_3$), 1.95-1.83 (m, 2H, $SiCH_2CH_2$), 1.33-1.21 (br., 6H, $OCH_2CH_3$), 1.08-0.94 (m, 2H, $SiCH_2$), 0.41 (s, 6H, $SiCH_3$) (not visible in the spectrum: $PCH_2$)

$^{31}$P NMR (101.25 MHz, $C_6D_6$): δ=28.6 (Br.).

GPC: Mn=165'588 g/mol, Mw=315'434 g/mol, Q=1.905.

EXAMPLE 43

Preparation of (3-(diethoxyphenylsilyl)propyl)bis-(2, 4,6-trimethylbenzoyl)phosphine oxide/diethoxydimethylsilane copolymer

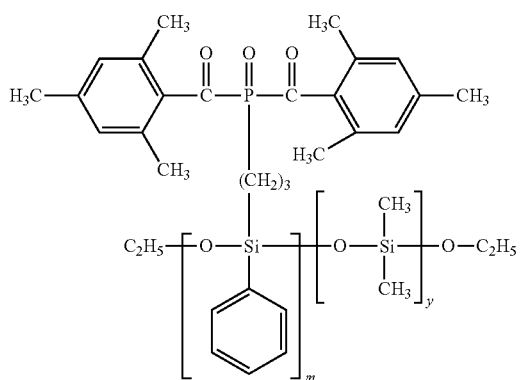

ratio m:y = 1:9
the distribution of the n-groups and m-groups
in the copolymer is statistical, thus representing
a "random copolymer"

Starting materials: 3-(diethoxyphenyl)silylpropyl)-(2,4,6-trimethyl-benzoyl)phosphine oxide of example 26/diethoxydimethylsilane, ratio 1:9.

GPC: Mn=165588 g/mol, Mw=315434 g/mol, $M_w/M_n$=1.91.

EXAMPLE 44

Preparation of (3-(triethoxysilyl)propyl)bis(2,4,6-trimethylbenzoyl)phosphine oxide/triethoxy(vinyl)silane copolymer

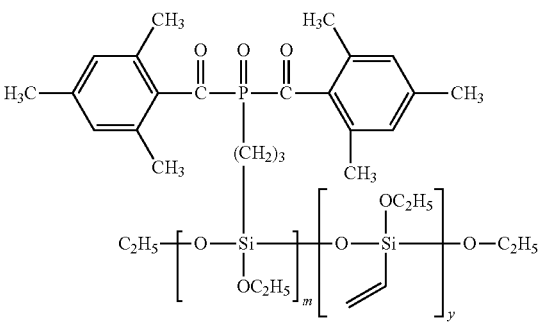

ratio m:y = 1:1
the distribution of the n-groups and m-groups
in the copolymer is statistical, thus representing
a "random copolymer"

Starting material: 3-(triethoxysilyl)propyl)-(2,4,6-trimethyl-benzoyl)phosphine oxide of example 24/triethoxyvinylsilane, ratio 1:1.

$^1$H-NMR (300 MHz, $C_6D_6$): δ=6.74 (s 4H, Mes), 6.08 (m, 3H, CH=CH$_2$), 3.64 (m, 2H, $OCH_2CH_3$), 2.43 (s, 12H, MesoCH$_3$), 2.15 (s, 6H, Mes-p-CH$_3$), 1.47 (m 2H, SiCH$_2$CH$_2$CH$_2$P), 1.15 (t, J=7.0 Hz 3H, OCH$_2$CH$_3$).

$^{31}$P-NMR (101.3 MHz, C$_6$D$_6$): δ=28.1 (br.).

$^{31}$P{$^1$H}-NMR (101.3 MHz, C$_6$D$_6$): δ=28.6 (br.).

EXAMPLE 45

Preparation of (3-(triethoxysilyl)propyl)bis(2,4,6-trimethylbenzoyl)phosphine oxide/triethoxy(vinyl)silane copolymer

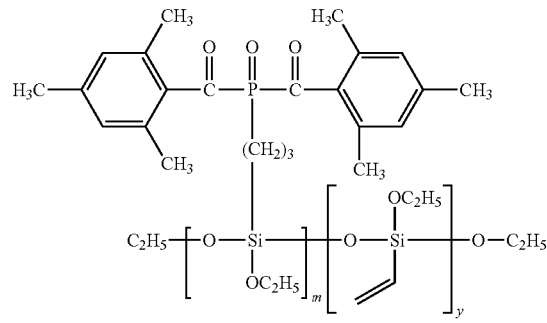

ratio m:y = 1:3
the distribution of the n-groups and m-groups in the copolymer is statistical, thus representing a "random copolymer"

Starting material: 3-(triethoxysilyl)propyl) of example 24/triethoxyvinylsilane, ratio 1:3.

$^1$H-NMR (300 MHz, C$_6$D$_6$): δ=6.75 (s, 4H, Mes), 6.22 (m, 3H, CH=CH$_2$), 3.74 (q, J=7.0 Hz, 2H, OCH$_2$CH$_3$), 2.47 (s, 12H, Mes-o-CH$_3$), 2.15 (s, 6H, Mes-pCH$_3$), 1.47 (m, 2H, SiCH$_2$CH$_2$CH$_2$P), 1.18 (m, 3H, OCH$_2$CH$_3$).

$^{31}$P-NMR (101.3 MHz, C$_6$D$_6$): δ=27.7 (m).

$^{31}$P{$^1$H}-NMR (101.3 MHz, C$_6$D$_6$): δ=27.9 (m).

EXAMPLE 46

Preparation of (3-(triethoxysilyl)propyl)bis(2,4,6-trimethylbenzoyl)phosphine oxide/triethoxy(vinyl)silane copolymer

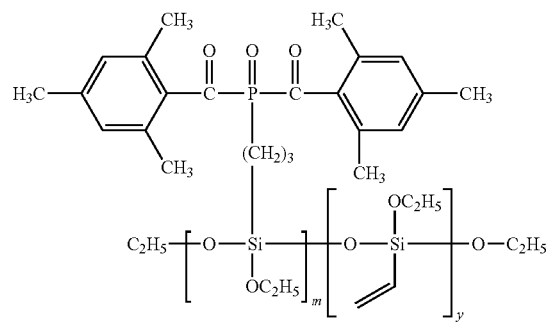

ratio m:y = 1:20
the distribution of the n-groups and m-groups in the copolymer is statistical, thus representing a "random copolymer"

Starting material: 3-(triethoxysilyl)propyl)(2,4,6-trimethyl-benzoyl)-phosphine oxide 1:20.

$^1$H-NMR (300 MHz, C$_6$D$_6$): δ=6.71 (s, 4H, Mes), 6.08 (m, 3H, CH=CH$_2$), 3.63 (m, 2H, OCH$_2$CH$_3$), 2.44 (s, 12H, Meso-CH$_3$), 2.16 (s, 6H, Mes-p-CH$_3$), 1.58 (m, 2H, SiCH$_2$CH$_2$CH$_2$P), 1.18 (m, 3H, OCH$_2$CH$_3$).

$^{31}$P-NMR (101.3 MHz, C$_6$D$_6$): δ=27.8 (br.).

$^{31}$P{$^1$H}-NMR (101.3 MHz, C$_6$D$_6$): δ=28.0 (br.).

EXAMPLE 47

Preparation of (3-(diethoxymethylsilyl)propyl)bis(2,4,6-trimethylbenzoyl)phosphine oxide/diethoxy(methyl)(vinyl)silane copolymer

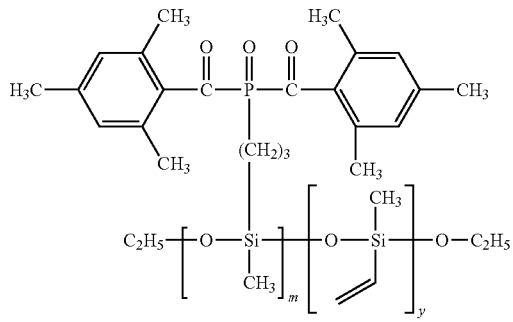

ratio m:y = 1:1
the distribution of the n-groups and m-groups in the copolymer is statistical, thus representing a "random copolymer"

Starting material: 3-(diethoxy[methyl]-silyl)-propyl)-(2,4,6-trimethyl-benzoyl)phosphine oxide of example 25/diethoxymethylvinylsilane, ratio 1:1.

$^1$H-NMR (200 MHz, C$_6$D$_6$): δ=6.70 (s, 4H, Mes), 6.08 (m, 3H, CH=CH$_2$), 3.40 (m, 2H, OCH$_2$CH$_3$), 2.45 (s, 12H, Mes-oCH$_3$), 2.10 (s, 6H, Mes-p-CH$_3$), 1.60 (m, 2H, SiCH$_2$CH$_2$CH$_2$P), 0.43 (s, 6H, SiCH$_3$). $^{31}$P{$^1$H}-NMR (80 MHz, C$_6$D$_6$): δ=27.7 (br.).

EXAMPLE 48

Preparation of (3-(diethoxymethylsilyl)propyl)bis(2,4,6-trimethylbenzoyl)phosphine oxide/diethoxy(methyl)(vinyl)silane copolymer

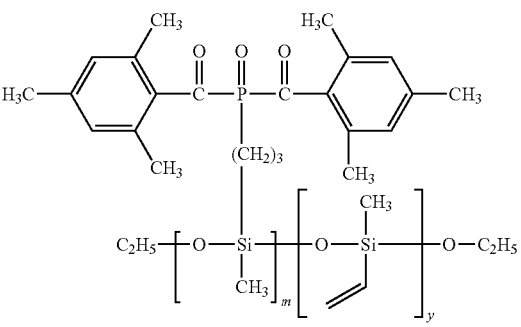

ratio m:y = 1:3
the distribution of the n-groups and m-groups in the copolymer is statistical, thus representing a "random copolymer"

Starting material: 3-(diethoxy[methyl]silyl)propyl)-(2,4,6-trimethyl-benzoyl)-25/diethoxymethylvinylsilane, ratio 1:3.

$^1$H-NMR (250 MHz, C$_6$D$_6$): δ=6.75 (s, 4H, Mes), 6.06 (m, 3H, CH=CH$_2$), 3.43 (m, 2H, OCH$_2$CH$_3$), 2.49 (s, 12H, Meso-CH$_3$), 2.14 (s, 6H, Mes-p-CH$_3$), 1.58 (m, 2H, SiCH$_2$CH$_2$CH$_2$P), 0.40 (s, 6H, SiCH$_3$).

EXAMPLE 49

Preparation of ((3-(diethoxymethylsilyl)propyl)bis-(2,4,6-trimethylbenzoyl)phosphine oxide/diethoxy(methyl)-(vinyl)silane copolymer

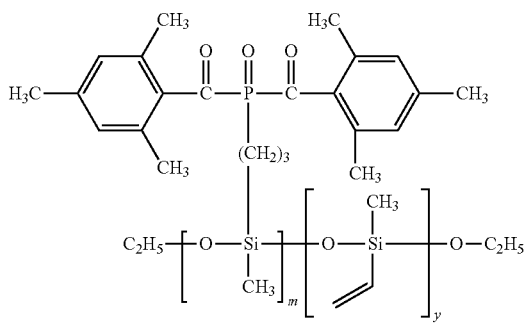

ratio m:y = 1:20
the distribution of the n-groups and m-groups in the copolymer is statistical, thus representing a "random copolymer"

Starting material: 3-(diethoxy[methyl]silyl)propyl)-(2,4,6-trimethyl-benzoyl)phosphine oxide of example 25/diethoxymethylvinylsilane, ratio 1:20.

$^1$H-NMR (300 MHz, $C_6D_6$): δ=6.74 (s, 4H, Mes), 6.07 (m, 3H, CH=$CH_2$), 3.41 (m, 2H, $OCH_2CH_3$), 2.48 (s, 12H, Mes-o-$CH_3$), 2.16 (s, 6H, Mes-p-$CH_3$), 1.58 (m, 2H, $SiCH_2CH_2CH_2P$), 0.48 (s, 6H, $SiCH_3$). $^{31}$P-NMR (121.5 MHz, $C_6D_6$): δ=27.6 (br.).

$^{31}$P{$^1$H}-NMR (121.5 MHz, $C_6D_6$): δ=27.7 (br.).

EXAMPLE 50

Preparation of (3-(triethoxysilyl)propyl)bis(2,4,6-trimethylbenzoyl)phosphine oxide/diethoxydimethylsilane copolymer

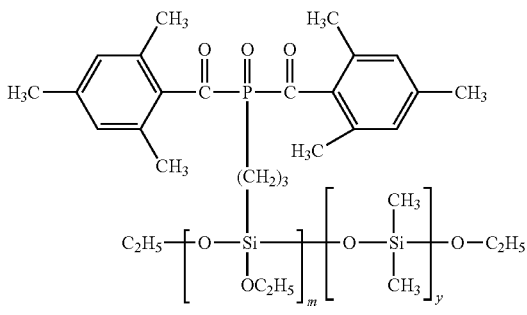

ratio m:y = 1:9
the distribution of the n-groups and m-groups in the copolymer is statistical, thus representing a "random copolymer"

Starting material: 3-(triethoxysilyl)propyl)(2,4,6-trimethyl-benzoyl)-phosphine oxide of example 24/diethoxydimethylsilane, ratio 1:9.

GPC: Mn=243679 g/mol, Mw=448975 g/mol, $M_w/M_n$=1.84.

EXAMPLE 51

Preparation of (5-norbornen-2-butyl)-4-bis(2,4,6-trimethylbenzoyl)phosphine oxide/norbornene copolymer

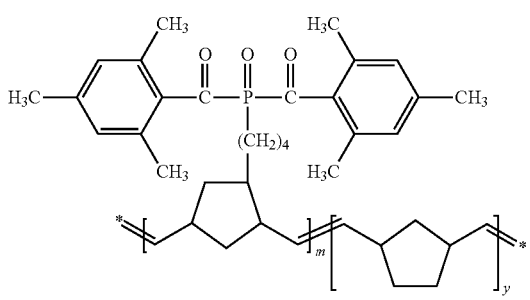

(5-Norbornen-2-butyl)-4-bis(2,4,6-trimethylbenzoyl)phosphane oxide (0.5 g, 1.01 mmol, 1 eq.) and norbornene (1.89 g (20.2 mmol, 20 eq.) are dissolved in dichloromethane (50 ml). Grubbs catalyst first generation (3 mol %, 509 mg) is added and the solution refluxed for 2 hours. Subsequently, vinylethylether (1 ml) is added to abort the reaction. The reaction mixture is filtrated over celite. The filtrate is added to methanol (100 ml). The polymer precipitates immediately.

$^{31}$P{$^1$H}-NMR (121.5 MHz, $C_6D_6$): δ=24.7 (br.).
GPC: $M_n$=235677, $M_m$=452.363 g/mol.

EXAMPLE 52

Preparation of polystyrene comprising methyl-bis(2,4,6-trimethylbenzoyl)-phosphine oxide moieties

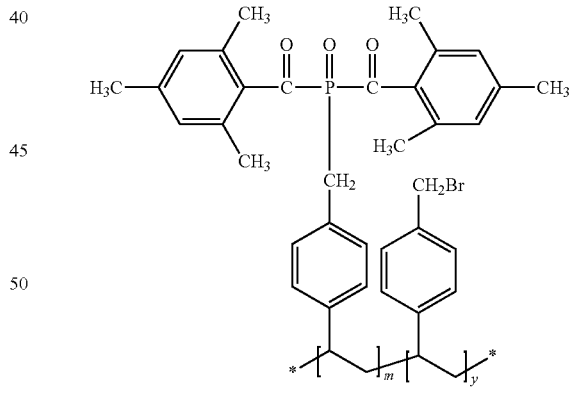

In a 20 mL Schlenk flask sodium bis(2,4,6-trimethylbenzoyl)phosphide (example 1c) (100 mg, 0.26 mmol, 1 eq.) is dissolved in a mixture of toluene (5.00 ml) and tetrahydrofuran (5 ml). Poly(bromomethylstyrene) (51.9 mg, 0.26 mmol, 1 eq.) is added and the solution was stirred for 72 hours at 60° C. The white precipitate is filtered off and the filtrate was concentrated in vacuo. The remaining oil is dissolved in toluene and hydrogen peroxide (10%) (0.01 ml, 0.26 mmol, 1 eq.) is added. The oxidation of the phosphane is complete after 4 hours. After adding toluene (15 ml), the solution is washed twice with an aqueous sodium hydrogencarbonate solution (2%), twice with brine and finally dried over sodium sulfate.

The solvent is removed and the product dried in high vacuum for two hours. (Yield: 87.02 mg, 0.19 mmol, 74%). $^{31}$P-NMR (121.3 MHz, C$_6$D$_6$): δ=26.3 (br.)

EXAMPLE 53

Preparation of Polystyrene Comprising bis(2,4,6-trimethylbenzoyl)phosphine Oxide Moieties

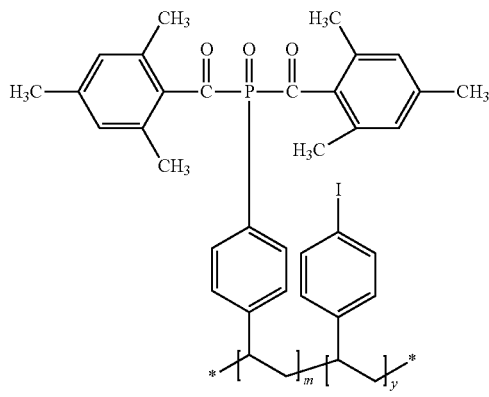

In a 20 mL Schlenk flask sodium bis(2,4,6-trimethylbenzoyl)phosphide (example 1c) (100 mg, 0.26 mmol, 1 eq.) is dissolved in toluene (10.0 ml). Poly(p-iodostyrene) (51.9 mg, 0.26 mmol, 1 eq.) and [Pd(dba)$_2$] (4.86 mg, 0.014 mmol, 5 mol %) are added. The solution is stirred for 72 hours at 85° C. Subsequently, the white precipitate is filtered off over celite and the filtrate concentrated in vacuo. It is important to remove all the sodium iodide before the oxidation of the phosphane. The remaining oil is dissolved in toluene, and hydrogen peroxide (0.01 mL, 0.26 mmol, 1 eq.) is added with a micro liter syringe. The oxidation of the phosphane is complete after 4 hours. After adding toluene (15 ml), the solution is washed twice with an aqueous sodium hydrogencarbonate solution (2%), twice with brine and finally dried over sodium sulfate. The solvent is removed and the product dried in high vacuo for two hours (Yield: 123.3 mg, 0.236 mmol, 91%). $^{31}$P-NMR (121.3 MHz, C$_6$D$_6$): δ=9.3 (br.)

EXAMPLE 54

Preparation of 2-(bis(2,4,6-trimethylbenzoyl)-phosphoryl)-acetic acid Substituted Cotton

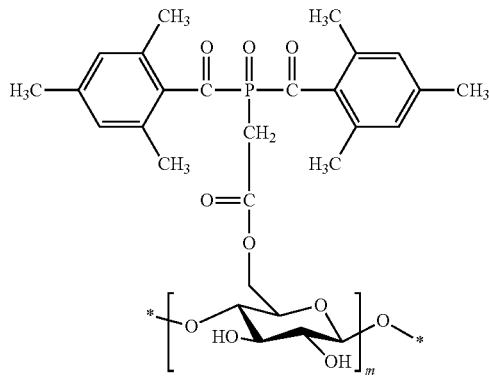

A piece of cotton (10×10 cm) is warmed up to 40° C. for one hour in 30 ml of a solution of 2-(bis(2,4,6-trimethylbenzoyl)phosphoryl)-acetic acid (example 18) (200 mg) and dicyclohexyl carbodiimide (200 mg) in dichloromethane. Subsequently, the cotton is soaked in pure dichloromethane twice for 2 hours each time in order to remove not chemically bound organic materials and air dried. A 2-(bis(2,4,6-trimethylbenzoyl)phosphoryl)-functionalized cotton is thus obtained.

EXAMPLE 55

Copolymerization of (4-vinylbenzyl)-bis(2,4,6-trimethylbenzoyl)-phosphine with Styrene

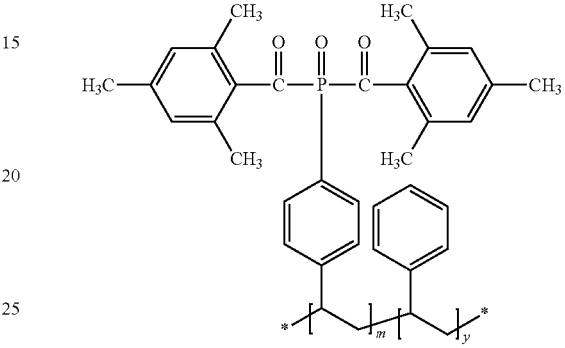

0.78 g (1.71 mmol, 1 eq.) of freshly prepared (4-vinylbenzyl)-bis(2,4,6-trimethylbenzoyl)-phosphine (example 1) and 1.8 mL (1.6 g, 15.4 mmol, 9 eq.) styrene are dissolved in 0.6 mL toluene. 47.6 mg (2% w/w) AIBN are added and the solution is stirred at 60° C. for 50 hours. 5 ml Toluene are subsequently added to the yellow gel which is formed in order to dissolve the polymer. The polymer is then precipitated by the addition of petroleum ether. This procedure is repeated twice before the polymer is filtrated off and washed with petroleum ether. The polymer is dried under vacuum providing 2.121 g of the (4-vinylbenzyl)-bis(2,4,6-trimethylbenzoyl)-phosphine/styrene co-polymer. Conversion: 87.4%.

EXAMPLE 56

Copolymerization of (ethyl 2-([bis{2,4,6-trimethyl benzoyl}-phosphoryl]methyl)acrylate with Styrene

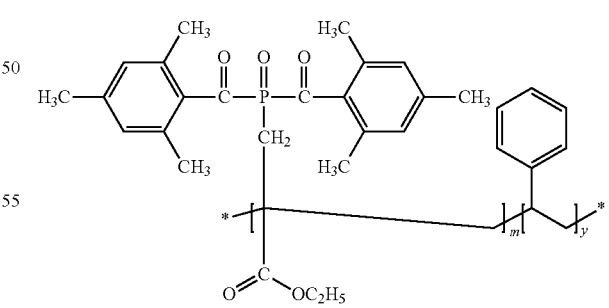

1.31 g (2.88 mmol, 1 eq.) (ethyl 2-[(bis{2,4,6-trimethylbenzoyl}-phosphoryl]-methyl)acrylate (example 2) and 2.98 mL (2.7 g, 25.9 mmol, 9 eq.) styrene are dissolved in 1 ml toluene. 80 mg (2 wt %) AIBN are added to this solution and the solution is stirred at 60° C. for 60 hours. 5 mL Toluene are added to the yellow gel which is formed in order to dissolve the polymer. Subseqeuntly, the polymer is precipitated by the addition of petroleum ether. This procedure is repeated two times and the polymer is filtrated off and washed with petroleum ether. The polymer is dried by vacuum to give 2.3 g of the (ethyl 2-([bis{2,4,6-trimethylbenzoyl}-phosphoryl]-methyl)acrylate/styrene copolymer. Conversion: 55.6%.

APPLICATION EXAMPLES

Example A1

Light Induced Gelation of Vinyl Substituted BAPO-Functionalised Silicones

The vinyl- and BAPO-functionalised copolymers of examples 41-46 are dissolved in benzene and the corresponding solution is irradiated with a medium pressure mercury lamp for 5 minutes, resulting in the formation of a pale yellow gel. The amount of benzene encapsulated per aram of the different aels formed is reported in the table.

| BAPO-functionalized polysiloxane | Absorbing capacity (ml benzene/g polysiloxane) |
|---|---|
| Example 41 | 70 |
| Example 42 | 45 |
| Example 43 | 50 |
| Example 44 | 40 |
| Example 45 | 12 |
| Example 46 | 12 |

Example A2

Functionalization of Cotton with BAPO-siloxanes

A2-a): Preparation of BAPO-functionalized Cellulose

Pieces (6×20 cm) of untreated cotton fabrics are immersed in a 6.5% w/w solution of the BAPO-substituted siloxanes of examples 24, 25 and 26 in dichloromethane during 15 minutes. The material thus obtained is soaked twice for two hours in pure dichloromethane in order to remove all BAPO-substituted siloxanes not chemically bound to the fabric. The white-off to pale yellow material thus obtained is air dried to give the cotton fabrics A2-a1, A2-a2 or A2-a3, functionalized with the BAPO siloxanes of examples 24, 25 or 26, respectively.

A2-b): Modification of BAPO-functionalized Cellulose

The functionalized cotton fabrics of example A2-a1, A2-a2 and A2-a3 are immersed in a 5% w/w solution of 1H,1H,2H,2H-heptadecafluorodecyl acrylate in n-hexane. The fabrics in the solution are irradiated with a mercury medium pressure lamp for 10 minutes, subsequently placed in a Soxhlet extractor and all not chemically bound material is removed by continuous extraction with dichloromethane. Cotton fabrics A2-b1, A2-b2 and A2-b3, modified with a chemically bound layer of poly(1H,1H,2H,2H-heptadecafluorodecyl acrylate) are thus obtained.

A2-c): Measurement of Water Repellency

Water repellency of the treated cotton fabrics A2-b1, A2-b2 and A2-b3 is tested by placing a droplet of water on the fabric and comparing the time of absorption with that for a droplet of water applied with the same procedure on virgin (non-treated) cotton. For all examples A2-b1, A2-b2 and A2-b3 time to absorption is longer than for non-treated cotton, demonstrating the water repellence effect of modified cotton.

Example A3

Functionalization of Cotton with BAPO-silicones

A3-a): Preparation of BAPO-functionalized Cellulose

Pieces (6×20 cm) of virgin cotton fabrics are treated as in example A2-a), except that a 6% w/w solution of the BAPO-silicone homopolymers of examples 31-33, or copolymers of examples 37, 40 and 47 are used instead of the BAPO-substituted siloxanes. BAPO-modified cotton fabrics A3-a1, A3-a2 and A3-a3 are thus obtained.

A3-b): Modification of BAPO-functionalized Cellulose

The functionalized cotton fabrics of example A3-a1, A3-a2 and A3-a3 are immersed in a 5% w/w solution of 1H,1H,2H,2H-heptadecafluorodecyl acrylate in n-hexane and treated as described for example A2-b). Cotton fabrics A3-b1, A3-b2 and A3-b3 modified with a chemically bound layer of poly(1H,1H,2H,2H-heptadecafluorodecyl acrylate) are thus obtained.

A3-c): Measurement of Water Repellency

Water repellency of the treated cotton fabrics A3-b1, A3-b2 and A3-b3 is tested according to the method described in example A2-c). For all examples A3-b1, A3-b2 and A3-b3 time to absorption is significantly longer than for non-treated cotton, demonstrating the water repellence effect of modified cotton. Samples treated with a siloxaneBAPO/siloxane copolymer provide a higher water repellency than samples treated with a monomer.

Example A4

Photoinduced Chemisorption of Phenolphthaleine on BAPO-functionalised Cotton

BAPO-functionalised cotton (example 30c) is immersed in a concentrated solution of phenolphthaleine in tetrahydrofuran and irradiated with a medium pressure mercury lamp. A green material is obtained which is intensively washed for 12 hours with tetrahydrofuran and ethanol in order to remove not chemically bound phenolphthaleine. After soaking the cotton in water and adding a drop of sodium hydroxide solution (1%) the cotton becomes red, indicating the presence of phenolphthalein chemically bound to cotton.

Example A5

Patterning of a Silicon Waver with a BAPO-Modified Poly(Norbornene) Polymer

A drop of a 5% (by mass) solution of the (5-norbornen-2-butyl)-4-bis(2,4,6-trimethylbenzoyl)phosphine oxide/norbornene copolymer of example 48 in chloroform is placed on a silicon wafer to give a thin film. A copper net (0.14 mm mesh) is placed as a mask on this thin film. Subsequently a few drops of ethylacrylate are added on top of the net. After irradiation with a mercury medium pressure lamp for 10 minutes, the copper net is removed, leaving a structured surface with a polyacrylate coating in the areas exposed to light and lines of non-covered silica in the areas masked by the net structure.

Example A6

Patterning of a Silicon Waver with a BAPO-Modified Poly (Siloxan) Polymer

A6-a): Poly(siloxane)/poly(acrylate) structure

A drop of poly(3-(triethoxysilyl)propyl)bis(2,4,6-trimethylbenzoyl)phosphine oxide (example 31) dissolved chloroform is placed on a silicon wafer and the solvent is evaporated to give a thin film. A few drops of ethyl acrylate are added on top of the film, and half of the silicon wafer is covered with an alu foil. The wafer is then exposed to the irradiation of a high pressure mercury lamp. The part covered by the alu foil shows the polysiloxane polymer, while the part exposed to light is covered by an acrylic polymer.

A-6b): Poly(siloxane)/poly(acrylonitrile) Structure

A copper net is placed on the wafer coated with poly(3-(triethoxysilyl)propyl)bis(2,4,6-trimethylbenzoyl)phosphine oxide (example 31) prepared as in example A6-a). A few drops of acrylonitril are added and the sample is irradiated with a medium pressure mercury lamp. After removal of the copper net, SEM analysis shows a structured surface with poly(acrylnitrile) pots in the irradiated zones (diameter: approximately 50 µm) and a polysiloxane coating in the shadowed areas.

Example A7

Light-induced Emulsion Polymerisation using Sodium 2-(bis(2,4,6-trimethylbenzoyl)-phosphoryl)acetate In a cylindrical 100 ml Schlenk flask, degassed distilled water (33.5 ml), a degassed sodium dodecylsulfate solution (1.00 ml), freshly distilled styrene (10.0 g) and 2-(bis(2,4,6-trimethylbenzoyl)-phosphoryl)acetate (example 19) (30.0 mg) are mixed under argon atmosphere. The reaction mixture is vigorously stirred with a large, magnetic, teflon-coated stirring bar. The reaction mixture is irradiated with a medium pressure mercury UV lamp for 30 minutes. After switching off the UV lamp, the solution is stirred for 72 h, in order to complete the reaction. One drop of an aqueous hydroquinone solution (1%) is added in order to quench the reaction. The white latex is filtered over cotton wool into a glass flask with a screwing cap (Yield: 96%). For the analysis polymer samples are prepared as described below.
GPC: The solvent is removed in vacuo completely. The remaining white powder is diluted in chloroform. Light scattering: One drop of the latex is diluted with 5 ml water. The cell is filled with this diluted emulsion. Yield analysis: A petri dish (7 cm diameter) is filled with 3 mm dried sand (12 h, 110° C., in vacuo for several days) and balanced. Subsequently, 1 ml latex is added. Afterwards it is put in the oven for 12 h at 110° C. under vacuum. The petri dish is balanced again. The weight difference is the yield of the solid component of the latex.

Example A8

Curing of a UV-curable White Coat

A UV-curable white coat is prepared by mixing
67.5 parts of a polyester acrylate oligomer (®EBECRYL 830, UCB, Belgium)
5.0 parts of hexandiole diacrylate
2.5 parts of trimethylolpropane triacrylate
25.0 parts of rutile titanium dioxide (®R-TC2, Tioxide, France)
2% by weight of (3-(diethoxymethylsilyl)propyl)-bis(2,4,6-trimethylbenzoyl)phosphine oxide/diethoxydimethylsilan copolymer (example 38) are dissolved in the formulation by mixing at 50° C. for one hour.

The coating is applied on a coil-coated aluminium sheet using a 60 µm wire wound bar coater and then cured. Curing is carried out by conveying the sample on a conveyor belt which is moving at a speed of 10 m/min, beneath two 100 W/cm medium-pressure mercury lamps (IST Minicure).

The cured coating subsequently is evaluated. Through cure is evaluated by the pendulum hardness in seconds achieved. Surface cure is determined by measuring the double bond conversion at the surface by ATR spectroscopy. Similarly the double bond conversion at the bottom of the coating is determined by ATR after peeling off the cured coating from the aluminium sheet. Yellowness of the coating is measured using a color measurement device Minolta 2600 d. Yellowness is determined immediately after curing and after 15 minutes or 120 minutes, respectively, of exposure to a low-pressure mercury lamp of the type TL 40W/03 (Philips, emission maximum at 430 nm). The results obtained are collected in Table 1.

Example A9

Curing of a UV-Curable White Coat with a Photoinitiator Blend

The curing of a white coat as described in example A8 is repeated, except that a mixture of phenyl-1-hydroxycyclohexyl ketone (Irgacure® 184 BASF SE) (80 parts) and 20 parts (3-(diethoxymethylsilyl)propyl)-bis(2,4,6-trimethylbenzoyl)phosphine oxide/diethoxydimethylsilane copolymer (example 38) is used as photoinitiator. The results are collected in Table 1.

TABLE 1

| Photoinitiator compound of | Pendulum hardness [s] | DBC top (%) | DBC bottom (%) | after cure | Yellowing after 15 min TL03 | Yellowing after 120 min TL03 |
|---|---|---|---|---|---|---|
| Example 38 | 71.4 | 20 | * | 5.61 | 2.27 | 0.87 |
| Example 38 + Irgacure 184 (20:80) | 77.9 | 72 | 67 | 3.48 | 1 | 0.39 |

* = not measured

The invention claimed is:
1. An oligomer or polymer substituted by one or more bisacylphosphine oxide moieties, wherein the bisacylphosphine oxide moieties are linked via the phosphorous atom, optionally via a spacer group, to the oligomer or polymer backbone, which oligomer or polymer comprises units of formula (Ia),

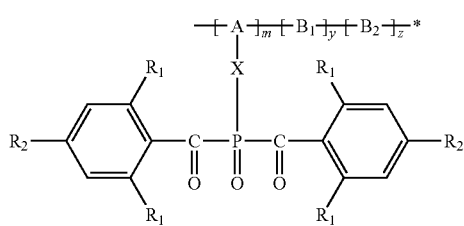

(Ia)

where
m is an integer equal or greater than 2;
y and z independently of each other are an integer 0-15000;
A is

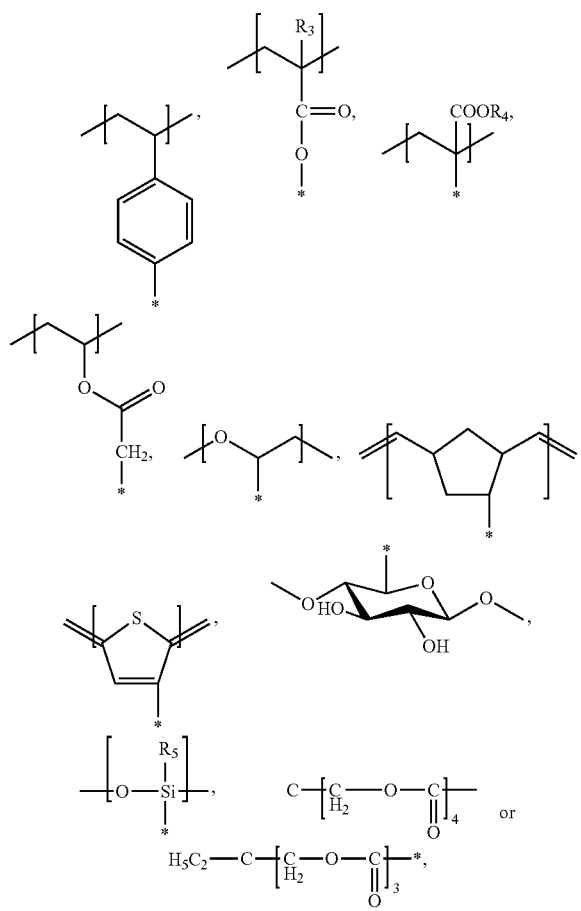

wherein the asterisk denotes the bond to X;
$B_1$ and $B_2$ independently of each other are

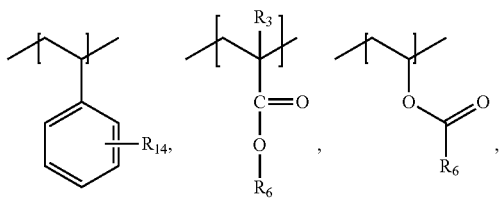

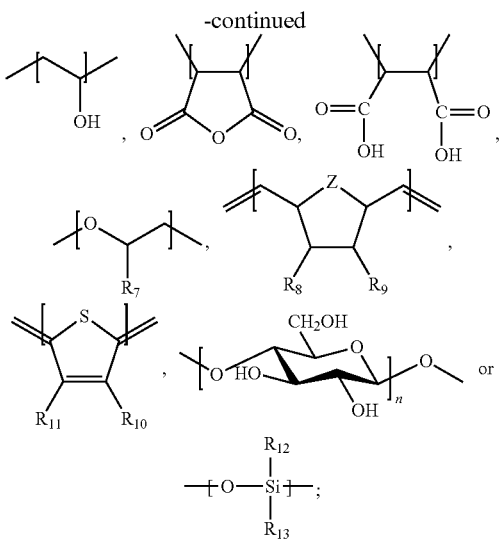

wherein A, $B_1$ and $B_2$ are incorporated into the same polymer backbone via random or block polymerization;
X is a direct bond, $C_1$-$C_{10}$-alkylene, —$(CH_2)_o$—NH—CO—O—$(CH_2)_p$—*,
—$(CH_2)_o$—NH—CO—O—$CH_2$—CHOH—$CH_2$—*,
—$(CH_2)_o$—NH—CO—NH—$(CH_2)_p$—*,
—$(CH_2)_o$—NH—CO—S—$(CH_2)_p$—*, —$(CH_2)_o$—O—CO—$CHR_3$—$CH_2$—NH—$(CH_2)_p$—*, *—$(CH_2)_o$—O—CO—$CHR_3$—$CH_2$—NH—$(CH_2)_p$—, —$(CH_2)_o$—CO—O—$(CH_2)_p$—*,
—$(CH_2)_o$—O—CO—$CHR_3$—$CH_2$—S—$(CH_2)_p$—*,
*—$(CH_2)_o$—O—CO—$CHR_3$—$CH_2$—S—$(CH_2)_p$—
—$(CH_2)_o$—O—CO—$CH(COCH_3)$—$CH_2$—$C(COOR_3)$$CH_2$—*,
—$(CH_2)_o$—NH—$CH_2$—$CH_2$—$C(COOR_3)CH_2$—*,
—$(CH_2)_o$—S—$(CH_2)_o$—$C(COOR_3)CH_2$—*,
—$(CH_2)_o$—O—CO—$CH(COCH_3)$—$CH_2$—$CHR_3$—CO—O—$(CH_2$—$CH_2$—O$)_t$$(CO)CH_2$—*,
—$(CH_2)_o$—NH—$CH_2$—$CHR_3$—CO—O—$(CH_2$—$CH_2$—O$)_t$$(CO)CH_2$—*,
—(CH$)_o$—S—$CH_2$—$CHR_3$—CO—O—$CH_2$—$CH_2$—*,
—$(CH_2)_o$—S—$CH_2$—$CHR_3$—CO—O—$(CH_2$—$CH_2$—O$)_t$$(CO)CH_2$—*,
—$(CH_2)_o$—NH—$CH_2$—$CHR_3$—CO—O—$CH_2$—$CH_2$—*,
—$(CH_2)_o$—O—CO—$CH(COCH_3)$—$CH_2$—$CHR_3$—CO—O—$CH_2$—$CH_2$—*, —$(CH_2)_o$—CO—O—$CH_2$—CHOH—$CH_2$—*,
—$(CH_2)_o$—O(CO)—$CH_2$—*, —$(CH_2CH_2O)_t$—(CO)—$CH_2$—*, —$(CH_2)_o$—CHOH—$CH_2$—O(CO)—$CH_2$—* or

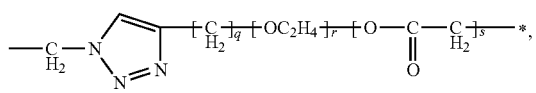

wherein the asterisk denotes the bond to the bisacylphosphine oxide moiety;
o, p and q independently of each other are an integer 1-4;
r is an integer 0-2;
s is 0 or 1;
t is an integer 1 or 2;
$R_1$ is $C_1$-$C_4$-alkyl, $C_1$-$C_4$-alkoxy or Cl; and $R_2$ is hydrogen, $C_1$-$C_4$-alkyl, $C_1$-$C_4$-alkoxy or Cl;
$R_3$ is hydrogen or methyl;
$R_4$ is $C_1$-$C_4$alkyl;
$R_5$ is methyl, phenyl or ethoxy;
$R_6$ is $C_1$-$C_{10}$alkyl or $C_1$-$C_9$perfluoroalkyl;
$R_7$ is $C_1$-$C_{10}$alkyl, —$CH_2$—O—$C_1$-$C_{10}$alkyl, —$CH_2$—O—$(CH_2)_o$—$C_5$-$C_8$cycloalkyl, —$CH_2$—O—$(CH_2)_o$—$C_6$-$C_{10}$aryl, $C_1$-$C_9$perfluoroalkyl, —$CH_2$—O—$C_1$-$C_{10}$perfluoroalkyl, —$CH_2$—O—$C_6$-$C_{10}$aryl which is unsubstituted or substituted by $C_1$-$C_4$alkyl, $C_1$-$C_4$alkoxy or by Cl;
$R_8$ is hydrogen, $C_1$-$C_8$alkyl, (CO)O—$R_{15}$ or CN;
$R_9$ is hydrogen, (CO)O—$R_{15}$;
or $R_8$ and $R_9$ are together —$(CH_2)_w$—, —CH=CH—$CH_2$—, —(CO)—O—(CO)—, —(CO)—$N(R_{16})$—CO— or

$R_{10}$ is hydrogen, $C_1$-$C_8$-alkyl or —$SO_3^-E^+$;
$R_{11}$ is hydrogen;
or $R_{10}$ and $R_{11}$ together are —O—$CH_2CH_2$—O—;
$R_{12}$ and $R_{13}$ independently of each other are $C_1$-$C_4$-alkyl, vinyl, phenyl or $C_1$-$C_4$alkoxy;
$R_{14}$ is hydrogen, $CH_2Br$, $CH_2Cl$ or I;
$R_{15}$ is hydrogen, $C_1$-$C_4$-alkyl or benzyl;
$R_{16}$ is $C_1$-$C_4$alkyl or phenyl;
w is an integer 3-10;
E is a cation; and
Z is $CH_2$ or O.

2. An oligomer or polymer of the formula (Ia) according to claim 1, wherein
z is 0;
y is 0 or is an integer between m and 20 fold m;
$R_1$ is $C_1$-$C_4$-alkyl;
$R_2$ is $C_1$-$C_4$-alkyl;
X is a direct bond, $C_1$-$C_{10}$-alkylene, —$(CH_2)_o$—O(CO)—$CH_2$—* or

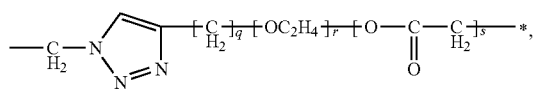

wherein the asterisk denotes the bond to the bisacylphosphine oxide moiety;
o and q are 1;
r is 0;
s is 0;
A is

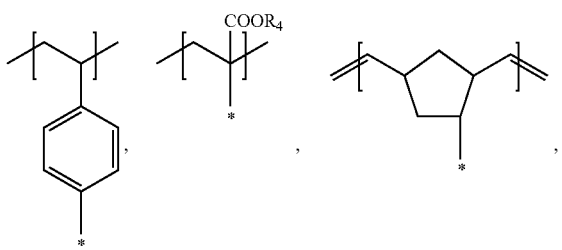

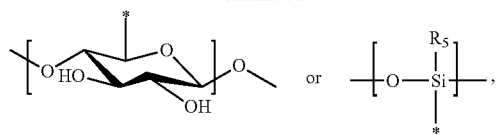

wherein the asterisk denotes the bond to X;
$B_1$ is

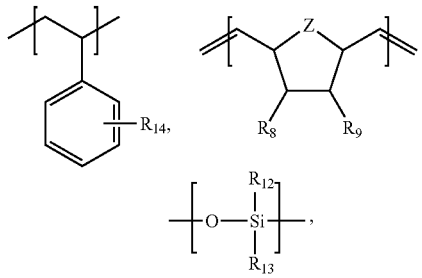

wherein A and $B_1$ are incorporated into the same polymer backbone via random or block polymerization;
$R_4$ is $C_1$-$C_4$alkyl;
$R_5$ is methyl, phenyl or ethoxy;
$R_8$ is hydrogen;
$R_9$ is hydrogen;
$R_{12}$ and $R_{13}$ independently of each other are $C_1$-$C_4$-alkyl, vinyl or $C_1$-$C_4$alkoxy;
$R_{14}$ is hydrogen, $CH_2Br$ or I; and
Z is $CH_2$.

3. An oligomer or polymer according to claim 1, which is selected from the group consisting of bisacylphosphine oxide-functionalized polystyrenes, bisacylphosphine oxide-functionalized polynorbornes, bisacylphosphine oxide-functionalized polyacrylates, bisacylphosphine oxide-functionalized polythiophenes, bisacylphosphine oxide-functionalized polysiloxanes, bisacylphosphine oxide-functionalized biopolymers, bisacylphosphine oxide-functionalized polyepoxides, bisacylphosphine oxide-functionalized polyvinylesters and bisacylphosphine oxide-functionalized dendritic polymers.

4. A process for the synthesis of an oligomer or polymer according to claim 1, wherein the oligomer or polymer is obtained by homopolymerization or copolymerization of a functionalized bisacylphosphine oxide compound of formula (II), optionally with one or more monomers containing no bisacylphosphine oxide moiety, and optionally using a suitable catalyst,

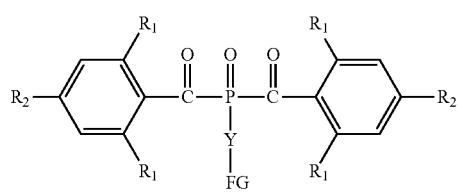

wherein
$R_1$ is $C_1$-$C_4$-alkyl, $C_1$-$C_4$-alkoxy or Cl;
$R_2$ is H, $C_1$-$C_4$-alkyl, $C_1$-$C_4$-alkoxy or Cl:
Y is —$(CH_2)_a$— or —$CH_2$—CHOH—$CH_2$—;

a is an integer 1-10;
FG is Cl, Br, OH, SH, NH$_2$, N$_3$, COOH, COO$^-$E$^+$, COOCH$_3$, COONH$_2$,

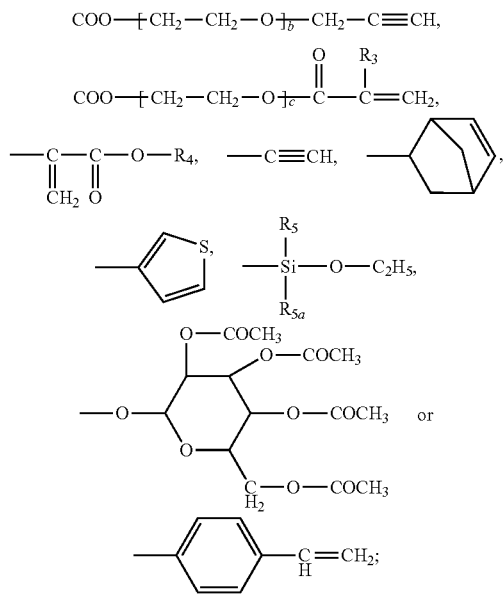

b is 0, 1 or 2;
c is 1 or 2;
R$_3$ is hydrogen or methyl;
R$_4$ is C$_1$-C$_4$alkyl;
R$_5$ and R$_{5a}$ independently of each other are methyl, phenyl or ethoxy;
E is a cation;
provided that, if a is 1, FG is not COOCH$_3$ or

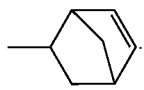

5. A process for the synthesis of an oligomer or polymer according to claim 1, wherein the oligomer or polymer is obtained by homopolymerization or copolymerization of a functionalized bisacylphosphine oxide compound of formula (IIa), optionally with one or more monomers containing no bisacylphosphine oxide moiety, and optionally using a suitable catalyst,

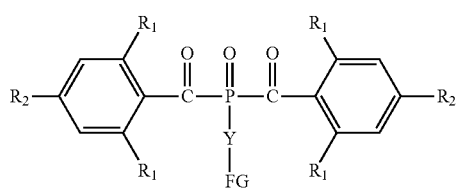

wherein
R$_1$ is C$_1$-C$_4$-alkyl, C$_1$-C$_4$-alkoxy or Cl;
R$_2$ is H, C$_1$-C$_4$-alkyl, C$_1$-C$_4$-alkoxy or Cl:
Y is —(CH$_2$)$_a$— or —CH$_2$—CHOH—CH$_2$—;
a is an integer 1-10;

FG is Cl, Br, OH, SH, NH$_2$, N$_3$, COOH, COO$^-$E$^+$, COOR$_{17}$, CH=CH$_2$,

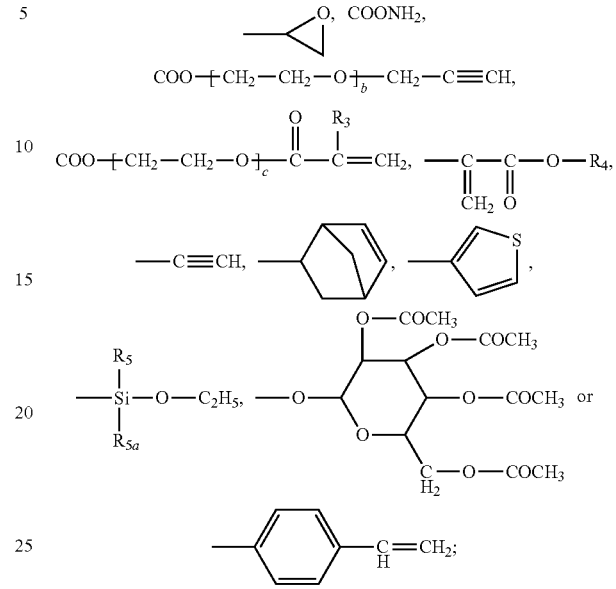

b is 0, 1 or 2;
c is 1 or 2;
R$_3$ is hydrogen or methyl;
R$_4$ is C$_1$-C$_4$alkyl;
R$_5$ and R$_{5a}$ independently of each other are methyl, phenyl or ethoxy;
E is a cation;
R$_{17}$ is C$_1$-C$_4$alkyl or CH=CH$_2$.

6. A process for the synthesis of an oligomer or polymer according to claim 1, wherein the oligomer or polymer is obtained by reaction of a functional group "FG" in a bisacylphosphine oxide compound of formula (II) with a second functional group on a polymer or copolymer backbone capable of reacting with the functional group on the bisacylphosphine oxide compound, optionally using a suitable catalyst,

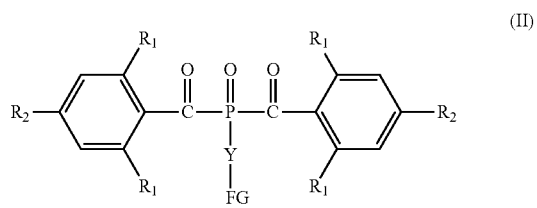

wherein
R$_1$ is C$_1$-C$_4$-alkyl, C$_1$-C$_4$-alkoxy or Cl;
R$_2$ is H, C$_1$-C$_4$-alkyl, C$_1$-C$_4$-alkoxy or Cl:
Y is —(CH$_2$)$_a$— or —CH$_2$—CHOH—CH$_2$—;
a is an integer 1-10;
FG is Cl, Br, OH, SH, NH$_2$, N$_3$, COOH, COO$^-$E$^+$, COOCH$_3$, COONH$_2$,

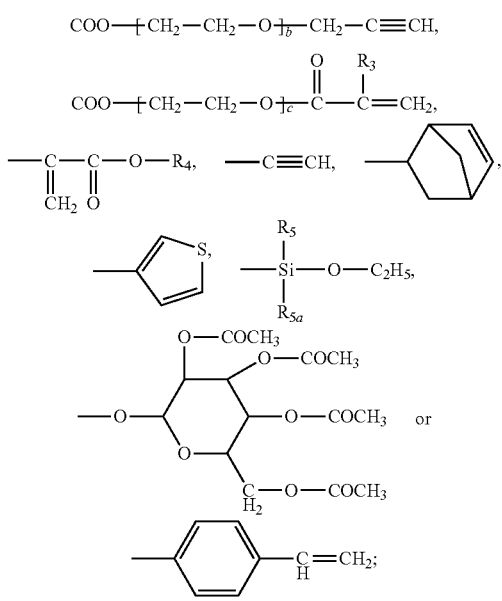

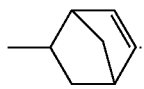

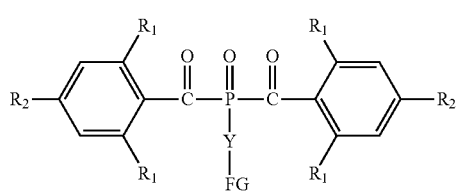

b is 0, 1 or 2;
c is 1 or 2;
R$_3$ is hydrogen or methyl;
R$_4$ is C$_1$-C$_4$alkyl;
R$_5$ and R$_{5a}$ independently of each other are methyl, phenyl or ethoxy;
E is a cation;
provided that, if a is 1, FG is not COOCH$_3$ or 7. A process for the synthesis of an oligomer or polymer according to claim 1, wherein the oligomer or polymer is obtained by reaction of a functional group "FG" in a bisacylphosphine oxide compound of formula (IIa) with a second functional group on a polymer or copolymer backbone capable of reacting with the functional group on the bisacylphosphine oxide compound, optionally using a suitable catalyst, (IIa)

wherein
R$_1$ is C$_1$-C$_4$-alkyl, C$_1$-C$_4$-alkoxy or Cl;
R$_2$ is H, C$_1$-C$_4$-alkyl, C$_1$-C$_4$-alkoxy or Cl:
Y is —(CH$_2$)$_a$— or —CH$_2$—CHOH—CH$_2$—;
a is an integer 1-10;
FG is Cl, Br, OH, SH, NH$_2$, N$_3$, COOH, COO$^+$E$^+$, COOR$_{17}$, CH=CH$_2$,

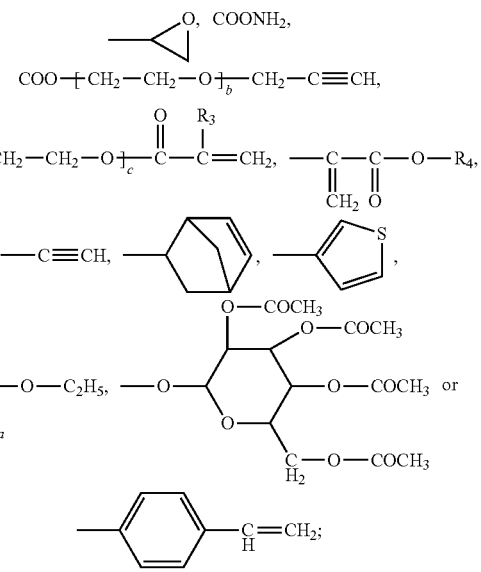

b is 0, 1 or 2;
c is 1 or 2;
R$_3$ is hydrogen or methyl;
R$_4$ is C$_1$-C$_4$alkyl;
R$_5$ and R$_{5a}$ independently of each other are methyl, phenyl or ethoxy;
E is a cation;
R$_{17}$ is C$_1$-C$_4$alkyl or CH=CH$_2$.

8. A process for the synthesis of an oligomer or polymer according to claim 1, wherein the oligomer or polymer is obtained by reaction of a symmetric or unsymmetric metal bisacylphosphide oxide with a functional group on a polymer or copolymer backbone capable of reacting with the metal bisacylphosphide, followed by oxidation with a suitable oxidation agent.

9. A photopolymerizable composition comprising
 (A) at least one ethylenically unsaturated photopolymerisable compound and
 (B) at least one oligomer or polymer according to claim 1 as photoinitiator.

10. A photopolymerizable composition according to claim 9, comprising (C) further photoinitiators and/or (D) further additives.

11. A coated substrate coated on at least one surface with a composition according to claim 9.

12. A coated substrate coated on at least one surface with a composition according to claim 10.

* * * * *